US012120588B2

(12) United States Patent
Rosenfeld et al.

(10) Patent No.: US 12,120,588 B2
(45) Date of Patent: Oct. 15, 2024

(54) VEHICLE MAP SERVICE SYSTEM

(71) Applicant: Google LLC, Mountain View, CA (US)

(72) Inventors: Asaf Rosenfeld, Palo Alto, CA (US); Richard William Bukowski, Palo Alto, CA (US); Christine McGavran, Pacifica, CA (US); Haris Ramic, San Francisco, CA (US); Michael Graham Woodward, Ultimo (AU); Casey Whitelaw, Cremorne (AU)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/902,509

(22) Filed: Sep. 2, 2022

(65) Prior Publication Data

US 2023/0004874 A1 Jan. 5, 2023

Related U.S. Application Data

(63) Continuation of application No. 16/617,290, filed as application No. PCT/US2018/034634 on May 25, 2018, now Pat. No. 11,436,539.

(Continued)

(51) Int. Cl.
*H04L 69/08* (2022.01)
*G01C 21/00* (2006.01)
(Continued)

(52) U.S. Cl.
CPC .......... *H04W 4/44* (2018.02); *G01C 21/3614* (2013.01); *G01C 21/367* (2013.01);
(Continued)

(58) Field of Classification Search
CPC ......... H04W 4/44; G06F 16/29; G06N 20/00; H04L 67/55; H04L 69/08
See application file for complete search history.

(56) References Cited

U.S. PATENT DOCUMENTS 5,953,722 A * 9/1999 Lampert .......... G08G 1/096827 701/461
6,161,071 A * 12/2000 Shuman ................. G07C 5/085 340/901

(Continued)

FOREIGN PATENT DOCUMENTS

EP 1251335 10/2002
EP 1251335 A2 * 10/2002 ............ G01C 21/32

(Continued)

OTHER PUBLICATIONS

International Preliminary Report on Patentability for PCT/US2018/034634, mailed on Dec. 5, 2019, 10 pages.

(Continued)

*Primary Examiner* — Philip C Lee
(74) *Attorney, Agent, or Firm* — DORITY & MANNING P.A.

(57) ABSTRACT

Provided are methods, systems, devices, and tangible non-transitory computer readable media for providing data including vehicle map service data. The disclosed technology can perform operations including receiving vehicle map service data from a plurality of service systems that include a plurality of client systems associated with a vehicle. The vehicle map service data can include information associated with a geographic area. A local map of the geographic area within a predetermined distance of the vehicle can be generated based on the vehicle map service data. Portions of the local map to which each client system is subscribed can be determined for each client system of the plurality of client systems. Additionally, the portions of the local map to which each client system is subscribed can be sent to a respective client system of the plurality of client systems.

20 Claims, 15 Drawing Sheets

Related U.S. Application Data

(60) Provisional application No. 62/511,526, filed on May 26, 2017.

(51) Int. Cl.

| | |
|---|---|
| ***G01C 21/36*** | (2006.01) |
| ***G06F 8/36*** | (2018.01) |
| ***G06F 8/65*** | (2018.01) |
| ***G06F 16/29*** | (2019.01) |
| ***G06F 18/25*** | (2023.01) |
| ***G06N 20/00*** | (2019.01) |
| ***G06N 20/20*** | (2019.01) |
| ***G07C 5/00*** | (2006.01) |
| ***G09B 29/10*** | (2006.01) |
| ***H04L 67/55*** | (2022.01) |
| ***H04W 4/38*** | (2018.01) |
| ***H04W 4/40*** | (2018.01) |
| ***H04W 4/44*** | (2018.01) |

(52) U.S. Cl.

CPC ..... *G01C 21/3673* (2013.01); *G01C 21/3691* (2013.01); *G01C 21/3815* (2020.08); *G01C 21/3878* (2020.08); *G06F 8/36* (2013.01); *G06F 8/65* (2013.01); *G06F 16/29* (2019.01); *G06F 18/25* (2023.01); *G06N 20/00* (2019.01); *G06N 20/20* (2019.01); *G07C 5/008* (2013.01); *G09B 29/102* (2013.01); *H04L 67/55* (2022.05); *H04L 69/08* (2013.01); *H04W 4/38* (2018.02); *H04W 4/40* (2018.02)

(56) References Cited

U.S. PATENT DOCUMENTS

| | | | | |
|---|---|---|---|---|
| 6,415,226 | B1 * | 7/2002 | Kozak | G01C 21/3697 701/410 |
| 11,543,832 | B2 * | 1/2023 | Baldwin | G05D 1/0214 |
| 2003/0018427 | A1 * | 1/2003 | Yokota | G01C 21/367 701/455 |
| 2003/0093220 | A1 * | 5/2003 | Andersson | B60W 30/16 340/988 |
| 2009/0326734 | A1 * | 12/2009 | Gudat | E21F 17/18 701/2 |
| 2010/0042315 | A1 | 2/2010 | Ikeuchi et al. | |
| 2011/0078231 | A1 | 3/2011 | Oliver et al. | |
| 2011/0307170 | A1 * | 12/2011 | Yamamoto | G09B 29/10 701/411 |
| 2012/0303220 | A1 | 11/2012 | Bauer et al. | |
| 2012/0323432 | A1 | 12/2012 | Wong et al. | |
| 2013/0103305 | A1 * | 4/2013 | Becker | G01C 21/3453 701/410 |
| 2013/0138810 | A1 | 5/2013 | Binyamin et al. | |
| 2016/0282127 | A1 * | 9/2016 | Goto | G01S 5/0027 |
| 2017/0200295 | A1 | 7/2017 | Grover | |
| 2017/0254654 | A1 | 9/2017 | Nordbruch | |
| 2017/0262709 | A1 * | 9/2017 | Wellington | G06V 10/764 |
| 2017/0307746 | A1 | 10/2017 | Rohani et al. | |
| 2018/0003512 | A1 * | 1/2018 | Lynch | G01C 21/3811 |
| 2018/0004223 | A1 * | 1/2018 | Baldwin | G05D 1/0289 |
| 2018/0130353 | A1 * | 5/2018 | Pandurangarao | G07C 5/008 |
| 2018/0141562 | A1 * | 5/2018 | Singhal | A61B 5/024 |
| 2018/0224284 | A1 * | 8/2018 | Danford | G09B 29/106 |
| 2019/0143967 | A1 | 5/2019 | Kutila et al. | |
| 2019/0254919 | A1 * | 8/2019 | Coney | A61H 3/02 |

FOREIGN PATENT DOCUMENTS

| | | | |
|---|---|---|---|
| WO | WO 2017/074966 | 5/2017 | |
| WO | WO-2017074966 A1 * | 5/2017 | G06F 8/65 |

OTHER PUBLICATIONS

International Preliminary Report on Patentability for PCT/US2018/034645, mailed on Dec. 5, 2019, 11 pages.

International Preliminary Report on Patentability for PCT/US2018/034650, mailed on Dec. 5, 2019, 10 pages.

International Preliminary Report on Patentability for PCT/US2018/034663, mailed on Dec. 5, 2019, 12 pages.

International Search Report and Written Opinion for Application No. PCT/US2018/034634, mailed on Aug. 23, 2018, 22 pages.

International Search Report and Written Opinion for Application No. PCT/US2018/034645, mailed on Aug. 23, 2018, 15 pages.

International Search Report and Written Opinion for Application No. PCT/US2018/034650, mailed on Aug. 23, 2018, 14 pages.

International Search Report and Written Opinion for Application No. PCT/US2018/034663, mailed on Aug. 23, 2019, 15 pages.

* cited by examiner

VEHICLE MAP SERVICE SYSTEM

PRIORITY CLAIM

The present application is a continuation of U.S. application Ser. No. 16/617,290 having a filing date of Nov. 26, 2019, which is based upon and claims the right of priority under 35 U.S.C. § 371 to International Application No. PCT/US2018/034634 filed on May 25, 2018, which is based on and claims benefit of U.S. Provisional Patent Application No. 62/511,526 filed May 26, 2017. Applicant claims priority to and the benefit of each of such applications and incorporate all such applications herein by reference in its entirety.

FIELD

The present disclosure relates generally to a system for accessing and processing data including data associated with a vehicle map service.

BACKGROUND

Operations associated with geographic information can be implemented on a variety of computing devices. These operations can include processing the geographic information for access and use by a user or computing system. Further, the operations can include sending and receiving data to remote computing systems. However, the types of operations and the way in which the operations are performed can change over time, as can the underlying hardware that implements the operations. Accordingly, there are different ways to leverage computing resources associated with geographic information.

SUMMARY

Aspects and advantages of embodiments of the present disclosure will be set forth in part in the following description, or may be learned from the description, or may be learned through practice of the embodiments.

One example aspect of the present disclosure is directed to a method of operating a vehicle map service. The method can include receiving, by one or more computing devices, vehicle map service data from a plurality of service systems that can include a plurality of client systems associated with a vehicle. The vehicle map service data can include information associated with a geographic area. The method can also include generating, by the one or more computing devices, based at least in part on the vehicle map service data, a local map of the geographic area within a predetermined distance of the vehicle. Further, the method can include determining, by the one or more computing devices, for each client system of the plurality of client systems, one or more portions of the local map to which each client system is subscribed. The method can include sending, by the one or more computing devices, the one or more portions of the local map to which each client system is subscribed to a respective client system of the plurality of client systems.

Another example aspect of the present disclosure is directed to a computing system including: one or more processors; and one or more tangible non-transitory computer-readable media storing instructions that when executed by the one or more processors cause the one or more processors to perform operations. The operations can include receiving vehicle map service data from a plurality of service systems including a plurality of client systems associated with a vehicle. The vehicle map service data can include information associated with a geographic area. Further, the operations can include generating, based at least in part on the vehicle map service data, a local map of the geographic area within a predetermined distance of the vehicle. The operations can include determining, for each client system of the plurality of client systems, one or more portions of the local map to which each client system is subscribed. Furthermore, the operations can include sending the one or more portions of the local map to which each client system is subscribed to a respective client system of the plurality of client systems.

Another example aspect of the present disclosure is directed to one or more tangible non-transitory computer-readable media storing computer-readable instructions that when executed by one or more processors cause the one or more processors to perform operations. The operations can include receiving vehicle map service data from a plurality of service systems including a plurality of client systems associated with a vehicle. The vehicle map service data can include information associated with a geographic area. Further, the operations can include generating, based at least in part on the vehicle map service data, a local map of the geographic area within a predetermined distance of the vehicle. The operations can include determining, for each client system of the plurality of client systems, one or more portions of the local map to which each client system is subscribed. Furthermore, the operations can include sending the one or more portions of the local map to which each client system is subscribed to a respective client system of the plurality of client systems.

Other example aspects of the present disclosure are directed to other methods, systems, devices, apparatuses, or tangible non-transitory computer-readable media for operating a vehicle map service.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
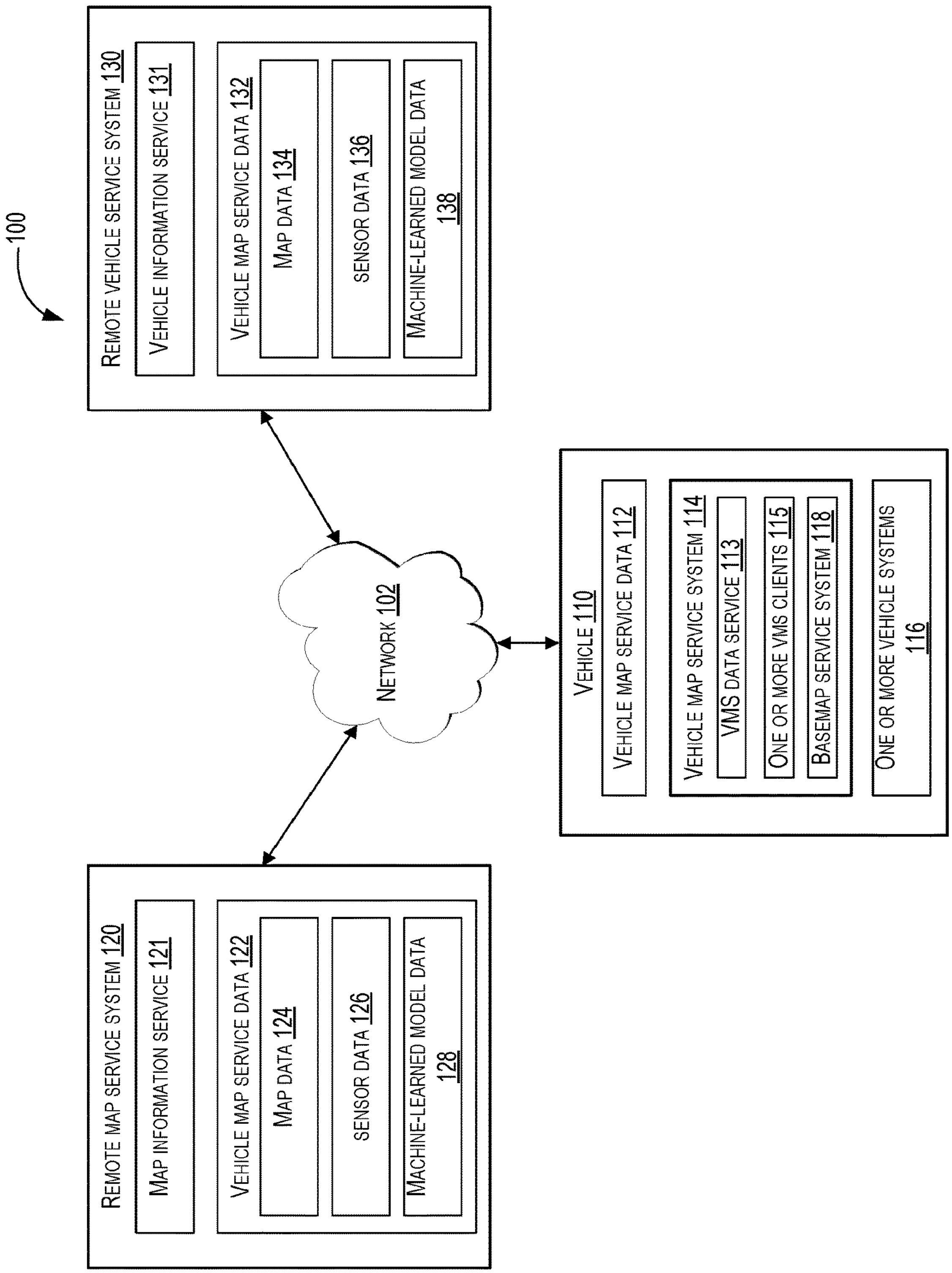
FIG. 1 depicts an overview including an example of a system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a vehicle map service for sending or receiving data (e.g., vehicle map service data including data associated with maps of a geographic area) between service systems including client systems (e.g., vehicle systems) of a vehicle (e.g., any autonomous, semi-autonomous, or manually operated device used to transport or carry people and/or cargo including an automobile, bus, train, aircraft, watercraft, and/or submersible craft) and/or remote computing systems (e.g., remote map service systems including geographic information systems that provide maps; and/or remote vehicle service systems that provide data associated with a vehicle and/or client system).

The disclosed technology can include receiving vehicle map service data (e.g., vehicle map service data including information associated with a geographic area) from remote map service systems (e.g., remote computing systems associated with a geographic information system and/or map provider) and/or vehicle service systems (e.g., remote computing systems and/or client systems associated with a vehicle); generating a local map of the geographic area based on the vehicle map service data including, but not limited to a map of an area within a predetermined distance of the vehicle, a map of an area within a distance the vehicle can reach within a predetermined period of time, a map of an area within a predetermined distance or spatial relationship of the vehicle's current planned navigation path, and/or a map within a predetermined distance or spatial relationship of an alternate navigation path of the vehicle; determining one or more portions of the local map to which each of a plurality of client systems is subscribed; and sending one or more portions of the local map to each client system that is subscribed (e.g., authorized to access a portion of the vehicle map service data). As such, the disclosed technology can more effectively facilitate the exchange of vehicle map service data between various map service systems including remote systems (e.g., remote map service systems and/or remote vehicle service systems) and vehicle client systems. A remote map service system, a remote vehicle service system, and a vehicle map service system are examples of service systems that can provide a vehicle map data service By way of example, the disclosed technology can include a computing system in a vehicle that exchanges (sends and/or receives) data (e.g., vehicle map service data) with one or more remote computing systems (e.g., service systems including remote map service systems and/or remote vehicle service systems) and/or one or more client systems (e.g., vehicle systems) in the vehicle. The client systems in the vehicle may include drivetrain management systems (e.g., a hybrid drivetrain or transmission), driver assistance systems (e.g., a cruise control system or lane keep assist system), vehicle navigation systems, vehicle graphical user interface systems, and/or vehicle security systems, as well as vehicle map service clients that form part of a local vehicle map service system. The computing system can receive data (e.g., vehicle map service data including maps of an area from remote map server devices and/or sensor observations from client systems) from which a local map (e.g., a map of the area within a predetermined distance of the vehicle) is generated. Portions of the local map can then be sent for use by the client systems (e.g., a navigation system display can show the location of the vehicle in the area being travelled through) and the remote systems (e.g., map servers can use the sensor observations of the vehicle as a basis for more accurate maps). Accordingly, the disclosed technology can provide a way to use data from various sources to build a local map of an area that can be used for various purposes including bandwidth maximization, compilation of metrics, and the development of more accurate maps for use by other vehicles.

Further, the vehicle map service system can, through the use and exchange of data harvested from vehicles served by the system, provide improvements in road safety, driver comfort, fuel/energy efficiency, in-dash assistance and autonomous/semi-autonomous driving capability. Also, aspects of the vehicle map service system may, through use and exchange of the harvested data as described herein, ensure that vehicles using the system are in possession of reliable, up-to-date data (e.g. for improved road safety), without placing excessive load on the processing and/or data transfer components of the system.

In some embodiments, the disclosed technology can include a computing system (e.g., a vehicle map service system) that can include one or more computing devices (e.g., devices with one or more computer processors and a memory that can store one or more instructions) that can send, receive, process, generate, and/or modify data (e.g., vehicle map service data) including one or more information patterns or structures that can be stored on one or more memory devices (e.g., one or more random access memory devices) and/or one or more storage devices (e.g., one or more hard disk drives and/or one or more solid state memory drives); and/or one or more signals (e.g., electronic signals). The data and/or one or more signals can be exchanged by the computing system with various other systems and/or devices including a plurality of service systems (e.g., one or more remote computing systems, one or more remote computing devices, and/or one or more software applications operating on one or more computing devices) that can send and/or receive data including vehicle map service data associated with and/or including one or more maps of an area (e.g., a dynamic map representing a geographic area, a static basemap of an area, and/or a map comprising one or more layers with different types of information associated with each layer); the state of one or more client systems that can send or receive data including data associated with: the state of a vehicle; the state of a geographical area being traversed by the vehicle; and/or one or more machine-learned models including machine-learned models associated with the classification of one or more entities (e.g., one or more objects, one or more scenes, and/or one or more events). Further, the plurality of service systems can subscribe to (e.g., receive data and/or obtain access to data) and/or publish (e.g., send data and/or provide access to data) one or more portions of the vehicle map service data. Moreover, client systems including vehicle systems and/or vehicle map service clients can exchange vehicle map service data.

The vehicle map service system can include a data platform that can be used to implement a vehicle map service for sending and/or receiving data (e.g., vehicle map service data including map data, geographic data, sensor data, and/or machine-learned model classification data) to and from service systems including a vehicle (e.g., a vehicle including one or more client systems); a remote map service provider (e.g., a geographic information system provider); and/or a remote vehicle service provider.

The vehicle map service system can receive data including map data, geographic data, vehicle data (e.g., software updates for client systems) from one or more remote data sources (e.g., one or more geographic information system service providers) and/or one or more local data sources (e.g., one or more sensors or other client systems). The vehicle map service system can publish (e.g., send, upload, and/or transmit data and/or information to another device and/or system) harvested information from the vehicle (e.g., sensor data collected by the vehicle) locally to subscribing client systems (e.g., vehicle systems and vehicle map service clients) at the vehicle, or remotely to subscribing entities such as a computing system (e.g., a remote computing system including a cloud computing system) associated with the geographic information system service provider and/or to a remote computing system associated with the vehicle (e.g., a cloud computing system associated with a vehicle manufacturer or other entity).

The vehicle map service system can be used to exchange information with one or more client systems of the vehicle including vehicle systems (e.g., on-board infotainment system, vehicle sensors, cruise control systems, and/or autonomous systems) and vehicle map service clients. Vehicle map service clients may include clients that perform particular functions for the vehicle map service system, such as providing a basemap or local map, providing a local coordinate frame, and/or dynamically providing and harvesting information in association with the vehicle map service system. Further, the vehicle map service system can communicate (e.g., send, receive, and/or process data) with on-board vehicle client systems (e.g., sensors and other vehicle systems) associated with the vehicle through an in-vehicle network.

In some embodiments, a vehicle map service protocol can specify how data and/or information is sent and/or received among the various systems, devices, and/or components associated with the platform. A vehicle map service client system can include any system, device, and/or software application that subscribes to receive information in the vehicle map service system. The vehicle map service protocol can, in some embodiments, be in the form of data layers. The data layers can be used to communicate information associated with map data as well as one or more sensor outputs (e.g., sensor observations) from various service systems. Further, the service systems can subscribe to and/or publish data (e.g., the vehicle map service data) on different data layers. The use of layers in this way can allow for more efficient communication of data, whereby only the required layers (e.g. those that include new and/or updated information) are transferred between service systems.

In some embodiments, service systems can consume information from other service systems, add their logic or inputs from external sources, and/or publish the new information. In situations in which a client consumes and publishes the same layer, other subscribers of the layer may receive data including the raw layer data (e.g., data that is received from the layer without processing or modification) and processed layer data (e.g., data that is received from the layer after being processed or modified). Accordingly, a client can subscribe to a layer without receiving conflicting, redundant, and/or irrelevant data from other layers.

In some embodiments, one of the map service systems (e.g., a geographic information system service provider or other map providing entity) and/or vehicle service systems can provide access to a library of machine-learned models (e.g., machine-learned models used to classify and/or recognize entities including objects, scenes, and/or events). The machine-learned models can then be deployed in a variety of configurations by devices or systems that are used to detect and/or recognize entities with locations in the world (an entity being a physical object, scene, or event). The library of machine-learned models can be maintained as a database including a publicly accessible database (e.g., a database that is accessible to the public without the use of security credentials) or a proprietary database (e.g., a database that is not accessible to the public without the use of security credentials), and can include models contributed by multiple providers. Further, users of the machine-learned model library can contribute data (e.g., field collected data including machine-learned models, metrics associated with the performance of the machine-learned models, and/or training data including sensor observations) back to the machine-learned model library for use in the development of new or modified machine-learned models.

By way of example, the plurality of service systems can include: one or more vehicle map service systems of a vehicle that can send and/or receive vehicle map service data; one or more remote map service systems including a cloud computing system associated with a geographic information system service provider ("a geographic information system cloud"); and/or one or more remote vehicle service systems associated with a vehicle provider, vehicle service provider, or vehicle manufacturer ("vehicle cloud"). Further, any of the plurality of service systems (e.g., the geographic information system cloud and/or the vehicle cloud) can be implemented using a cloud computing platform. As noted above, each of the map service systems may be a producer and/or a consumer of information and as such, may be referred to a client.

In some embodiments, each of the plurality of service systems can store and/or execute instructions used to implement an embedded vehicle operating system associated with the geographic information system service provider. The vehicle operating system can be, for instance, an operating system implemented for use with automotive vehicles. Further, the vehicle operating system can be adopted for use by vehicles with or without a vehicle map services application.

The embedded vehicle operating system can be used to implement a vehicle map services application that can be used, for instance, to provide information and services including: destination search, route planning, turn-by-turn navigation, estimated time of arrival (ETA) information, traffic/incident information, voice integration, personalization and integration with voice command search, caching for offline data, software update support, and/or application programming interfaces (APIs) supporting third-party navigation applications. The embedded vehicle operating system can implement mapping applications and/or services in a stack that can be arranged from a high level to a low level.

The vehicle map services application can be associated with and/or include a mapping service layer, a mapping service application, and/or data services. The mapping service application can include a user-facing application configured to present graphic information (e.g., maps, navigation routes, results, and/or data) from a geographic information system to a user of the vehicle. Information presented by the vehicle map services application can include a current destination, current ETA, current route and turn, lane guidance, current road and/or road attributes. Further, the information from the mapping service layer can be provided on an output device located within the vehicle (e.g., infotainment system, vehicle display, and/or dashboard display).

The mapping application can include mobile services, mobile APIs, frameworks, and technologies (e.g., map APIs and other APIs for interfacing with geographic information services provided by the geographic information system service provider). The data services can include framework-level management of data caches (e.g., maps and/or other data) and communications with networks and the rest of the vehicle. In some embodiments, the vehicle map service system can include a real-time operating system to manage systems related to the vehicle's hardware in real-time.

In some embodiments, the remote map service systems can include a geographic information system cloud computing system that is used to implement software and services maintained by a geographic information system service provider, such as a geographic information system. The geographic information system can include map data, navigation information, traffic information, and information and services such as destination search, route planning, turn-by-turn navigation, estimated time of arrival (ETA) information, traffic/incident information, voice integration, personalization and integration with voice command search, caching for offline data, software update support, and/or APIs supporting third party navigation applications.

In some embodiments, the remote vehicle map service systems can include a vehicle cloud that can implement a service maintained by an entity associated with a vehicle or other third party, such as a vehicle manufacturer or other entity. Data (e.g., vehicle map service data) can be exchanged between the remote map service systems (e.g., the geographic information system cloud computing system), the remote vehicle service systems (e.g., the vehicle cloud computing system), and/or one or more vehicle map service systems to implement various aspects of a vehicle management system. Example vehicle map service data that can be sent and/or received among the map service systems (e.g., the geographic information system cloud computing system, the vehicle cloud computing system, and/or the vehicle) and/or among individual clients within a map service system can include: dynamic map data (e.g., real-time or near real-time data including locations of other vehicles, traffic speeds, traffic incidents, road and lane blockages, potential hazards, and/or parking information); navigation information and map-matched state data (e.g., current destination, current route and route step, current ETA and route traffic, current matched road and road information (including speed limit, speed, or lane information)); road network data in some radius around the vehicle (e.g., road geometry, lane count and/or lane attributes, road attributes, road slope, traffic control devices, such as traffic lights or stop signs, information associated with nearby landmarks (to aid with localization and/or map matching)); and/or training data for machine learning models/algorithms. Data exchanged between the map service systems (e.g., the vehicle cloud and the geographic information system cloud) can include, for instance, access to a more complete map database and/or planning services. Further, the vehicle map service data can also include training data for machine learning models.

Data can also be communicated between the vehicle map service system and the remote map service system (e.g., the geographic information system service provider) and/or the remote vehicle service system (e.g., the vehicle cloud computing system). For instance, the vehicle map service data sent from the vehicle map service system to the remote map service system and/or the remote vehicle service system can include data associated with raw location state (e.g., global positioning system (GPS) location and accuracy, vehicle velocity, vehicle course and heading, and/or other sensor information including gyro information); map-based location state (e.g., map registered position, course, heading, speed, and/or accuracy, lane data, lane-registered position, lane accuracy, parking state, and/or parking location); sensor-based map updates (e.g., lane boundaries, sign locations and text, road markings, traffic control device locations and types, and/or hazards); vehicle analytics, and/or other vehicle data. This data can be used, for instance, to provide information for the geographic information system service provide services (e.g., traffic information) and/or for services implemented at least in part using the vehicle cloud.

In some embodiments, data exchanged between the remote map service system (e.g., geographic information system cloud) and the other map service systems can include map updates. The map updates can include map data and traffic data, synchronized through the vehicle services application into local memory and caches. Some of the map update data may be sent to the vehicle operating system as part of vehicle-internal protocols.

In some embodiments, data exchanged between the remote map service systems (e.g., the geographic information system cloud) and the vehicle service systems can include sensor observations from sensors located on the vehicle. Further, the sensor observations can be represented as a local map representation sensed by the vehicle (e.g., lists of objects and/or markings observed), in a format compatible with the data provided from the remote map service systems. In some embodiments, the sensor observations can be represented as a delta (e.g., a difference or change) from the data provided from the geographic information system cloud (e.g., anomalies and new observations).

In some embodiments, data exchanged between the map service systems can include tracks information. The tracks information can include location and route tracking, with location data passing from vehicle to mapping services to the geographic information system cloud, and route data passing from the mapping application to the map service systems (e.g., the geographic information system cloud). Locations can include raw positional data (GPS), and/or map-matched data in relation to the map and route available to the vehicle (e.g., describing progress along the current road, lane, and/or route).

In some embodiments, data exchanged between the remote map service systems (e.g., geographic information system cloud) and the vehicle map service systems can include data used to implement geographic information services, such as navigation services. The geographic information services can include any services associated with the operation of the map service system including remote geographic information system services made available to the mapping service to enable navigation, including search and/or directions.

The data and/or services exchanged between the remote map service systems (e.g., geographic information system cloud) and the remote vehicle service systems (e.g., the vehicle cloud) can include data associated with services made available to third parties by the geographic information system service provider, including through various APIs. The data can include updates exchanged between the geographic information system and the vehicle cloud. The data can also include data associated with any corrections or suggested edits that the vehicle entity or other third party would like to submit to the geographic information system service provider. In some implementations, a pipeline can be implemented to evaluate and receive these suggested edits and provide credit to the third party for quality improvements.

In some implementations, a local data service provided as part of a vehicle map service system can communicate (send, receive, or process) data or information described in terms of a local map. The local map can be described as a semantic map of some area surrounding the vehicle, describing objects around the vehicle, object attributes, and/or connections between objects. Further, the local map can be described in terms of a local coordinate system and ID space. The local map can be predefined based on geographic information system data or supplemented with live observations from vehicle sensors.

In some embodiments, communication between the client systems and/or map service systems can occur via a vehicle map service protocol that allows the construction and sharing (e.g., sending and/or receiving) of mapped objects associated with a dynamic model of the area surrounding the vehicle (e.g., a local map of the geographic area within a predetermined distance of the vehicle). The vehicle map service protocol can provide a common language and world model for map data providers and consumers (e.g., map service systems that subscribe to or publish one or more portions of the vehicle map service data, the map service systems including basemap providers and traffic data providers) that can be used by one or more vehicle map service systems including one or more sensors and/or an operating system (e.g., a real-time operating system) of the vehicle. Further, communication of data can be sent and/or received through a local data service that manages the flow of data (e.g., vehicle map service data) between service systems by capturing data from providers (e.g., vehicle map service data publishers) and re-broadcasting data to subscribers (e.g., vehicle map service data subscribers).

In some embodiments, the vehicle map service protocol can describe positions and/or geometry in local coordinates (e.g., Cartesian coordinates). The local coordinates can be less complex and more compact than global coordinates. However, in some implementations, determining local coordinates may include the use of a global reference.

In some embodiments, global coordinates can use the world geodetic system, referencing the world geodetic system 1984 (WGS84) standard. Using the world geodetic system, coordinates can be described by latitude, longitude, and altitude. Altitude can be referenced according to the Geoid as a distance above sea level, in the direction normal to the WGS84 ellipsoid.

In some examples, the range of data that is used can be limited to a vehicle horizon. In such examples, positional data can be described in terms of Cartesian coordinates relative to the current location using a local coordinate system. The local coordinate system can be described in terms of a tangent plane centered around a given point on the surface of the earth, described in terms of a set of reference points (e.g., x, y, and z reference points corresponding to latitude, longitude, and altitude respectively, in which altitude is a distance above sea level on the geoid).

Points on the tangent plane can be described in terms of a right-handed coordinate system in which positive x is east, positive y is north, and positive z is pointing away from the surface. The reference point can be within some maximum distance from the vehicle's current location. Further, the reference point can shift as the vehicle moves, to preserve local precision. In some embodiments, the coordinate system can be stable around the same point for some period of time (e.g., a time period of two seconds, two minutes, or an indefinite time period), while in other embodiments, the reference point can shift at every vehicle position update.

In some embodiments, a vehicle's position can be translated into the local Cartesian coordinate system and represented as a 6 degree of freedom pose within that space. The vehicle's pose can be centered on an x, y, z position which can include a position on the base of the vehicle, directly under the center rear axle or an approximation of rear axle position given knowledge of the vehicle and relative position of sensors used to derive position. In local vehicle coordinates, x can be pointing to the front of the vehicle, y to the left, and z upwards. Yaw, pitch, and roll, can be used in the x'-y'-z' sense of nautical angles to describe the vehicle's angular position.

In some embodiments, mapped objects can be referenced by a locally unique identifier (e.g., object ID) that can be assigned by a remote map service system (e.g., a geographic information system (GIS) service provider or other map provider). Some IDs can be relative to a parent object. For example, a lane ID can be a simple index in relation to a parent road segment.

In some embodiments, dynamically sensed objects may also have an ID, or may describe their location in relation to an ID on the map (such as the ID of a road segment a vehicle is traveling on). This ID can be assigned by the client that originally published the sensed object. If sensors detect a new object that was not previously mapped, a local ID may be generated in order to track subsequent observations about the same object from frame to frame. Otherwise, if the sensor package can conflate the observed object with a basemap object from a basemap provider, it can use that ID to indicate that the object is the same object. Further, in some embodiments a basemap provider can broadcast a message that two or more distinct IDs can be determined to be the same object.

Given a local ID space, IDs can be set to be unique within the current set of objects being tracked and broadcast by its provider, and also unique within the duration of an epoch that can be defined by the provider (e.g., a vehicle map service client system including a remote map service system) and associated with each packet generated by that provider. Within an epoch, the properties and/or state of a given object with the same ID can remain the same. Accordingly, as long as the provider's epoch remains steady, other clients can hold onto IDs as stable references to an object, and can consistently cache and cross-reference information about that object between different packets and different layers by its ID. A change of epoch can be an indication from the provider that the state of that provider's world has changed, that the provider is switching to a new world model, and that any new information will be broadcast in the new epoch and the older epoch has ended. The client can start rebuilding its data cache from that provider, if any, with data from the new epoch.

In some embodiments, the vehicle map service protocol allows for the existence of multiple, ambiguous, and partial views of the world to be maintained and broadcast simultaneously by different client systems. This can allow for the data fusion client to act as a medium for client systems that receive vehicle map service data associated with multiple partial views or observations of the world and fuse them into more accurate and/or higher-level forms that are in turn available to other vehicle client systems. Such processing client systems can include local conflation of different data sources, including de-duping and map matching algorithms.

In one example application, these same frameworks and protocols can benefit additional client systems, including a dashboard camera client system (e.g., a client system used to send data from an image capture device mounted on a vehicle). As such, the dashcam client system can benefit from local data for safety and heads-up display features, and generate local data from camera observations.

In some implementations, the client systems can communicate data using a publish/subscribe model, in which the client systems can either publish data to the vehicle service system or subscribe to data from the vehicle service system. Further, client systems can subscribe to map layers of interest (road segments, signs, and/or locations of other vehicles), and can also be aware of which map layers have subscribers, and thus what data to publish. The data that is shared can depend on a combination of subscriptions and the vehicle's position and situation, which determine the map areas of interest.

In some embodiments, a local window of map data can be continually published relative to a vehicle's current location. The local window of map data (e.g., a local map) can, due to smaller size, be easier to index. The subset of the map data that is shared with the vehicle and/or vehicle client systems can be referred to as a vehicle horizon, which can include a range of data that is relevant to the vehicle and/or vehicle client systems.

The scope of the vehicle horizon can incorporate estimates about in-vehicle communication lag or outages. If the vehicle map service system hits a gap in receiving map data, the vehicle can still have a buffer of data that has been cached (e.g., multiple seconds worth of data). In some implementations, the vehicle can be resilient to a complete interruption of map data ahead of the current horizon.

In some embodiments, the vehicle horizon range can support an in memory cache to provide resilience against lag and system outages in populating that horizon. Prior map data populated into the vehicle horizon can be receive from another map service system (e.g., a remote map service system and/or a remote vehicle service system), but except for the most dynamic data (e.g., traffic) can be populated without connection to a remote computing system. Static data populated into the horizon can come from a local cache (e.g., a cache stored in a storage device in the vehicle), in which a large geographic area's data can be pre-populated to the vehicle on a periodic basis (e.g., hourly, daily, and/or weekly).

As the vehicle moves and the vehicle horizon shifts, new data can be broadcast to fill in the leading edge of the horizon. Individual publishers can use an epoch system to indicate data changes that require subscribers to flush their data caches as some types of data may churn (e.g., update) more frequently than others.

In some embodiments, static map entities (roads, lanes, and/or intersections) and dynamic map entities (other vehicles, hazards) can be represented in the data model and different providers may contribute different types of data to the aggregate map. Further, the vehicle client systems can continually publish information about the current physical and semantic (segment/lane) location of the vehicle using data fused from sensors and the basemap, which can be updated on each positioning system refresh.

In some embodiments, the vehicle map service data can be organized into layers, with each layer representing a type of information or data that is encapsulated into a single object or set of objects. Different vehicle client systems can subscribe to or publish different layers (e.g., more fully featured vehicles with more advanced vehicle client systems can subscribe to and publish a greater set of layers). For example, a simpler client system may focus on a set of attributes including road attributes or on-road locations, while a more advanced client system may focus on a greater set of attributes that also includes lane attributes and lane-registered locations. Client systems can subscribe to layers via the vehicle map service system, which can inform provider client systems of which layers are of interest. Each provider client system can then determine which layers it will provide.

In some embodiments, the data format for a layer can be described by a versioned data model in which client systems can subscribe not only to a layer but a particular version of a layer. This can facilitate interactions between different generations of hardware, as an older client system can cause a newer publisher to produce older format packets, and a newer client will either be able to understand an older publisher's packets or will not "see" data from that publisher. As such, the compatibility between different generations of client systems/publishers may be provided. This may allow older client systems to utilize the vehicle map service system even when other client systems have been upgraded. In turn, this may ensure that older vehicles are still able to utilize the system and so obtain the (e.g. safety) benefits, without requiring complex (e.g. hardware) upgrades. In some embodiments, upon release a particular version of a layer's packet in the data model can be subject to modification or configured so that it will not be modified.

In some embodiments, the protocol and the mechanisms for in-vehicle communication about a local map can be an open standard which can be implemented by multiple mapping providers. By following a standard, in-vehicle systems can be agnostic to the data provider, which can allow the same vehicle to work in multiple territories or configurations. Since the data may, in some instances, be used for controlling aspects of the operation of the vehicle, the use of a standard may therefore improve road safety for vehicles which cross between different territories or configurations.

In some embodiments, the remote map service system (e.g., the geographic information system) can contribute symbolic data, including the road graph or road attributes, and the vehicle can contribute more geometric data, including vehicle or sign locations. Some objects can be described by the remote map service system and observed by the vehicle map service system (e.g., a map representation of a sign combined with a dynamic sensor observation of the sign). Further, in the case of multiple observations, the service systems can conflate multiple observations into a single object. That conflation may be aided by common object semantics.

In some embodiments, given an approximate (within a predetermined approximation threshold) vehicle position, the vehicle map service system can determine an approximate area of interest on the map, and set or adjust the local coordinate system around the vehicle position (e.g., the current location of the vehicle). For example, the vehicle map service system can determine an approximate vehicle position by determining the position of the vehicle with respect to the location of a landmark with a known location (e.g., GPS coordinates for a government building). Further, the vehicle map service system can translate the vehicle pose (e.g., a vehicle's position and direction) into the local coordinate system. The vehicle map service system can then determine the vehicle's horizon, and load map data from the local cache around that horizon. For example, if the vehicle's direction of travel is due north, the vehicle's horizon will load map data associated with the areas to the north of the vehicle. The vehicle map service system can translate geometric data into the local coordinate system. For example, the position of the vehicle relative to objects in the area can be translated into a latitude and longitude. Given the vehicle's subscriptions, it can operate based on the road graph, geometry, and attributes. The map data for the current region can be downloaded before use from a map provider, so it can be available and up to date.

Furthermore, the vehicle map service system can listen to the route and publishes the route ahead in terms of IDs on the local map. This can help to inform map matching. The vehicle map service system can then match the vehicle to the roads on the map, factoring in vehicle pose, pose history, and the route. It publishes a map match data layer using the result. This can provide a map-matched position back to the remote map service system (e.g., the geographic information system), thereby providing improved certainty about the state of local traffic.

In some embodiments, the vehicle map service system can access a local set of map data including road centerlines, a road graph, road attributes, the current plan, and a map matched position. The vehicle map service system can use this set of map data for features including improved cruise control or a heads up display showing the current road speed limit. The vehicle map service system can also include or interface with a camera or other sensor that can be used to detect speed limit signs. When the vehicle map service system detects a speed limit sign, it can display that sign on the heads up display. Additionally or alternatively, it can use the speed limit in the local map. The vehicle map service system can publish its sign observations as a vehicle-provided sign data layer. The vehicle map service system can assign a locally generated ID to each unique sign it observes to allow the same sign to be tracked over time. The vehicle map service system can also listen to the vehicle client systems sign observations and compare them with the map. Some of those signs may match sign descriptions already in the map. Others are supplemental or inconsistent with the map. The vehicle map service system can merge in local sign observations including data from the map cache in the remote map service system (e.g., the geographic information system) frameworks.

In some embodiments, the vehicle map service system can analyze the sign observations from the vehicle sensors and send the sign observations to the remote map service systems to improve the vehicle map service data. Further, the vehicle map service system can prioritize new and conflicting observations, but might also send confirming observations as a vote of confidence. The new or conflicting sign observations can be sent to the remote map service systems and can be added to the remote map service system model of the world.

In some embodiments, the vehicle map service system can utilize positional sensors to determine positional type data including a GPS position, wheel speed, or heading. The positional type data can be shared with other client systems (e.g., vehicle systems) including embedded automotive systems through traditional in-vehicle communications.

In some embodiments, the vehicle map service system can send or receive data (e.g., vehicle map service data) that is structured according to a vehicle map service protocol. The vehicle map service protocol can specify a format for various types of data including data associated with a map and/or model of a geographic area and/or one or more features of the geographic area (e.g., roads, landmarks, buildings, parking areas, speed limits, and/or traffic flows).

The plurality of machine-learned models in the machine-learned model library can be based in part on a training dataset associated with a plurality of classified object labels and object data comprising information associated with a corresponding plurality of objects; a plurality of classified scene labels and scene data comprising information associated with a corresponding plurality of scenes; and/or a plurality of classified event labels and event data comprising information associated with a corresponding plurality of events. Further, the plurality of machine-learned models can include machine-learned models that are generated using a classification dataset including classifier data that includes a set of classified features and a set of classified object labels associated with training data that is based on, or associated with, a plurality of training inputs used to train the machine-learned model to achieve a desired output (e.g., detecting one or more objects, one or more scenes, and/or one or more events). The classification dataset can be based in part on inputs to one or more sensors (e.g., camera inputs and/or radar inputs to a vehicle client system) that have been used to generate one or more sensor outputs. For example, each of the machine-learned models can be created using a set of image sensors that capture training data including still images and video from one or more geographic areas over a period of time. Further, the plurality of machine-learned models can include a neural network, a convolutional neural network, a support vector machine, and/or a decision tree.

According to example aspects of the present disclosure, one or more map service systems which can include a remote map service system (e.g., a geographic information system service provider), can provide access to a library of machine-learned models that can be used for various purposes including detecting and/or recognizing entities including physical objects, scenes, or events. For example, the machine-learned model can be trained to recognize various objects including road signs, traffic signals, and/or road markings. Further, the machine-learned models can be deployed in a variety of configurations by devices used to recognize entities (e.g., entities including a physical object, a scene, or an event) with locations in the world. The machine-learned model library can be maintained as a database including a publicly accessible or privately secured database, and can include machine-learned models contributed by multiple providers. The machine-learned model library can also be configured to receive field collected data that can be added to the machine-learned model library for use in improving the machine-learned models.

In some embodiments, the machine-learned models in the machine-learned model library can share certain common properties, including: the ability to detect entities in the world based on input from one or more sensors (e.g., one or more sensors including one or more cameras, one or more LIDAR devices, one or more microphones, one or more sonar devices, and/or one or more radar devices); the ability to classify entities into common categories (e.g., to classify an object as a vehicle or a pedestrian, to classify a scene as an urban scene or a rural scene, or to classify an event as a traffic signal state change); the ability to determine critical attributes of an entity that can be used to describe the entity (e.g., classifying a vehicle based on the vehicle's size); and/or the capability of estimating the location (e.g., the absolute location) and pose of an entity in the world, given a reference point for the observation.

Each machine-learned model can be trained to output entity descriptions conforming to a standard. The standard can organize machine-learned models by various properties including entity type; entity attributes by type; entity pose or location; time of observation; and confidence of observation. To facilitate searching the machine-learned model library, a vehicle map service client system accessing the machine-learned model library can search for machine-learned model based on the corresponding entity descriptions.

For example, the machine-learned model library can be searched based on a variety of criteria, including: the type and attributes of entities that are recognized by a machine-learned model; the sensor configuration associated with a machine-learned model; the computing capabilities of a map service system associated with a machine-learned model (e.g., processors capabilities and/or storage capabilities); the system type of a map service system associated with a machine-learned model (e.g., embedded system and/or cloud computing system); a minimum quality and confidence of each observation; and a restriction on the use a machine-learned model (e.g., authorization to use different portions of the machine-learned model library based on demand, ease of deployment, and/or available resources).

In some embodiments, field collected data from a map service system can include: machine-learned models for a given configuration; training data to support machine-learned model development; validation and testing or quality results on machine-learned models; and new types of entity descriptions. Further, the map service systems can contribute to the machine-learned model library as they use the machine-learned models throughout, for instance, a fleet of vehicles based on varying contribution tiers. These contribution methods can be implemented in a privacy preserving way including: contributing a set of on-device entity inferences across their fleet; federated learning across the fleet, such that machine-learned models can be updated on-device without imagery and sensory data leaving the vehicles; and/or contributing imagery and sensory data sampled from fleet vehicle drives.

The machine-learned model library can be supported by the vehicle map service system that manages the machine-learned model library in various ways including: contribution of machine-learned models to the machine-learned model library; definition of standards for defining entities in the world; support for training and validation through externally stored assets; techniques for clustering multiple observations of a single entity; infrastructure support for accessing data and training machine-learned models at scale; and/or leveraging the output of the machine-learned models for use as a common standard supporting an ecosystem for exchange.

By way of example, a machine-learned model can be used to detect speed limit signs and determine the speed limit indicated on the speed limit signs. For example, the machine-learned model can receive input from a camera that can be mounted in a vehicle (e.g., a camera embedded into the vehicle or included as an add-on such as a dash camera). When a sign is detected by the camera, an onboard processor can use the machine-learned model to recognize the sign as a speed limit, and determine the speed limit based on the text on the sign. Sign data can then be generated based on the sign information (e.g., sign information including the speed limit). The sign data can be used in various ways including: outputting the sign data for use in an in-vehicle display to display the speed limit to the driver; using the sign data to limit a cruise control system; and a harvesting system of a vehicle client system associated with the vehicle can upload the speed limit contents and location in order to update speed limits on a map.

After recognizing a sign, the machine-learned model can generate an output that can be described as part of a speed limit sign protocol. The speed limit sign protocol can be populated with fields including: a speed limit value (e.g., one hundred kilometers per hour); a location or pose of the speed limit sign; a location of the speed limit sign relative to the vehicle location; and/or a confidence of observation including a confidence that the speed limit sign was recognized correctly and/or a likely error of parsed text and estimated location.

As part of the speed limit sign protocol, common values such as location and confidence can use descriptions common to other types of entities that can be detected, such as other types of signs or physical objects that can be detected by one or more sensors associated with the machine-learning model. As a result, the speed limit protocol can be composed of multiple standard messages including: a text description; a location description; a standardized pose; a standardized confidence (e.g., a confidence value according to a standardized metric for confidence), probability envelope, and/or probability distribution; and/or a standardized object confidence description.

In some embodiments, the machine-learned model library can be indexed to facilitate searching for machine-learned models according various parameters, including: regions (e.g., some United States region signs are different from some United Kingdom signs); sensor configuration including a camera type, camera resolution, and/or camera quality; computing system configuration including whether the computing system can operate embedded, the available computational resources, and the environment in which the computing system operates; and/or a confidence threshold associated with confidence in the quality or accuracy of a machine-learned model or the output of a machine-learned model.

The vehicle map service system can receive vehicle map service data from a plurality of service systems including a plurality of remote map service systems (e.g., geographic information systems and vehicle manufacturer service systems), a plurality of remote vehicle service systems, and/or a plurality of client systems including vehicle systems associated with a vehicle (e.g., in-vehicle navigation systems). Furthermore, the vehicle map service data can include information associated with a geographic area. For example, the vehicle map service data can include one or more maps In some embodiments, the vehicle map service data can be in accordance with a vehicle map service protocol associated with sending or receiving information between the plurality of service systems including between the plurality of remote computing systems (e.g., the plurality of remote map service systems and/or the plurality of remote vehicle service systems) and the plurality of client systems. For example, the vehicle map service protocol can include a standardized format that can be used for communication by the different service systems.

In some embodiments, the vehicle map service data can include information associated with one or more sensor outputs of the plurality of client systems (e.g., vehicle systems including sensor outputs from one or more LIDAR devices, sonar devices, radar devices, cameras, and/or microphones); one or more maps provided by the plurality of service systems (e.g., maps of the geographic area including the area traversed by the vehicle); and/or one or more machine-learned models (e.g., machine-learned models that can be used for detection and/or recognition of one or more objects or features of the geographic area).

In some embodiments, the plurality of service systems can include one or more geographic information systems or one or more remote vehicle service systems. The one or more geographic information systems can be associated with the vehicle map service data including one or more maps. The one or more remote vehicle service systems can be associated with the vehicle map service data including information associated with the plurality of client systems.

In some embodiments, the vehicle map service data can include a plurality of map layers in which each layer of the plurality of layers is associated with one or more states of the geographic area.

In some embodiments, the one or more states of the geographic area can be associated with a plurality of properties including a location of the vehicle, one or more road segment locations, one or more lane locations, and/or one or more sign locations.

The vehicle map service system can generate, based at least in part on the vehicle map service data, a local map of the geographic area within a predetermined distance of the vehicle. For example, the vehicle map service system can generate a map of the geographic area within a ten kilometer radius of the vehicle.

In some embodiments, the local map can include a dynamic model of the geographic area surrounding the vehicle. The dynamic model can include a real-time location of the vehicle in relation to one or more objects external to the vehicle. Further, the dynamic model of the geographic area can change as the state of the vehicle and objects (e.g., other vehicles) in the geographic area changes.

The vehicle map service system can determine, for each client system of the plurality of client systems, one or more portions of the local map to which each client system is subscribed. For example, the vehicle map service system can maintain data associated with the plurality of client systems that are subscribed to one or more portions of the vehicle map service data. Further, the vehicle map service system can send requests to the plurality of client systems to determine whether the plurality of client systems are subscribed to the one or more positions of the vehicle map service data The vehicle map service system can send the one or more portions of the local map to which each client system is subscribed to a respective client system of the plurality of client systems. For example, the vehicle map service data may include data associated with an estimated time of arrival to a destination. The vehicle client system associated with an in-vehicle device that displays trip status can be subscribed to the portion of the vehicle map service data associated with the estimated time of arrival and can receive that data on a continuous basis so that riders of the vehicle may know the status of the trip.

In some embodiments, the vehicle map service system can determine a vehicle horizon based at least in part on a geographic location of the vehicle. The vehicle horizon can include the one or more portions of the local map and/or the one or more portions of the vehicle map service data that are provided to any of the plurality of client systems. Further, the vehicle horizon can include an amount of the vehicle map service data that is sent or received between the vehicle and the plurality of service systems (e.g., the plurality of remote map service systems). For example, the vehicle horizon can indicate a number of bytes per second that a vehicle map service client system can receive.

In some embodiments, the vehicle map service computing system can determine the plurality of client systems that can publish one or more portions of the vehicle map service data to other client systems of the plurality of client systems. Publishing can include sending the one or more portions of the vehicle map service data to the plurality of client systems that are subscribed to the one or more portions of the vehicle map service data. Further, the vehicle map service system can publish the one or more portions of the vehicle map service data to the other client systems or the plurality of service systems (e.g., the plurality of remote computing systems).

In some embodiments, publishing the one or more portions of the vehicle map service data can include determining the one or more portions of the vehicle map service data that have changed since the one or more portions of the vehicle map service data were most recently published. The vehicle map service system can then publish the one or more portions of the vehicle map service data that have changed since the one or more portions of the vehicle map service data were most recently published.

In some embodiments, the vehicle map service system can determine one or more protocols of the vehicle map service data that are incompatible with a client system of the plurality of client systems (e.g., one or more protocols that the plurality of client systems are unable to decipher or use). Further, the vehicle map service system can modify the one or more protocols that are incompatible to a format that is compatible with a client system of the plurality of client systems. For example, the vehicle map service system can access data including a lookup table that can be used to determine the incompatible protocol and convert the portions of the incompatible protocol for use by the incompatible client system.

In some embodiments, the one or more portions of the vehicle map service data can determine an epoch associated with a time period during which the one or more portions of the vehicle map service data is valid. For example, the one or more portions of the vehicle map service data older than a particular epoch may not be valid.

Furthermore, in some embodiments, the vehicle map service system generating, based at least in part on the vehicle map service data, a local map of the geographic area within a predetermined distance of the vehicle can include excluding one or more portions of the vehicle map service data associated with epochs that have ended (e.g., are outdated).

The vehicle map service system can generate a graphical user interface associated with the local map. For example, the graphical user interface can display representations (e.g., one or more symbols including text or images) of the vehicle map service data on a display device of the vehicle. Further, the graphical user interface can include representations of one or more portions of the local map.

The vehicle map service system can determine, for each of the plurality of vehicle client systems, a maximum transmission rate at which the vehicle map service data can be received. Further, responsive to receiving a request for the vehicle map service data from a client system that is subscribed to one or more portions of the vehicle map service data, the vehicle map service system can send, based at least in part on the maximum transmission rate for each of the plurality of client systems, the one or more portions of the vehicle map service data to the client system.

In some embodiments, each of the one or more portions of the vehicle map service data can be associated with a confidence value, probability envelope, and/or probability distribution. Further, in some embodiments, the confidence value, probability envelope, and/or probability distribution can be indicative of the accuracy of the respective portion of the vehicle map service data. Further, the vehicle map service system generating, based at least in part on the vehicle map service data, a local map of the geographic area within a predetermined distance of the vehicle can include generating the local map based at least in part on the one or more portions of the vehicle map service data associated with a confidence value, probability envelope, and/or probability distribution that exceeds a confidence threshold.

In some embodiments, the vehicle map service system generating, based at least in part on the vehicle map service data, a local map of the geographic area within a predetermined distance of the vehicle can include comparing the one or more portions of the vehicle map service data received to the vehicle map service data that was received at a previous time.

Further, the vehicle map service system can determine the one or more portions of the vehicle map service data that match the vehicle map service data received at the previous time (e.g., the vehicle map service data that has not changed). The vehicle map service system can then update the one or more portions of the vehicle map service data that do not match the vehicle map service data received at the previous time.

The vehicle map service system can determine the one or more portions of the vehicle map service data that conflict (e.g., the one or more portions of the vehicle map service data that are contradictory). Further, the vehicle map service system can send conflict data identifying the one or more portions of the vehicle map service data to the plurality of service systems. For example, the conflict data can include information associated with the type of data that conflicts and the service systems associated with the conflicting data.

The systems, methods, devices, and tangible non-transitory computer-readable media in the disclosed technology can provide a variety of technical effects and benefits to operation of a vehicle map service system associated with service systems including a vehicle, vehicle client systems, remote map service systems, and/or remote vehicle service systems, through use of a computing system that facilitates more efficient exchange of information that can be used to use vehicle map service data for a variety of purposes including generating a local map of an area traversed by a vehicle, exchanging vehicle state information, and receiving software updates.

The disclosed technology can improve the safety of operating a vehicle (e.g., an autonomous vehicle, a semi-autonomous vehicle, and/or a manually driven vehicle) by more effectively sending and receiving data associated with the state of the vehicle (e.g., the location of the vehicle, sensor observations from the vehicle, and the state of client systems including vehicle systems) and the state of the environment external to the vehicle (e.g., one or more maps and other information that can be used to determine the state of the environment around the vehicle). For example, the disclosed technology can prioritize data so that safety critical client systems (e.g., vehicle systems) can receive data more frequently than non-safety critical client systems.

Further, the disclosed technology can include a data protocol (e.g., a vehicle map service protocol) that can be used by different systems to efficiently exchange data. Further, the disclosed technology can convert different protocols used by external systems into a more standardized protocol that can be used by various vehicle client systems.

The disclosed technology also offers the benefits of more efficient use of data that can conserve network bandwidth by selectively providing different portions of the vehicle map service data to different client systems (e.g., vehicle systems) and remote computing systems. For example, the disclosed technology can allocate more bandwidth for use by client systems that are critical to the operation of the vehicle (e.g., navigation systems) than for client systems that are non-critical with respect to vehicle operation (e.g., in-vehicle entertainment systems).

Additionally, the disclosed technology can generate improved maps by combining map data received from remote map service systems with sensor observations from the vehicle client systems. The combination of external map data with internally generated sensor data can be used to create a local map of an area being traversed by the vehicle that combines the accuracy of a map from an external source (e.g., a satellite map from a remote map provider) with the up to date results that come from sensor observations of the vehicle as it travels through the environment. Further, the disclosed technology can generate an improved graphical user interface that provides a more efficient display of relevant information through the combination of the external map data with internally generated sensor data.

Accordingly, the disclosed technology provides a more effective way to send and/or receive data (e.g., vehicle map service data) between a vehicle and remote map service systems, between a vehicle and remote vehicle service systems, and between client systems (e.g., vehicle systems) of the vehicle. The disclosed technology provides the benefits of improved safety through more up to date map information, bi-directional communication using a flexible data protocol that can be used to interface with different client systems, remote map service systems, and remote vehicle service systems, more efficient use of computational resources based in part on more selective use of data, and more accurate maps resulting from the use of sensor readings and map data to generate a local map of an area being traversed by a vehicle in real-time.

With reference now to FIGS. 1-17, example aspects of the present disclosure will be disclosed in greater detail. FIG. 1 depicts an overview including an example of a system that can be used to perform operations associated with geographic information according to example embodiments of the present disclosure. As shown in FIG. 1, a system 100 can include a network 102, a vehicle 110, vehicle map service data 112, a vehicle map service data service 113, a vehicle map service system 114, one or more vehicle map service clients 115, one or more vehicle systems 116, one or more basemap service systems 118, a remote map service system 120, a map information service 121, vehicle map service data 122, map data 124, sensor data 126, machine-learned model data 128, a remote vehicle service system 130, a vehicle information service 131, vehicle map service data 132, map data 134, sensor data 136, and machine-learned model data 138.

The vehicle 110 can include any device used to carry or transport persons or cargo including an automobile, a bus, a cargo truck, an aircraft (e.g., airplane and/or helicopter), and/or watercraft (e.g., boat or submersible vehicle). The vehicle 110 can include one or more computing systems (e.g., a computing system including one or more computing devices, at least one of which includes one or more processors and one or more memory devices including tangible non-transitory computer readable media) including the vehicle map service system 114 that can perform one or more actions or operations including sending, receiving, processing, generating, and/or storing data (e.g., vehicle map service data).

The vehicle map service system 114 can communicate (e.g., send or receive one or more signals or data) with one or more client systems including: the one or more vehicle systems 116 (e.g., a navigation system that can receive vehicle map service data and output a local map via graphical user interface displayed on a display device); and/or vehicle map service clients 115 which can subscribe to and/or publish vehicle map service data. Further, the vehicle map service system 114 can include a vehicle map service data service 113 that can be configured to manage and provide information associated with the vehicle 110 to clients and/or other subscribing entities. The vehicle map service system 114 can also manage, send, and/or receive information associated with the one or more basemap service systems 118 which can include one or more computing devices and/or software applications that can perform one or more actions and/or operations associated with providing a basemap (e.g., a basemap of an area traversed by a vehicle).

Furthermore, the vehicle map service system 114 can activate and/or communicate with the one or more vehicle map service clients 115 and/or the one or more vehicle systems 116 of the vehicle 110 to perform vehicle-related functions. For example, the vehicle map service system 114 can send one or more signals or data that are used by a vehicle control system to cause a vehicle steering system to change the position of the vehicle 110's wheels and change the direction of travel of the vehicle 110.

The vehicle client systems can include various systems of the vehicle 110 that can perform one or more operations or functions including processing vehicle map service data that includes map data associated with the state of a geographic area (e.g., one or more maps), sensor data associated with the state of an environment external to the vehicle 110, and/or machine-learned model data associated with one or more machine-learned models that can be used to detect and/or recognize objects external to the vehicle 110. Further, the client systems (e.g., the vehicle map service clients 115 and/or the one or more vehicle systems 116) can include one or more display devices (e.g., LCD monitor) that can be used to output information including information associated with the vehicle map service data and/or the vehicle map service system 114. Further, the vehicle client systems can include one or more inputs (e.g., touchscreen, keyboard, and/or microphone) that can be used to input information for use by the vehicle map service system 114.

The vehicle 110, the vehicle map service system 114, the remote map service system 120, and/or the remote vehicle service system 130 can communicate (e.g., send and/or receive one or more signals or data including the vehicle map service data) via the network 102. The network 102 can include any type of communication network, including a local area network (e.g. an intranet), wide area network (e.g. the Internet), a cellular network, or some combination thereof. Further, the network 102 can also include one or more direct connections that can be used for direct communication between the vehicle 110, the vehicle map service system 114, the remote map service system 120, and/or the remote vehicle service system 130. Communication can be carried via network 102 using any type of wired and/or wireless connection, using a variety of communication protocols (e.g. TCP/IP, HTTP, SMTP, and/or FTP), encodings or formats (e.g. HTML or XML), and/or protection schemes (e.g. VPN, secure HTTP, or SSL).

The remote map service system 120 (e., a geographic information system provider) can include one or more computing systems (e.g., a computing system including one or more computing devices, at least one of which includes one or more processors and one or more memory devices including tangible non-transitory computer readable media) that can perform one or more actions or operations including sending, receiving, processing, generating, and/or storing data (e.g., vehicle map service data).

The remote map service system 120 can store and/or perform operations on the vehicle map service data 122 which can include the map data 124, the sensor data 126, and/or the machine-learned model data 128. The remote map service system 120 may include a map information service 121 configured to manage and provide map information to clients or other subscribing entities. The map data 124 can be associated with and/or include geographic data including one or more maps that are indexed according to geographic coordinates (e.g., latitude, longitude, and/or altitude) of its constituent elements (e.g., locations). The map data associated with the remote map service system 120 can further include route data, geographic imagery, and/or data associated with various waypoints (e.g., addresses and/or geographic coordinates).

The sensor data 126 can include data associated with one or more sensor outputs of the vehicle 110. For example, the sensor data can include one or more outputs from one or more LIDAR devices, one or more cameras, one or more microphones, one or more sonar devices, and/or one or more radar devices. The machine-learned model data 128 can include one or more machine-learned models or training data associated with one or more machine-learned models that can be used by the vehicle 110 to detect and/or recognize the state of the environment external to the vehicle 110. For example, the machine-learned model data 128 can include a plurality of machine-learned models that can be used by the vehicle map service system 114 to detect and/or recognize one or more objects, scenes, and/or events. Furthermore, the machine-learned model data 128 can include field collected data that is associated with sensor observations (e.g., image data, radar data, sonar data, LIDAR point cloud data, and/or audio data) from one or more sensors (e.g., one or more cameras, one or more radar devices, one or more sonar devices, one or more microphones, and/or one or more LIDAR devices). In some embodiments, the remote map service system 120 can communicate directly with the vehicle 110, the vehicle map service system 114, and/or the remote vehicle service system 130.

The remote vehicle service system 130 can store and/or perform operations on the vehicle map service data 132 which can include the map data 134, the sensor data 136, and/or the machine-learned model data 138. The remote vehicle service system 130 may include a vehicle information service 121 configured to manage and provide vehicle information to clients or other subscribing entities. The map data 134 can be associated with and/or include geographic data including one or more maps that are indexed according to geographic coordinates (e.g., latitude, longitude, and/or altitude) of its constituent elements (e.g., locations). The map data associated with the remote vehicle service system 130 can further include route data, geographic imagery, and/or data associated with various waypoints (e.g., addresses and/or geographic coordinates).

The sensor data 136 can include data associated with one or more sensor outputs of the vehicle 110. For example, the sensor data can include one or more outputs from one or more LIDAR devices, one or more cameras, one or more microphones, one or more sonar devices, and/or one or more radar devices. The machine-learned model data 138 can include one or more machine-learned models or training data associated with one or more machine-learned models that can be used by the vehicle 110 to detect and/or recognize the state of the environment external to the vehicle 110. For example, the machine-learned model data 138 can include a plurality of machine-learned models that can be used by the vehicle 110 to detect and/or recognize one or more objects, scenes, and/or events. Furthermore, the machine-learned model data 138 can include field collected data that is associated with sensor observations (e.g., image data, radar data, sonar data, LIDAR point cloud data, and/or audio data) from one or more sensors (e.g., one or more cameras, one or more radar devices, one or more sonar devices, one or more microphones, and/or one or more LIDAR devices). In some embodiments, the remote vehicle service system 130 can communicate directly with the vehicle 110, the vehicle map service system 114, and/or the remote map service system 120.

The vehicle 110 can include software and/or data including vehicle services that can include mapping applications and services that can be arranged in a stack from high level to low level. The vehicle services can include: a service that provides a user-facing maps application; mobile services that utilize mobile APIs and/or frameworks (e.g., Maps APIs); data services including framework-level management of data caches including maps and/or other data as well as communications with other devices or systems via networks (e.g., the network 102) and/or interconnects in the vehicle 110. Further, the vehicle services can include an embedded version of the vehicle services that can be adopted by vehicles that are otherwise incompatible with the vehicle map service data. The vehicle 110 can also include a real-time operating system that can manage systems closer to the hardware of the vehicle 110.

The remote map service system 120 can include various software and/or services. The remote map service system 120 can include map data including semantic map data and traffic data. The remote vehicle service system 130 can include any service maintained by a vehicle service provider (e.g., an automobile producer or automobile service provider). Further the remote vehicle service system can utilize a distributed computing platform (e.g., a cloud platform) to provide the vehicle services. In some embodiments, the remote vehicle service system 130 can include a local copy of the maps maintained by the remote map service system 120. Further, in some embodiments, various other computing systems can interact directly with the vehicle 110, the remote map service system 120, and/or the remote vehicle service system 130.

The remote map service system 120 and the vehicle 110 can send and/or receive data including: map data updates to the vehicle 110 which can include map data and traffic data, synchronized through the vehicle services into local memory and caches. Some of the map data sent and/or received by the remote map service system 120 and the vehicle 110 may be passed to the real-time operating system of the vehicle 110 as part of vehicle-internal protocols. Further, the remote map service system 120 and the vehicle 110 can send and/or receive data including sensor observations from the vehicle 110 which can be passed from a real-time operating system to the remote map service system 120 via vehicle-internal protocols. The sensor observations can include a local map representation of the environment detected by the vehicle 110. The local map can include objects and/or markings observed by sensors of the vehicle and can be provided in a format that matches the format of data provided to the remote map service system 120 or the vehicle 110. In some embodiments, the sensor observations can include a delta (e.g., a difference or change in state or value) from previously provided data including anomalies and new observations. Further, the remote map service system 120 and the vehicle 110 can send and/or receive data including tracks information that can include information associated with a vehicle's location and route tracking, with, in some embodiments, location data passing from the vehicle 110 to the remote vehicle service system 130. The locations included in the location data can include raw positional data (GPS), and/or map-matched data in relation to the map and route known by the vehicle 110 (e.g., progress along the current road, lane, or route). Services data sent and/or received between the remote map service system 120 and the remote vehicle service system 130 can include navigation, which can include search and directions.

The remote map service system 120 and the remote vehicle service system 130 send and/or receive data including data provided through APIs including map APIs and can include directions, places, tiles, and/or roads. Further, the data flows between the remote map service system 120 and the remote vehicle service system 130 can include updates that can be synchronized to the remote vehicle service system 130 for analysis; and edits including any corrections and/or additions to vehicle map service data that a third party computing system can submit to the remote vehicle service system 130 based on analysis or their own feedback. Further, the remote map service system 120 can include a pipeline that can evaluate and receive those edits, and provide credit to the 3rd party service for quality improvements.

The remote vehicle service system 130 and the vehicle 110 can send and/or receive data associated with services that can be used to pass along opaque data in both directions between the remote vehicle service system 130 and the vehicle 110 and which can user networking in the operating system and following data use policies. Further, the remote vehicle service system 130 and the vehicle 110 can send and/or receive data including software updates and/or sensor data.

Figure 2:
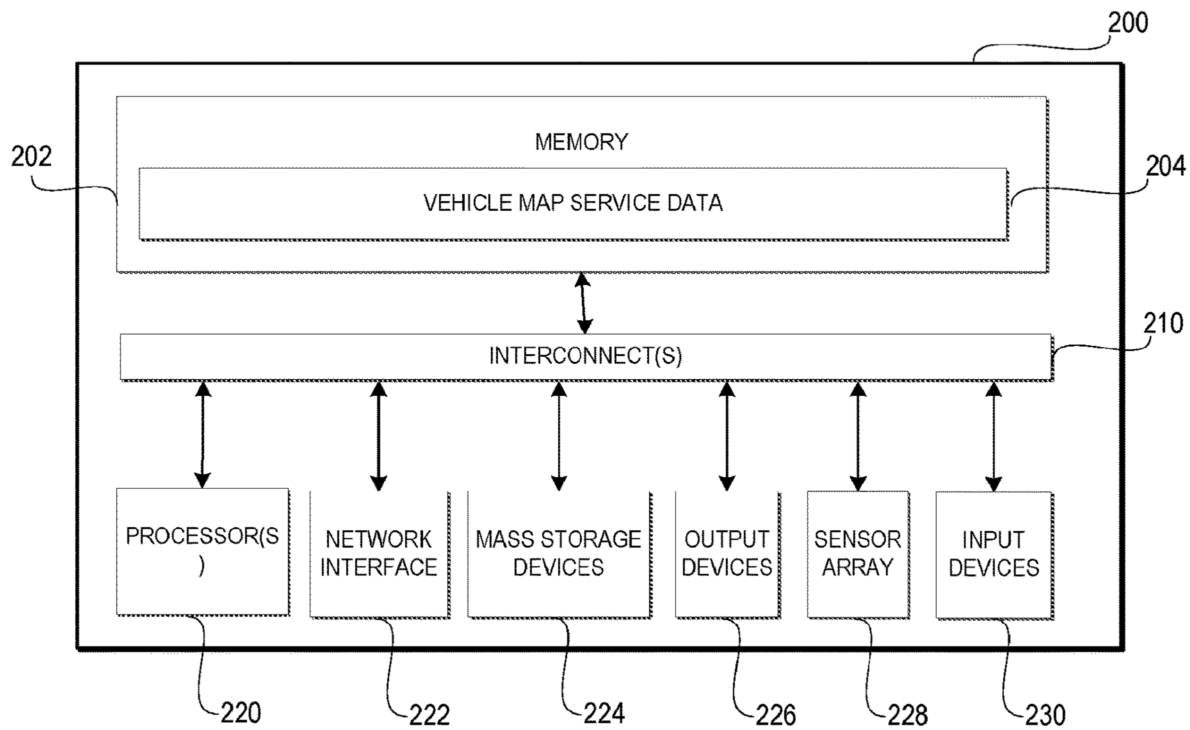
FIG. 2 depicts a diagram of an example device according to example embodiments of the present disclosure.

FIG. 2 depicts a diagram of an example device according to example embodiments of the present disclosure. A vehicle map service device 200 can perform one or more actions and/or operations including the one or more actions and/or operations performed by the vehicle map service system 114 in FIG. 1.

As shown in FIG. 2, the vehicle map service device 200 can include one or more memory devices 202, vehicle map service data 204, one or more interconnects 232, one or more processors 220, a network interface, one or more mass storage devices 224, one or more output devices 226, a sensor array 228, and one or more input devices 230.

The one or more memory devices 202 can store information and/or data (e.g., the vehicle map service data 204) including information associated with the processing of one or more instructions that are used to perform one or more actions and/or operations including sending data, receiving data, generating data (e.g., vehicle map service data associated with a local map), and/or determining the state of data.

The vehicle map service data 204 can include one or more portions of the vehicle map service used by the vehicle 110 shown in FIG. 1, and by way of further example, can include one or more portions of the vehicle map service data 112 also shown in FIG. 1. Furthermore, the vehicle map service data 204 can include information associated with one or more maps, sensor outputs, and/or machine-learned models.

The one or more interconnects 210 can include one or more interconnects or buses that can be used to send and/or receive one or more signals (e.g., electronic signals) and/or data (e.g., the vehicle map service data) between components of the vehicle map service device 200, including the one or more memory devices 202, the one or more processors 220, the network interface 222, the one or more mass storage devices 224, the one or more output devices 226, the sensor array 228, and/or the one or more input devices 230. The one or more interconnects 210 can be arranged or configured in different ways including as parallel or serial connections. Further the one or more interconnects 210 can include one or more internal buses to connect the internal components of the vehicle map service device 200; and one or more external buses used to connect the internal components of the vehicle map service device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, and/or IEEE 1394 interface (FireWire).

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the vehicle map service data 206. For example, the one or more processors 220 can include single or multiple core devices including a microprocessor, microcontroller, integrated circuit, and/or logic device.

The network interface 222 can support network communications. For example, the network interface 222 can support communication via networks including a local area network and/or a wide area network (e.g., the Internet). The one or more mass storage devices 224 (e.g., a hard disk drive and/or a solid state drive) can be used to store data including the vehicle map service data 204. The one or more output devices 226 can include one or more display devices, one or more loud speakers, and/or one or more haptic output devices.

The one or more memory devices 202 and the one or more mass storage devices 224 are illustrated separately, however, the one or more memory devices 202 and the one or more mass storage devices 224 can be regions within the same memory module. The vehicle map service device 200 can include one or more additional processors, memory devices, network interfaces, which may be provided separately or on a same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. The one or more memory devices 202 can be used to operate various applications including a mobile operating system developed specifically for mobile devices. As such, the one or more memory devices 202 can store instructions that allow the software applications to access data including wireless network parameters (e.g., identity of the wireless network, quality of service), and invoke various services including telephony, location determination (e.g., via global positioning service (GPS) or WLAN), and/or wireless network data call origination services. In other embodiments, the one or more memory devices 202 can be used to operate or execute a general-purpose operating system that operates on both mobile and stationary devices, such as smartphones and desktop computers, for example.

The software applications that can be operated or executed by the vehicle map service device 200 can include applications associate with the system 100 shown in FIG. 1. Further, the software applications that can be operated or executed by the vehicle map service device 200 can include native applications or web-based applications.

In some embodiments, the vehicle map service device 200 can be associated with or include a positioning system (not shown). The positioning system can include one or more devices or circuitry for determining the position of the vehicle map service device 200. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position.

Figure 3:
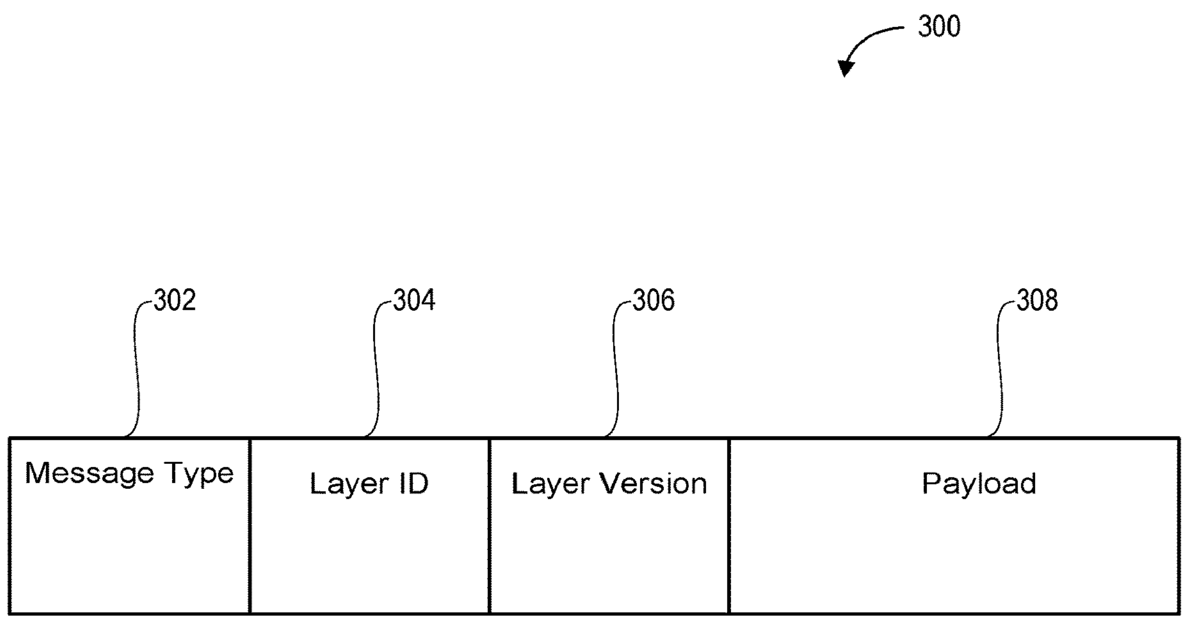
FIG. 3 depicts an example of vehicle map service data according to example embodiments of the present disclosure.

FIG. 3 depicts a diagram including an example of vehicle map service data according to example embodiments of the present disclosure. One or more portions of vehicle map service data 300 can be executed or implemented on one or more computing devices or computing systems including, for example, the vehicle map service system 114, the remote map service system 120, and/or the remote vehicle service system 130. Further, one or more portions of the vehicle map service data 300 can be executed or implemented as an algorithm on the hardware components of the devices disclosed herein.

As shown in FIG. 3, the vehicle map service data 300 can include a message type 302, a layer ID 304, a layer version 306, and a payload 308. The message type 302 can include one or more portions of data that can be used to identify a type of message associated with a portion of the vehicle map service data 300. For example, the message type 302 can indicate whether the vehicle map service data 300 is being used to: subscribe one or more portions of the vehicle map service data to a vehicle map service client system and/or the status of the subscription; publish one or more portions of the vehicle map service data 300 by a vehicle map service client system and/or a status associated with publishing the one or more portions of the vehicle map service data 300; and/or communicate (e.g., send or transmit) a portion of the vehicle map service data 300 to a vehicle map service client system. Furthermore, the message type section can indicate the intent or goal (e.g., a goal to subscribe, unsubscribe, or to update data) associated with layer, for example, as a request to subscribe to a layer, or an intention to send data about the layer. For messages that are used to publish, the provider ID, the layer, and/or the layer version can be provided together with the payload in order that the payload may be routed correctly.

The layer ID 304 can include one or more portions of data that can be used to identify a layer associated with the vehicle map service data 300 and/or the source of the vehicle map service data 300 (e.g., a vehicle map service client system). For example, the layer ID 304 can include information indicating that the vehicle map service data is associated with a road centerlines layer and in this way, client systems that are subscribed to the road centerlines layer can access the vehicle map service data 300.

The layer version 306 can include one or more portions of data that can be used to identify a layer version associated with the vehicle map service data 300. For example, the layer version can indicate whether the version of the vehicle map service data 300 is compatible with the vehicle map service client system that is attempting to access the vehicle map service data 300.

The payload 308 can include one or more portions of the vehicle map service data 300 that are being communicated. The payload 308 can include any information associated with one or more signals or data including one or more maps, one or more sensor outputs, and/or one or more machine-learned models. For example, the payload 308 can include information associated with the state of traffic in an area currently being traversed by a vehicle (e.g., the vehicle 110).

Figure 4:
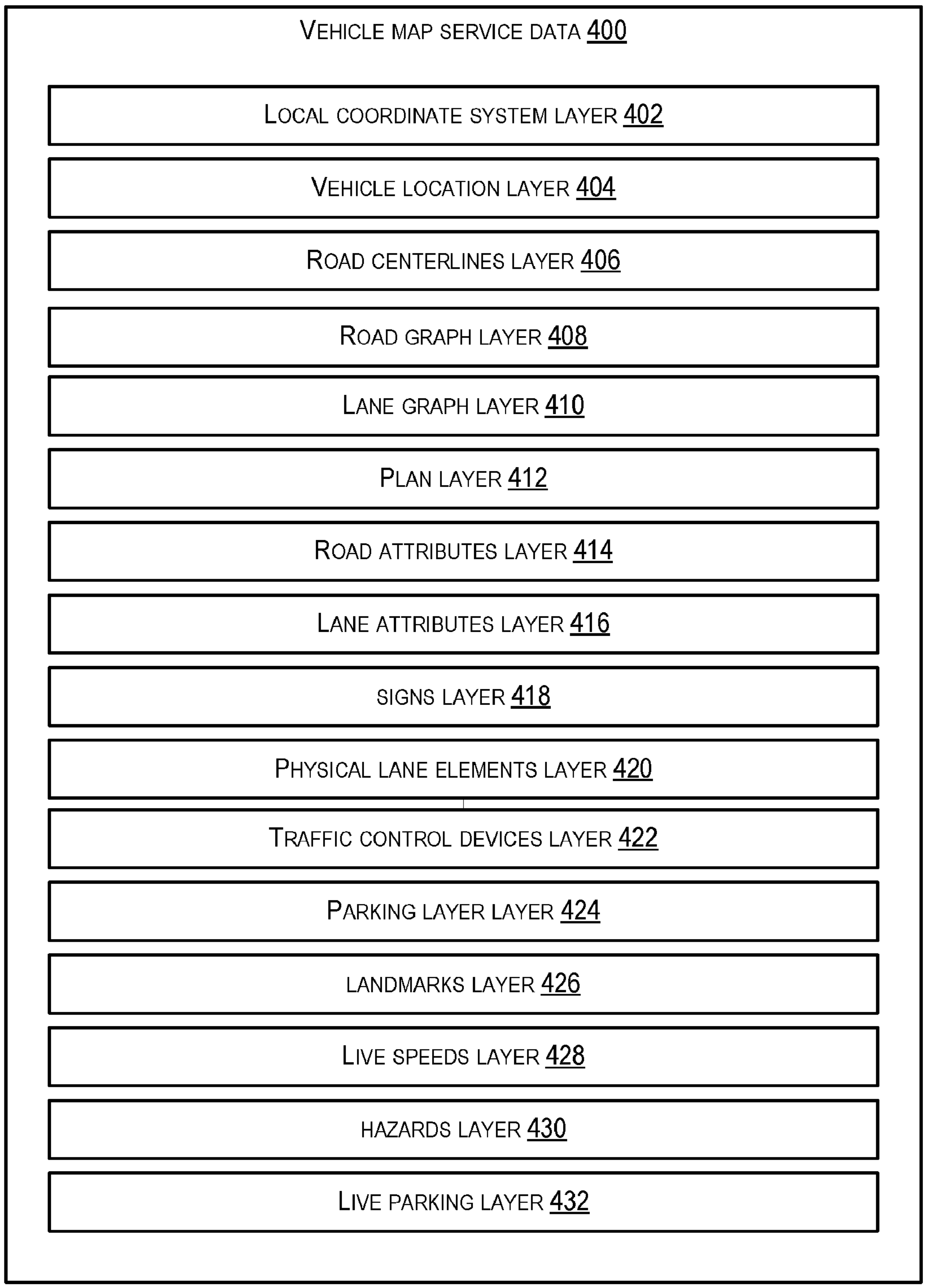
FIG. 4 depicts a diagram including an example of vehicle map service data layers according to example embodiments of the present disclosure.

FIG. 4 depicts a diagram including an example of vehicle map service data layers according to example embodiments of the present disclosure. One or more portions of vehicle map service data 400 can be stored on one or more computing devices using any suitable memory. In some examples, vehicle map service data 400 can be executed or implemented on one or more computing devices or computing systems including, for example, the vehicle map service system 114, the remote map service system 120, and/or the remote vehicle service system 130. Further, one or more portions of the vehicle map service data 400 can be executed or implemented as an algorithm on the hardware components of the devices disclosed herein.

As shown in FIG. 4, the vehicle map service data 400 includes a plurality of layers, examples of which may include a local coordinate system layer 402, a vehicle location layer 404, a road centerlines layer 406, a road graph layer 408, a lane graph layer 410, a plan layer 412, a road attributes layer 414, a lane attributes layer 416, a signs layer 418, a physical lane elements layer 420, a traffic control devices layer 422, a parking attributes layer 424, a landmarks layer 426, a live speeds layer 428, a hazards layer 430, and/or a live parking layer 432.

The plurality of layers in the vehicle map service data 400 can be accessed by one or more computing systems and/or one or more computing devices including the vehicle map service system 114, the remote map service system 120, and/or the remote vehicle service system 130. Further, each of the plurality of layers can be associated with information including a message type (e.g., the message type 302 in FIG. 3), layer ID (e.g., the layer ID 304 in FIG. 3), and layer version (e.g., the layer version 306 in FIG. 3).

Furthermore, a plurality of service systems (e.g., the vehicle map service system 114, the remote map service system 120, and/or the remote vehicle service system 130) can selectively subscribe to different layers (e.g., layers that include vehicle map service data that the respective vehicle map service client system will consume), ignoring layers that do not include required information. The service systems can also publish vehicle map service data that is associated with the layers. The published layers can then be consumed by other service systems that subscribe to the respective layer.

The vehicle map service protocol can include a shared featureless basic model (e.g., a base map) of the world and a local coordinate frame that can serve as a reference. The vehicle map service protocol can include layers of data, which can be stacked on other layers of data, and can be used to form a model of the world. Individual clients (e.g., client systems and/or service systems) can be subscribed to certain layers (e.g., layers that are of interest) and can ignore certain other layers that include information that is not of interest. These layers can include pre-mapped data (e.g., a map based on previously gathered satellite imagery) and dynamic sensor observations from various data sources (e.g., client systems including vehicle systems; and/or various remote computing systems including remote map service systems and/or remote vehicle service systems), that can share a common frame of reference around the vehicle (e.g., the different data sources are focused on the same geographic area around the vehicle).

Each layer of the map can include data associated with various types of entities and the properties of the entities. The layers can represent data flowing between the plurality of service systems including data flowing between a remote map service system (e.g., a geographic information system service provider (GIS) that is operated on a computing system) and a vehicle (e.g., a vehicle that includes one or more vehicle client systems), between a remote map service system and a remote vehicle service system (e.g., a vehicle service provider that provides services to a vehicle), and between a remote vehicle service system and a vehicle.

Each layer's data can be published in the form of packets of a predetermined type. The schema of these packets can be versioned such that a data packet for version X of layer A is a protocol message. New versions of layer packets can evolve over time. In one implementation, once a version is published, modifications to that version can be limited or restricted.

In some embodiments, layers can operate independently and layers can also cross-reference each other. Further, the plurality of layers can include a common local coordinate frame definition. If an object is described in multiple layers within a consistent epoch, for instance given a road segment's attribute and geometry layers, they can use the shared object ID to refer to that object. For example, the object ID can include an identifier used to identify an object.

In some embodiments, layers can be ordered by complexity. This may provide forward compatibility. For instance, earlier layers can represent simple and common scenarios that are already achievable with current maps and vehicles. Subsequent layers can then be added, which may relate to newer data, different data, or more advanced forms of data as the requisite new types of map data and/or new types of vehicle technology become available (e.g., new versions of data and/or different data protocols).

A portion of the vehicle map service data (e.g., a packet) can include a message type section, a layer id section, a layer version section, and a payload section. The message type section can indicate the type of data which may be used to determine how to interpret the content of the message. For example, the message type can be associated with the type of API call that a message is making. For messages that are used to publish, the provider ID, the layer, and/or the layer version can be provided together with the payload in order that the payload may be routed correctly. Further, different message types can be used to add subscriptions, remove subscriptions, or provide information about the state of a subscription. The payload of the message can also be associated with the message type. The layer id section can include an identifier for a particular layer. The layer version section can include an identifier for the version of the particular layer. The payload can include the data being communicated for the particular layer (e.g., sensor data associated with one or more sensor observations of a vehicle).

The plurality of layers associated with the vehicle map service data can include a local coordinate system layer, a vehicle location layer, a road centerlines layer, a road graph layer, a lane graph layer, a plan layer, a road attributes layer, a lane attributes layer, a signs layer, a physical lane elements layer, a traffic control devices layer, a parking attributes layer, a landmarks layer, a live speeds layer, a hazards layer, and/or a live parking layer.

The local coordinate system layer can include data and/or information associated with a coordinate system (e.g., x, y, and z coordinates corresponding to latitude, longitude, and altitude respectively) including the current coordinate system used by the vehicle. The local coordinate system layer can be used to transform any local geometry and/or set of positions to the global coordinate system (e.g., a coordinate system used to describe locations on the Earth) or to transform a global coordinate system to a local geometry and/or set of positions. For example, the local coordinate system layer can include one or more reference points (e.g., latitude, longitude, and/or altitude). A global coordinate can be used to define the current tangent plane, for example, when describing geometry around a geographic location, the local coordinate system can use a set of reference points to describe the latitude, longitude, and altitude respectively. The local coordinate system layer can update with a frequency sufficient to preserve absolute precision (e.g., to avoid transformation error due to earth's curvature). Further, the frequency of changing or updating the local coordinate system can vary in relation to accuracy requirements. In some embodiments, no data is required from a remote map service provider (e.g., a geographic information system provider), as the local coordinate system layer can represent a local transformation related to absolute vehicle position.

The vehicle location layer can include data and/or information associated with a self-consistent description of an instantaneous location of the vehicle (e.g., the location of the vehicle at the current moment in time). This location can be associated with aspects including the vehicle's physical location (e.g., pose within the world or local coordinate frame, absolute velocity and/or acceleration) or the vehicle's semantic location (e.g., which road segment the vehicle is currently on and where the vehicle is on the road segment, scalar velocity along the segment, and/or which lane the vehicle is in). The vehicle location layer can include atomic information (i.e. sensor data including a raw sensor measurement from one or more sensors of the vehicle) or fused/derived information (e.g., a map match including the vehicle location on a map; and/or a fused location of the vehicle based on multiple sources) depending on the remote data source (e.g., map provider) that generates the data associated with the vehicle location layer (e.g., a location packet).

Since a particular provider may be able to generate any subset of the various aspects of both physical and semantic location, a set of the possible measures can be combined into one portion of data associated with the layer (e.g., a set of packets associated with the attributes of a layer). Any part of the data associated with the layer can be set or unset depending on whether the client has access to that piece of information (e.g., whether the client is subscribed to the data associated with the layer). The overall data associated with the layer can then serve as a grouping mechanism to describe a set of consistent values that describe the vehicle state as seen by a particular client at a particular moment in time. In some embodiments, the data associated with the vehicle location layer can be distinct from other vehicle location state data already shared with the client systems (e.g., vehicle systems), including location (e.g., geographic location), course, or velocity.

Further, while the vehicle location layer can be the substrate on which location information for the current vehicle is broadcast, observations and information about the presence and location of other vehicles may also be included on the vehicle location layer. Vehicle location layer packets can describe observations of either the current vehicle or other vehicles by referencing different object identifiers (e.g., object IDs), thereby allowing the vehicle location layer to generalize to the state of vehicles in the area including the current vehicle. Other clients can add (e.g., publish) locations of other vehicles derived from vehicle sensors, vehicle-to-vehicle, and/or vehicle-to-infrastructure clients associated with the vehicle.

In some embodiments, physical location measures (absolute position, world-frame velocity, and/or acceleration) can come from raw sensors outputs of any combination of such physical sensors (e.g., inertial measurement units, light detection and ranging devices). Further, the physical location can also be derived based at least in part on a semantic location (e.g., if the geometry of a road segment is known and the vehicle's semantic location is on that segment at a certain parametric point with a certain segment-relative velocity, that information can be used to calculate a world position and velocity that could be used as a physical location).

Semantic location can include one or more results of a map matching algorithm (e.g., road snapping) that estimates a likely road and lane-relative position. Map matching can be performed by a client using available information or data, including vehicle position, position history (e.g., tracks including past positions of the vehicle), vehicle velocity, and/or vehicle route (e.g., a planned path for the vehicle). Map matching can also be performed by the vehicle using those and additional inputs, including sensor observations and landmark comparisons. Any of these clients can publish their own estimates onto the vehicle location layer for consumption by other clients.

In some embodiments, the vehicle can be associated with one segment (e.g., road segment) on the graph, through a best guess map-match using known location information and prior location information. With advanced positioning (requiring sensor observations including imagery-based lane recognition), the vehicle can also be strongly associated with a given lane on the segment. Lane registration can also be included as optional in this layer, when available. Map match attributes can describe the current segment, current lane, the segment direction of travel, and/or the distance along that segment.

A set of physical location attributes of the vehicle location layer can be used for any comparison or representation of a vehicle's position relative to other objects on the map. A roll attribute associated with the stability of a vehicle as the vehicle turns can used to determine the safe velocity of a vehicle through a turn. A pitch attribute can be a measure of surface slope, and can be useful to understand vehicle efficiency. A yaw attribute can be a measure of vehicle heading (e.g., the direction the front of the vehicle is facing), and can be used to determine the alignment of the vehicle in relation to nearby roads (e.g., as part of map-matching). The current segment in the semantic location can be used to look up attributes about the current road, including determining the current speed limit in an area. The current lane can be used to look up attributes about the current lane. Changes ahead can be anticipated by following the current segment and lane through upcoming segments and lanes, which can be biased to continuations and the current plan (e.g., the current motion plan of a vehicle).

Attributes of the vehicle location layer can include: a timestamp attribute (e.g., an absolute timestamp associated with a specific point in time). The timestamp attribute can be used to reflect the time that a vehicle location was observed; and a location provider attribute that can include a final determinant of a location estimate. For example, a location associated with the location provider attribute can come from a GPS provider, or can be a map-corrected location based on sensor registration against a three-dimensional map. The vehicle location layer can be associated with a position attribute that can include a local coordinate used to define the position of the center rear axle. If a rear axle offset is not known, the position of the vehicle based on the vehicle location layer can instead be a transformation of the reported vehicle position as reported by GPS or other sensors.

The vehicle location layer can be associated with an orientation attribute including yaw, pitch, and roll, which can used in the z-y-x sense of nautical angles to describe the vehicle's angular position. The system can have its origin at yaw, pitch, and roll angles corresponding to the set of coordinates {z, y, x}, and be axis-aligned with the local coordinate system. Further, the system can change its orientation after each elemental rotation is applied (e.g., first yawed about z, then pitched about the singly rotated y, y', then rolled about the doubly rotated x, x').

The vehicle location layer can be associated with a horizontal accuracy attribute that can include a distance, in meters, representing the possible maximum horizontal error (in x, y) for this location estimate; a vertical accuracy that include a distance, in meters, representing the possible maximum vertical error (in z) for this location accuracy; and an orientation accuracy attribute that can include an angle, in radians, representing the potential maximum estimated angular error of orientation vector attributes.

The semantic location attributes of the vehicle location layer can include a segment ID attribute to identify a segment. The segment ID attribute can be unset if there is no available estimate or inference as to map association.

The semantic location attributes can include a lane index to indicate if a lane position on the segment is known, this is the current lane index on the current segment (e.g., with zero being the leftmost lane in the default segment direction); a direction attribute to indicate the vehicle's orientation along the road segment, relative to the intrinsic road segment direction and vehicle heading and/or yaw; and an offset attribute to indicate a parametric distance along the current segment, in the current vehicle direction. The offset can be relative to vehicle pose (centered on the rear axle of the vehicle).

A road centerlines layer can include data and/or information associated with a basic description of the road network. In some embodiments, the layer can include a collection of distinct road segments, each of which can be a section of centerline that represents a stretch of road with a single consistent lane structure and no intersections along its length. Where roads intersect, they can be split into multiple segments such that intersections appear only at segment endpoints.

In some implementations, each segment can be described by a polyline or simple linear spline along the geometric centerline of the road segment, with vertices in local frame {x, y, z} coordinates. Each road segment centerline can have a unique segment ID assigned by its provider. One packet may include a collection of multiple segments over a small area. In some implementations, the road centerlines layer does not provide connectivity information, and can include just the bare geometry of the individual segments.

Other layers that build upon this layer can reference segments by their ID. For example, the segment connectivity layer can provide a record for each segment that describes the connections at each end of a segment by listing the other segment IDs that attach to the main segment. The lane detail layer can map a segment ID to a description of the lane structure on that segment.

The centerline geometry of the road centerlines layer can be used as a reference for comparing the position of an object to the road (e.g., for use in map matching vehicle position). The (x, y) sequence can be used to understand the curvature of the road, to anticipate upcoming turns. This can be used, for instance, for safety awareness or cruise control tuning. The z sequence can be used to understand slope of road, to anticipate hills. This can be used, for instance, to tune cruise control or improve fuel efficiency.

Attributes of the road centerlines layer can include a segment ID including an ID associated with the road segment. The segment ID for the segment can be used to identify the segment and can include points including a list of points, as {x, y, z} that can include a sequence of points for the road segment, ordered from start to end of the segment, in local coordinates. As bidirectional travel can occur on each segment, the sequence can be reversed to match the negative direction of travel.

The new segment geometry ID can be published as each new segment appears on the graph, including when the vehicle drives into view. The road segment geometry can be updated when the local coordinate system changes, to align with the new reference point.

Road segments can have center geometry in (latitude, longitude), which provides (x, y). Further, road segment centers can be measured as logical center of road (i.e., the boundary between two directions of travel). In some implementations, the road segment centers can be measured against a logical center. Road segments in a database associated with the remote map service system (e.g., a GIS service provider system) can include altitude information (z). In some embodiments, altitude can be added to road segments, as derived from collection location data and can include snapping to the digital terrain model (DTM). The quality expectations of altitude/slope data can be measured. Additional points may be added to road segments to capture slope changes on an otherwise straight road.

The road graph layer can expand upon the road centerlines layer by associating each segment with a description of the connectivity of that segment with adjacent segments. This information can be joined with the road centerline layer to create a complete view of the road graph in an area around the vehicle. The graph can be described in terms of possible and allowed travel for the vehicle within that graph, with attributes including: the allowed travel directions on each segment; connections allowing travel between segments, and legality of each connection; and continuations between segments, meaning the natural path of travel when continuing straight from one segment to another.

Edges on the graph can each correspond to a physical road segment that can be traveled on in either direction, so separate directions of travel on the same physical road correspond to the same edge. Edges can have an inherent orientation corresponding to the order of road centerline geometry points given in the geometry layer. That inherent orientation can be used to understand the connections and flow along the edge. Traveling in the direction of the edge can be forward or positive, and traveling in the opposite direction can be reverse or negative. On many edges, only one direction of travel is legally allowed, though both directions of travel can be physically possible on every edge.

The graph can be used to describe the list of segments in view, and as a way to reference other information shared by ID for each segment. Connectivity can be used as part of any map-matching, to understand the possible paths ahead. Information about allowed connections or direction of travel can bias the map matching to the most likely path. Allowed connections or direction of travel can be used as a safety hint, to determine when a vehicle may generate a warning (e.g., a warning to another vehicle or pedestrian) or avoid a given maneuver (e.g., turning at a certain intersection). Continuations can be used to determine the most likely path of travel through an upcoming intersection and can be used to predict likely roads and/or attributes of roads that are ahead of the vehicle.

The road graph can be described as a mapping of a segment ID to a description of the travel characteristics of that segment, and which other segment IDs it connects to at its ends. Attributes of the road graph can include a segment ID which is an identifier for the segment in the provider's basemap epoch which is unique, consistent, and stable within that epoch. The segment ID can be used as a handle to describe connectivity to other segments, or used to fetch further attributes of that segment in other layers.

An allowed travel attribute can describe the legally allowed travel directions for the current vehicle and time. For example, a one-way road would, in the absence of extenuating circumstances (e.g., construction, traffic accident, and/or detour) have only one legally allowed direction. The orientation of any segment can be arbitrary (the vehicle may be traveling in either positive or negative direction). Connections between segments can list their new direction of travel on the next segment. When geometry is provided in prior layers, the geometry points can be ordered along the positive direction of travel.

The following fields can list the possible connections in each direction of travel, as well as the legality of each connection (including U-turns onto the same segment). Other fields and possible connections may be used. While many connections are physically possible, connections can be legally permitted for the current vehicle and time. For instance, a turn in the wrong direction on a one-way road is not allowed, nor is a left turn if there is a time restriction against turning left at the current time. Forward connection attributes and/or a reverse connection attributes can indicate whether a connection is legally permissible for the current vehicle at the current time.

Continuations can include the logical next road segment to travel when continuing straight ahead, and should also be listed as a connection above. Continuations may not exist if there is no clear default path in that direction. A forward continuation can indicate the segment continued onto when traveling forward. A reverse continuation can indicate the segment continued onto when traveling in reverse.

The road graph layer properties that can remain constant as long as the related segments are in view can include: IDs assigned to each given physical segment; the natural orientation of a segment (meaning of positive direction of travel); the possible (e.g., legally possible directions of travel by a vehicle along a road segment) or physical connections (e.g., a physical structure including a bridge or highway overpass that is used to cross a river).

The layer can update in various ways based on vehicle movement or situational change including: as the vehicle moves, the list of segments in view can change, new segments can be added to the graph, and segments behind the vehicle can be removed; the allowed direction of travel or allowed connections can change based on time or circumstance. For instance, a connection can switch from permissible to impermissible based on a time-based turn restriction. In some embodiments, changes and/or updates can be permitted only between epochs. For example, the segment connectivity can be constant within an epoch and change when the epoch changes.

The graph representation can be modified to align with different data models. Complex intersections can be models as segments on the graph, or have additional attributes or groupings around intersections. Further, data and/or observations associated with the road graph layer (e.g., sensor observations and/or feedback from one or more vehicles) can be added to the road graph layer and/or vehicle map service data associated with the road graph layer.

The lane graph layer can be used to describe the configuration of lanes for each road segment, and the subdivision of the road graph into lanes and lane connections. The lane graph layer can focus on the logical graph for the lane network, lane attributes or physical geometry can be described in subsequent layers. Lanes can be tightly associated with road segments, in which a road segment can be subdivided into a set of lanes, each of which extend for the length of a segment. In some embodiments, to avoid describing lane changes mid-segment, road segments can be subdivided whenever the lane count changes or lane attributes change. Lane transitions can be described logically, so a lane transition happens around the logical point of a lane split, not at the actual point where a lane divider begins or ends.

Attributes that describe possible lane transitions in the road segment graph layer can include: a lane count attribute including the number of lanes for a given road segment; a lane index including the index of a given lane, starting at the left in the default segment direction; an allowed travel attribute including the allowed or legal directions of travel on a given lane; a lane connections attribute including physical connections between lanes through connected road segments, including rules about which connections are allowed or legal; a lane continuation attribute including the logical continuation lane when traveling onto the next road segment; a lane crossings attribute that can include rules about lane movement in a lateral direction, including lane crossings indicated by solid or dotted lines.

The lane graph can extend road graph uses on a lane level. Further, the lane graph can add a level of precision that can be used when the vehicle is able to localize or map-match its position to the lane level, and thus leverage attributes and connectivity of the current lane.

Even when lane-level positioning is not available, the lane count can be used to resolve ambiguity between neighboring roads, for instance to distinguish between a frontage road and a highway based on lane counting. The lane configuration, along with attributes, can be used to describe more information about the road ahead (e.g., describing information about the road ahead via a heads-up display in a vehicle). If a lane-level plan/route is known, the lane configuration can be annotated with lane guidance for navigation. Lane crossings can be used by the vehicle to anticipate upcoming possibilities for lane changes, to aid in real-time decision making.

Attributes of the lane graph layer can include: a segment ID indicating the road segment on the graph including the lane; lane count which can include number of lanes on the current segment. To allow lane crossings between segments, these attributes exist to describe segments to the left or right of a given segment, in the case that parallel segments are physically connected. Lane crossings can include a left crossing (segment merges left), and/or a right crossing (segment merges right). Further attributes can indicate allowed lanes connections which can include the attributes in the road graph, with the addition of lane index on the next segment. U-turns are not modeled in the lane case. In some implementations, connections between lanes can only exist if the parent segments are also connected.

A crossings attribute can be used to determine or indicate whether a crossing is possible and allowed for the current vehicle. A crossing can be allowed for a dotted line divider, disallowed for a solid line divider, and physically impossible for a physical barrier.

Updates for the lane graph layer can include attributes of the road graph layer. For example, physical properties and IDs may remain the same, allowed connections may change based on circumstances, and lanes can appear or disappear with movement. In some implementations there can be special rules or additional information around complex intersections.

Further, data and/or observations associated with the lane graph layer (e.g., sensor observations and/or feedback from one or more vehicles) can be added to the lane graph layer and/or vehicle map service data associated with the lane graph layer. Updates to the lane graph layer can correspond to the usage of data associated with the lane graph layer, with greater usage corresponding to more frequent updates. Crossings in the schema can be assumed to be in different configurations including symmetric and asymmetric configurations which can include asymmetric crossings.

The plan layer can be used to annotate the local road and lane graph according to the current plan or route. The plan layer can enable the vehicle to determine which roads or lanes ahead are to be followed for the current navigation route. The plan layer can include the identities (e.g., Object identities) of planned roads and lanes ahead of the vehicle within the vehicle horizon.

The plan layer can be managed as part of a navigation interface. A route can be selected by searching for a destination, viewing possible routes, and initiating turn-by-turn navigation. Once the vehicle is in transit, the route can automatically update and recalculate as needed to adjust for driving behavior and road or traffic changes. The navigation app can share this route state with the data service, which can then reflect it through the protocol connected to the rest of the vehicle.

In example implementations, the mapping service communicates information about the current route to the vehicle through a navigation data protocol. This navigation data protocol can share the next turn type and icon so that it can be shown in a heads up display. The plan layer can be complementary to the existing navigation data protocol. The navigation data protocol can describe the route or portions of the route (including turns ahead of the vehicle horizon), while the plan layer annotates roads within the horizon according to that route.

Uses for the plan layer can include annotating any heads up display of lanes and roads according to the route within the vehicle horizon; providing an input to map-matching, with a bias to the most likely road or lane in the case of an ambiguous match; influencing a look ahead on the current road network, to warn about upcoming situations (e.g., a speed limit change); and guiding overall tactical routing by the vehicle.

Attributes of the plan layer can include a path including segment path details, and a list of segment details on the path, in order or travel from current segment to edge of vehicle horizon; a segment ID which can include an ID on the graph for a segment to be traveled, or that is traveled, on the path; and lanes including a list of lane indices on this segment included as part of the path. In some implementations, this can be omitted if lane information or a lane-level route is not known.

The plan layer can update in a variety of situations including the following: when the vehicle advances onto the next segment on the path; when new segments are added to the vehicle horizon that are part of the path; and when the path or plan changes, including changes due to a route recalculation. This can cause a new epoch of the path plan from the given provider.

The navigation data protocol can provide simple next-turn enumeration and icon to the vehicle. The navigation data protocol can be extended to allow more sophisticated HUD display of the upcoming route state, including lane guidance or ETA information. When an upcoming segment is part of a maneuver, the maneuver information (turn type) can be included as part of this layer (in addition to what is already in the navigation protocol). When moving into fully autonomous driving, the vehicle can also determine relative costs of alternate routes. For example, if a vehicle is unable to safely merge to take an exit for the current route, the cost of continuing on the highway can be determined.

When moving into more autonomous driving, the vehicle can inform the service when it intends to deviate from the route ahead of that actual deviation, to allow for preemptive re-route calculation. For instance, if current conditions prevent moving into an exit lane in time for exit, the vehicle can inform the service that it intends to continue on the highway to a later exit.

The road attribute layer can be used to describe relatively static attributes of road segments. These attributes can derive from segment attributes in a database associated with a remote map service system (e.g., a GIS service provider system), and can be focused on attributes used for vehicle awareness and safety or on attributes used for navigation or rendering. Attributes for the road attributes layer, which can be modeled in a database associated with a remote map service system (e.g., a GIS service provider system), can include: road type, including a highway or local road, which can be subdivided into priority and use; free flow speed, which is the typical speed of travel on that road without traffic; width of road, measured as distance to each edge of road from centerline; and/or driving side (left or right).

In some implementations, the following road attributes can be included in this layer: road or route names can be used; intersection-specific attributes can be used; travel restrictions can be included in the graph layer; lane-specific attributes will be in the lane attributes layer; parking attributes are to be included in the parking layer; traffic control devices can be included in their own layer; and dynamic attributes can be included in live speed and hazard layers.

In some embodiments, when attributes are not known, the attributes can be omitted. Further, attributes can be vehicle-relative, for example, speed limits can be time or vehicle-type dependent. In some implementations, segments can have one of a specific attribute. If an attribute changes, the segment can be subdivided.

The road attributes layer can be used to infer driving behavior. In particular, if a road type is controlled access, the vehicle can expect and follow highway driving behaviors. Further, a free flow speed can be used to understand a reasonable speed of travel for a vehicle based on the speed of travel by other vehicles, so as to not unduly restrict driving speed (e.g., when the vehicle increases speed to pass another vehicle or to avoid a moving object). The free flow speed can be useful in the determination of vehicle speed including vehicle speed when cruise control is activated. Further, a speed limit attribute can describe a legally allowed speed of travel, and can also be useful as a heads up display to inform the driver. Surface type can provide information on driving conditions which can be used to determine the type of surface on which a vehicle travels and to exercise greater care when the vehicle departs from an unpaved road or encounters other predetermined surface types including wet or snow-covered roads. Additionally, surface type can also be used to tune and predict vehicle efficiency, including fuel or battery use. Width can be used to aid in map matching, to understand whether a given position is likely within the border of a road. A driving side can be used to indicate local rules and legal behavior. For example, the driving side can indicate that the forward direction of travel lane is on the right side in the United States and on the left side in the United Kingdom.

Attributes of the road attributes layer can include a segment ID corresponding to the ID for the road segment being described; a road priority that can include a priority level of the road, portions, or segments of the road; a road usage that can include an indication of the ways in which the road, portions, or segments of the road are used; a free flow speed which can include a speed, in m/s or other units. The Free flow speed can include the speed of vehicles on the road within a predefined area. Furthermore, a speed limit can describe a speed limit (e.g., a vehicle speed limit) in native units, matching a display on a sign; a surface type that can include an indication of the type of surface including road surface (e.g., paved, unpaved, sidewalk, lawn, dirt road); a distance to edge that can include a distance to a road edge from the centerline, to left and right of centerline in segment direction. The distance can be provided in units of distance including meters. An "on right" attribute can indicate whether a vehicle is driving on the right side of the road or on the left side of the road.

The road attributes layer can be updated in various ways including: publishing attributes for each road segment as they come into view of the vehicle horizon; attributes may change based on map updates or situation change. For instance, the speed limit on a road can change based on entering a new time window. In some implementations additional attributes can be used around intersections. Further, the speed limit can be model in native units (e.g., kilometers per hour in France, miles per hour in the United States), and include the units in the attribute.

The lane attributes layer can include data and/or information associated with lane-specific attributes, for example, as an added level of detail to the road attribute layer. The attributes of the lane attributes layer can be based on lane attributes in the remote map service system (e.g., geographic information system service provider database). Each segment can provide a set of lane attributes which can correspond to each lane index mapped in the lane graph.

Lane attributes can include a lane type including a turn lane or bicycle lane; and/or a speed limit when speed limits are lane specific. If a speed limit is not present the lane can inherit the parent road speed limit; surface type (e.g., if different from parent road surface type). Further, the lane attributes can include a width of a lane; a distance to a next lane (e.g., to the right of the current lane), when there is a gap between lanes; a travel category that can describe vehicle-specific rules for traveling in the lane (e.g., a high occupancy vehicle (HOV) only lane).

The lane type attributes can be used for rule following and lane recognition or conflation, including when the lane type can also be recognized by visual markings. The speed limit attribute can be used to anticipate slower or faster speeds required when changing lanes. The lane-level speed limits can be useful in areas where there can be rules encouraging faster vehicles and slower vehicles to travel in different lanes, and can be factored in when merging between lanes. The surface type attribute can indicate the type of surface (e.g., road surface) and can be associated with properties of the surface (e.g., traction) and can be used to improve vehicle safety. Further, the surface type can be useful as a hint to lane recognition. The width of lane attribute and distance to next lane attribute can aid in understanding actual geometry and in matching sensor observations to mapped lanes. The travel category attribute can be used to determine or process vehicle behavior that conforms to traffic rules and other rules of the load, and also can be used for conflation when restrictions match markings (e.g., HOV markings).

Attributes of the lane attributes layer also include a segment identifier (e.g., segment ID) that can include an ID for the road segment for the lanes being described; lane attributes for each lane in a road segment; a lane type including a surface type to indicate the type of lane (e.g., HOV lane, bicycle lane); a speed limit attribute to indicate the speed limit for a vehicle in native units (e.g., kilometers per hour or miles per hour), matching a display on a sign; a surface type to indicate the type of surface including road surface (e.g., paved, unpaved, sidewalk, lawn, dirt road); a lane width which can the width of the lane in meters; a distance to next to indicate a distance to the next lane to right, in meters for example; a travel category which can include an indication of the type of travel associated with the lane, lane segment, or portion of the lane.

Lane attributes can be published for each road segment as the road segment comes into view of the vehicle horizon. Attributes for lanes can change or remain static over time. However, some attributes can change based on map updates or a situation change. Further, data and/or observations associated with the lane attributes layer (e.g., sensor observations and/or feedback from one or more vehicles) can be added to the lane attributes layer and/or vehicle map service data associated with the lane attributes layer.

The signs layer can include data and/or information associated with physical signs visible from road segments, including sign type, contents, and three-dimensional position information. For example, signs can include speed limit signs observed when traveling on a road, including the speed limit text on the sign. Signs can be classified into sign types including speed limit or road names. In some embodiments, signs can be selectively modeled with priority given to describing signs relevant to driving, including those signs defining traffic rules. Furthermore, the three-dimensional position of lanes, segments, and/or vehicles can be an absolute position or a relative position (e.g., relative to a lane or segment). The relative position can include a Cartesian (e.g., {x,y,z} offset from the lane or segment) or parametric (e.g., a distance along a lane or segment, cross-track distance left or right of the lane or segment, or a height above or below a lane or segment).

Locally detected signs can be used to supplement and correct local road and lane attributes, for instance to inform the current speed limit displayed in a graphical user interface of a heads up display (HUD). Prior mapped signs can be used as a localization input, to compare the observed world with the map and adjust position according to common reference points. By comparing locally observed signs with the prior map, locations where the map may be inaccurate, incorrect, and/or out of date, can be detected and prioritized for harvesting.

The signs layer can include a list of signs. Each sign can be associated with attributes including, by way of example and not limitation: a sign identifier (e.g., a sign ID) that can include an identifier for the sign being described. The sign identifier can be associated with a known basemap ID (if the provider is a basemap provider) or a locally generated ID (if the provider is a sensor system) that may persist for a sequential viewing of the same sign across multiple frames; associated segments attributes including whether the sign is associated with specific road segments or lanes, or details about that association; a segment identifier (e.g., a segment ID) which can include the ID of an associated road; a segment direction attribute that can indicate the direction of travel for a given segment, the direction can be relative to the intrinsic road segment direction; Lane IDs attributes including lane indices. For example, if a sign is restricted to a subset of lanes, lane IDs can distinguish the lanes indicated. If not provided, an assumption can be made to use all lanes.

Further, the attributes can include position attributes (e.g., x, y, and z coordinates corresponding to latitude, longitude, and altitude respectively) that can indicate the position of the sign based on a coordinate system. If a sign has a post, the position can indicate the base position for the sign itself, not the base of the post. The position attributes for the sign can include a height (e.g., a height in meters) from the post position to the top of the sign; a width including the widest part of the sign (e.g., a width in meters); a type indicating the type of sign, including a speed limit or turn restriction.

The attributes for signs can include contents which can include various types of sign contents and formatting, including shields, octagons, circles, triangles, rectangles, squares, crosses, and/or arrows; and a confidence which can include a value (e.g., a numerical value) representing confidence in provided sign information. Lower confidence can result from fewer observations, stale observations, and/or disagreement among prior reports.

New signs can be added to the map as they appear on the vehicle horizon or field of view. A given sign's data can remain relatively constant while in view, however, sensors may improve or correct existing sign data as it approaches the sign and has a clearer view. In some implementations, sign contents can be further specified. For example, additional attributes for signs can include locale, shields, symbols, formatting, font, color. In some embodiments, one or more portions of speed limit data can be derived from automated processing of speed limit signs from externally collected sources.

The physical lane elements layer can describe the physical properties of lanes. Further, the road geometry layer can be used as a supplemental and optional layer in addition to the semantic lane graph and attributes. The prior semantic lane data can be used when looking up lane information for route planning, guidance, or lane-level traffic. Physical lane elements can be used to assist in lane recognition and more tactical decision making. When available, the physical lane elements layer can provide per-segment and per lane geometric information providing attributes including: a three-dimensional polyline for each lane marking or curb including indexes into the semantic lane in the lane graph, to the left/right of each polyline and/or a three-dimensional polyline describing a suggested or typical flow of travel along each lane (for instance near the center of the lane). The data used for the physical lane elements layer can be based on prior vehicle travel along these lanes, and can be used to suggest travel when lane markings are unclear. Further, the physical lane elements layer attributes can include: an incline attribute for the lane (e.g., an incline associated with the vehicle banking), and which can include a per-point attribute of the flow polyline; attributes associated with visible lane boundaries, including whether the visible lane boundaries are dotted or solid lines; descriptions of locations of markings on lanes, including an HOV symbol or arrow; and a confidence measure of each attribute, reflecting how many strong signals (e.g., signal strength exceeding a signal strength threshold associated with strong signals) were used and/or the age of data.

Lane attributes can be used as a point of reference to inform localization or map matching. By comparing visual observations against lane descriptions, the vehicle can better localize its position with relation to the map. By better enabling lane matching, a lane-registered position can be determined which allows features including lane guidance and lane traffic. Flow lines and incline can be used to inform vehicle planning for cruise control and autonomy, especially when there is ambiguity from sensor observations. The confidence metric can inform trustworthiness of this data for decision making. Attributes of the physical lane elements layer can include one or more reference points (e.g., latitude, longitude, and/or altitude) and/or indications of lane orientation with respect to other locations.

New lanes can be added to the map as their associated roads appear on the vehicle horizon or field of view. A given lane's data can remain relatively constant while in view.

Sensors (e.g., vehicle sensors) can improve or correct existing lane data as the vehicle approaches and gets a clearer view. In the world, lane marking and attributes can change more frequently than road attributes and lanes are often repainted or re-purposed more often than roads are rebuilt. Given the more dynamic nature of lanes, it can be useful when this data is frequently harvested and maintained. Further, data and/or observations associated with the semantic lane layer (e.g., sensor observations and/or feedback from one or more vehicles) can be added to the semantic lane layer and/or vehicle map service data associated with the semantic lane layer.

The traffic control devices layer can be used to describe the locations, attributes, and state of traffic control devices, including stoplights and/or stop signs. The traffic control devices layer can include indications for the operational status of traffic control devices (e.g., operational, non-operational, or malfunctioning).

Attributes of the traffic control devices layer can include a position attribute including coordinates (e.g., x, y, z, corresponding to latitude, longitude, and altitude) that can be used to determine the position of the traffic control device; an operational status that can be used to determine the state of a traffic control device including whether a traffic control device is operational.

The traffic control devices layer can be updated frequently (e.g., on a second by second basis) to reflect the state of traffic control devices from moment to moment (e.g., red light/green light). Further, data and/or observations associated with the traffic control devices layer (e.g., sensor observations and/or feedback from one or more vehicles) can be added to the traffic control devices layer and/or vehicle map service data associated with the traffic control devices layer.

The parking attributes layer can describe parking attributes of the road, including where spots are located, whether the parking is publicly or privately owned, whether the parking is associated with a payment, or parking rules. In some implementations, live parking availability can be provided.

Attributes of the parking attributes layer can include: a position attribute that can include coordinates (e.g., x, y, z, corresponding to latitude, longitude, and altitude) that can be used to determine the position of the parking areas; availability that can be used to determine whether a parking area is available (e.g., using a Boolean variable) or the occupancy level of the parking area (e.g., using a percentage value).

The parking attributes layer can be updated very frequently (e.g., on a second by second basis) to reflect the changing state of parking areas due to the movement of vehicles into and out of the parking areas. Further, data and/or observations associated with the parking attributes layer (e.g., sensor observations and/or feedback from one or more vehicles) can be added to the parking attributes layer and/or vehicle map service data associated with the parking attributes layer.

The landmarks layer can be used to describe landmarks visible from the road, and can include the three-dimensional position of each landmark. Further, the landmarks layer can be used for localization. Attributes of the landmarks layer include a position including coordinates (e.g., x, y, z, coordinates corresponding to latitude, longitude, and altitude) that can be used to determine the position of the landmark; and a visibility that can be used to determine a distance from which the landmark is visible based on the vantage point (e.g., the vantage point of a vehicle at a particular location). The landmarks layer can be updated in the event that a landmark is removed or relocated. Observations can be added to the model, as well as feedback from vehicles.

The live speeds layer can be used to annotate roads and lanes with live speed estimates derived from objects including other vehicles or other points of reference. Attributes of the live speeds layer can include a position attribute including coordinates (e.g., x, y, z, corresponding to latitude, longitude, and altitude) that can be used to determine positions including the position of one or more vehicles on roads and lanes; a speed attribute, which can be expressed as a rate of movement of vehicles in the roads and lanes and can be associated with the position of vehicles at particular positions (e.g., the speed in kilometers per hour of a vehicle at position x, y, z); and time including the time associated with the live speeds layer updates (e.g., the time associated with a particular speed in kilometers per hour of a vehicle at particular location).

The live speeds layer can be updated frequently (e.g., on a second by second basis) to reflect the changing state of vehicles over time through the roads and lanes. Further, data and/or observations associated with the live speeds layer (e.g., sensor observations and/or feedback from one or more vehicles) can be added to the live speeds layer and/or vehicle map service data associated with the live speeds layer.

A hazards layer can include data and/or information associated with annotation of roads and lanes with traffic incidents, hazards, and/or blockages. For example, hazards can include areas undergoing construction, natural hazards (e.g., flooding, fire, heavy rain, and/or heavy snowfall), and other potentially harmful events that can obstruct or delay the movement of a vehicle.

Attributes of the hazards layer can include: a position attribute which can include coordinates (e.g., a set of x, y, and z coordinates corresponding to latitude, longitude, and altitude respectively) that can be used to determine the position of the hazardous area or areas; hazards status, which can be used to determine the status of the hazard including the severity level of the hazards. The hazards layer can be updated frequently to reflect the status of a hazard and the area in which the hazard is occurring (e.g., an expanding flood zone). Further, data and/or observations associated with the hazards layer (e.g., sensor observations and/or feedback from one or more vehicles) can be added to the hazards layer and/or vehicle map service data associated with the hazards layer.

The live parking layer can be associated with annotations of roads and/or parking lots including information about live parking availability (e.g., the availability of parking at a current time). Further, the live parking layer can be updated in real-time (e.g., a continuous stream of data about the availability of parking can be received by the vehicle from one or more remote data sources including other vehicles, remote geographic information service providers). The live parking attributes layer can include a position attribute associated with coordinates (e.g., x, y, and z coordinates corresponding to a latitude, longitude, and altitude respectively) that can be used to determine the position of the parking areas; and an availability attribute that can be used to determine whether a parking area is available or the occupancy level of the parking area (e.g., occupancy level in terms of a percentage value).

The live parking attributes layer can be updated frequently (e.g., in real-time) to reflect the changing state of parking areas due to the movement of vehicles into and out of the parking areas. Further, data and/or observations associated with the live parking layer (e.g., sensor observations and/or feedback from one or more vehicles) can be added to the live parking layer and/or vehicle map service data associated with the live parking layer.

The vehicle map service data can include sensor data associated with one or sensor outputs from one or more sensors. The one or sensor outputs from the one or more sensors can include information associated with one or more states of one or more areas (e.g., geographical areas) detected by the one or more sensors. In some embodiments, the one or more sensors can include one or more image sensors (e.g., one or more cameras), one or more acoustic sensors (e.g., one or more microphones), one or more light detection and ranging devices (e.g., LIDAR devices), one or more infrared sensors, radar, sonar, one or more thermal sensors, and/or one or more radar devices. Further, the one or more sensors can be configured to detect the state (e.g., a physical state) of the one or more geographic areas including one or more properties of the one or more geographic areas. The vehicle map service system can also associate the one or more sensor outputs with a time at which the one or more sensor outputs were received. The one or more properties of the one or more geographic areas can include one or more (e.g., time of day, geographic location (e.g., a latitude, longitude, and altitude), size (e.g., a height, length, and/or width), mass, volume, color) and one or more semantic properties that can be determined by the vehicle map service computing system based at least in part on the one or more sensor outputs (e.g., the semantic information associated with road markings, road signs, road segments, and/or road intersections).

In some embodiments, service systems can consume information from other service systems, add their logic or inputs from external sources, and/or can publish the new information. In situations in which a client consumes and publishes the same layer, other subscribers of the layer may receive both the raw layer and processed layer information.

For example, a vehicle map service system can include a vehicle with sensors (e.g., three cameras) that publish sign information (e.g., three cameras report different parts from a cluster of signs on the highway), a remote map service system (e.g., a map data provider) that publishes what signs to expect, and a sign fuser client that uses the data from the cameras and the remote map service system and publishes fused sign information. As such, a vehicle map service client system that consumes sign information can subscribe to sign messages, receive messages from the various sources, and can determine the sign messages to use and how to resolve conflicts.

In some embodiments, the vehicle map service data can be formatted according to a vehicle map data service protocol. Further, a new field can be added to the layer protocol for use in identifying a fused layer. Additionally, the layer protocol can include fields for a layer identifier, a layer version, and a fuse level. The fuse level field can identify the level of fusing for the subscribed information.

In some embodiments, client-developers can assign their publisher a fuse level per published layer, and subscribers may specify which level they want to subscribe to. For instance, when a client publishes a layer with fuse level X, it should subscribe to X−1 for that layer. The core service can determine that at the highest fusing level, there is only one publisher so clients can subscribe to the most coherent view without ambiguity. If a subscriber does not specify to which fuse level to subscribe to, the core service can subscribe it to the most-fused level.

In some embodiments, each publisher can be associated with a publisher identifier. The publisher identifier can be specified when a system associated with the vehicle map service starts up and can be assigned based on a description that is provided by the publisher. In some embodiments, portions of the description can be determined when a vehicle is built and other portions can be determined when the system associated with the vehicle map service starts up. Furthermore, in some embodiments, during a session (e.g., a time period between a system associated with the vehicle map service starting up and shutting down), the same description can result in the same publisher ID being assigned. As such, if a publisher experiences a temporary failure and is restarted, the same publisher ID is maintained. A remote vehicle service system (e.g., a maker or service provider for a vehicle) of the vehicle can maintain a single configuration file to describe various combinations of components in different vehicle models. Using the publisher identifier, different service systems can subscribe to messages using the publisher identifier to receive messages from desired sources.

In this example, an advanced client on the vehicle can receive a message associated with a sign data layer that fused from a simple client (e.g., a camera) and one of a remote map service system (e.g., associated with a GIS service provider) or a remote vehicle service system (e.g., associated with a vehicle entity). A different client on the vehicle can receive a message associated with a sign data layer from either the advanced client (as it receives the most fused message) or a fused message from a simple client (e.g., a camera) and one of a remote vehicle service system (e.g., associated with a GIS service provider) or the remote vehicle service system (e.g., associated with a vehicle entity)

In some implementations, there can be several types of clients or client systems, including a first type of client and a second type of client. The first type of client can include clients whose job it is to consume a coherent model of the world (which may be inaccurate, but may not be redundant or inconsistent), and perform some action. "Leaf consumers" including client systems (e.g., vehicle systems) including display devices, smart cruise controls, drivetrains, and/or safety systems, can fall into this category and want an optimal or improved view of data. The second type of client can include clients whose job it is to consume potentially redundant or inconsistent intermediate forms of data and produce that same type of data processed into a coherent, consistent state (e.g., "fusion clients").

For the second type of client there may be many different data flows from module to module with different modules listening to different sets of modules. There may be various ways to specify a priori how a client of the second type can be configured. However, in some implementations, there can be only one world model, and the first type of client can request one fused layer and have only that vehicle map service data arrive at their input.

In example embodiments, a single Boolean value of "terminal fused" to first class status can be used in routing. Clients can subscribe either to one or more broadcasts including all broadcasts on a layer, or to only the terminally fused packets on the layer. The system can make the terminal fused layer present a consistent view of the world. Since a large number of clients can be of this form, this can provide much of the bandwidth gains of arbitrary routing.

A consistent view on the layer can be made possible within the general vehicle map service data model by determining that that layer is only broadcast by a single module. Furthermore, the "terminal fused" tag can be granted to a provider, not to the data. This may be because providers can be defined (as named by provider identifiers) to have determined internally consistent models of the world.

Aspects of the fused model can include adding a fused bit to the offerings data structure for the provider. In some implementations, this may not be enforced too strictly at the core level, thereby retaining the ability for a cache module to rebroadcast packets that were broadcast in the past from a different provider that was the fusion provider at the time.

In some implementations, when the fusion state changes, different protocols can be used for rebroadcasts of past information. If a rebroadcast of a previously fused packet is requested but the fused bit has moved on to another provider, this can be handled by the non-promise of a response, since the rebroadcast can go out as non-fused if marked by either the core or the sending module.

In availability computation, a determination that no two "fused" providers overlap in any layers can be made. If the two fused providers overlap, this can be considered an error condition, and neither provider's packets are considered to be fused until one of them has their authorization to access the fused layer revoked. The "fused" bit can be set by the core when rebroadcasting the current fused provider for a given layer. When subscribing, the clients may subscribe to the fused version of a layer. If they do, they can detect packets from fused providers. Otherwise, the clients can receive all packets on the layer. Clients that are subscribed to a fused version of a layer can, in some implementations, can detect only packets from one provider identifier. When the clients begin to see packets from a different provider identifier, they can treat this in the same way as a change of epoch. A new model can be constructed and the old model discarded. The fused bit can be forced to pertain to a provider rather than a data packet. If more than one provider is allowed to contribute fused-flagged packets to a layer, a situation in which a change in which provider is considered the authoritative provider at the client is not detected, which can lead to consistency issues in the situation where the authoritative bit changes hands.

Figure 5:
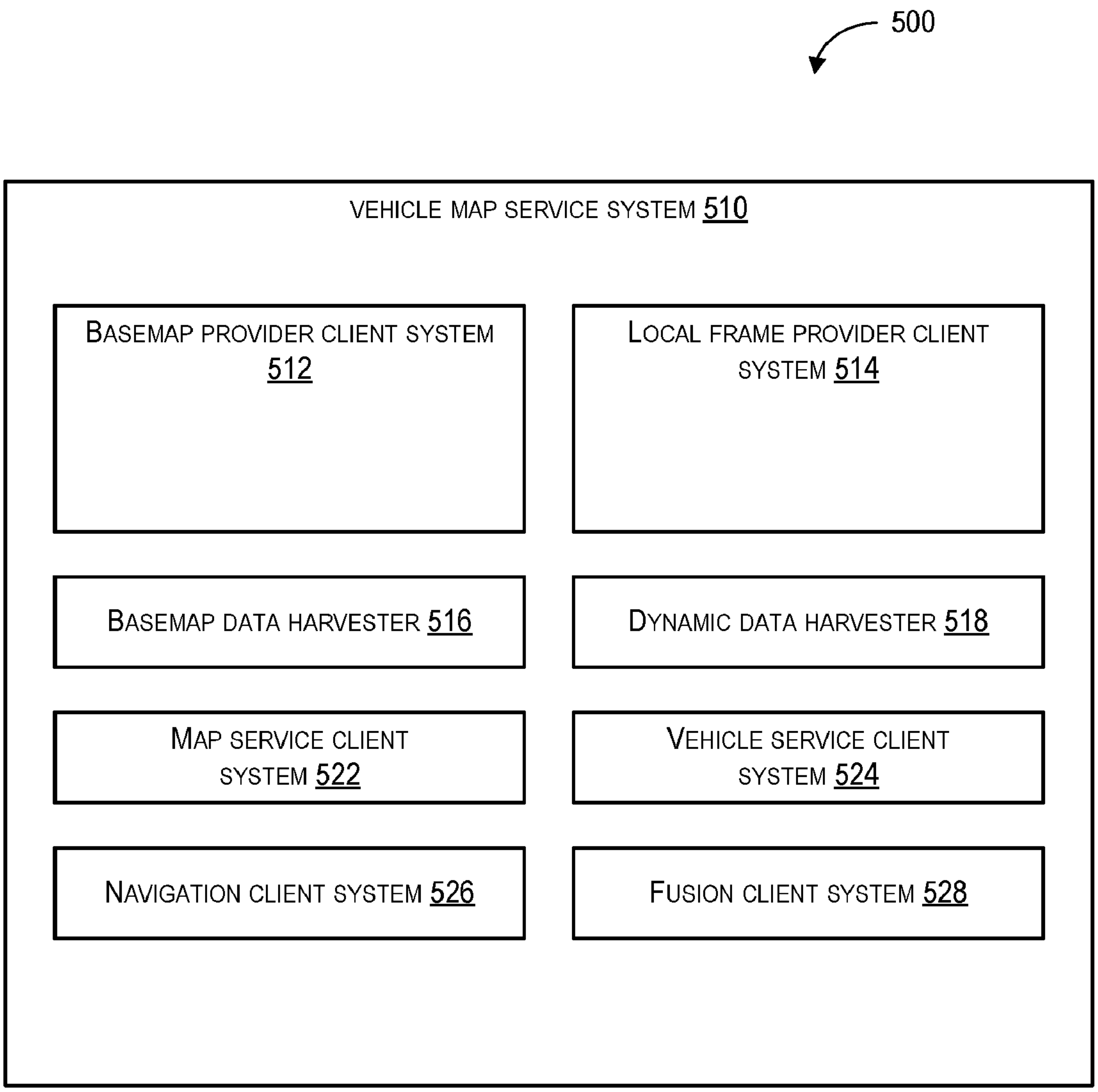
FIG. 5 depicts an example of service systems according to example embodiments of the present disclosure.

FIG. 5 depicts an example of service systems according to example embodiments of the present disclosure. A computing system 500 (e.g., a computing system including one or more computing devices, at least one of which includes one or more processors and one or more memory devices including tangible non-transitory computer readable media) that can perform one or more actions or operations including sending, receiving, processing, generating, and/or storing data (e.g., vehicle map service data) according to example embodiments of the present disclosure. Further, one or more of the instructions executed or implemented on the system 500 can be executed or implemented on one or more computing devices or computing systems including, for example, the vehicle map service system 114, the remote map service system 120, and/or the remote vehicle service system 130. Further, one or more of the instructions stored on the memory device 510 can be executed or implemented as an algorithm on the hardware components of the devices disclosed herein.

As shown in FIG. 5, the computing system 500 includes a vehicle map service system 510; a basemap provider client system 512, a local frame provider client system 514, a basemap data harvester 516, a dynamic data harvester 518, a map service client system 522, a vehicle service client system 524, a navigation client system 526, and a fusion client system 528.

In some embodiments, the vehicle map service system 114 can include one or more data services client systems that can be used to bridge the local map in a vehicle (e.g., the vehicle 110) with map data that is stored remotely (e.g., stored in a cloud computing system). The one or more data services client systems can manage the download and caching of basemap data over vehicle connections (e.g., WAN), dynamic distribution of local map data via the VMS service, and capture and upload of sensor and autonomous vehicle system observations for processing. These data services client systems can be used to determine the vehicle's dynamic position, for example, transforming local map data used by the vehicle into the vehicle's reference frame, and publishing that data for a user by the service systems.

The data services clients can include, for example, a basemap provider client system 512, a local frame provider client system 514, a basemap data harvester 516, and a dynamic data harvester 518. The local frame provider can provide a shared local Cartesian coordinate frame near the vehicle to simplify processing of localized map data. The data service client systems can publish a continuously updated coordinated local reference frame for the other client systems of the vehicle map service system.

In some embodiments, another remote map service system can manage a local cache of map data provided by geographic information system cloud computing systems and downloads and incorporate dynamic data inputs including traffic or a dynamic local map to the VMS core around the vehicle's current location, which can then be rebroadcast to service systems that are subscribed.

The basemap data harvester 516 can listen on the VMS service for other service systems observed variations of the world from published basemap data, buffers or processes locally as necessary, and can send to a remote service for central integration when connectivity is available. The basemap data harvester 516 can be used to update a fairly static map with corrections to road attributes and geometry. For example, if a basemap provider broadcasts an intersection with two outgoing roads, and the vehicle's driving engine rebroadcasts a sensor-fused map showing a third outgoing road observed by sensors, this service can compute the difference and store the evidence of a new road segment for later upload to the remote map service system (e.g., the geographic information system cloud computing system).

Further, the dynamic data harvester 518 can receive dynamic observations from other client systems of the vehicle map service system 114, including location tracks and/or hazards/incidents and can ensure that these observations are shared in a timely fashion with a live service. In addition to current GPS-based location tracks, the dynamic data harvester 518 can receive map-registered information derived from sensor fusion with the geographic information system service provider map, such as positions associated with an identified road or lane.

Various clients of the vehicle map service system 510 can communicate with the data services clients including: a map service client system 522, a vehicle service client system 524, a navigation client system 526, a data fusion client system 528, and/or other client systems associated with other vehicle client systems (e.g., a dashboard camera client system). For instance, the vehicle service client system 524 can receive local map data relevant to vehicle safety, efficiency, and/or autonomy. The vehicle service client system 524 can in turn provide map observations from sensors, using on-board recognition and reasoning to turn sensor data into semantic map-registered data. The vehicle service client system 524 can operate on a separate real-time operating system, and communicate to a vehicle operating system via in-vehicle networking.

The navigation client system 526 can communicate with various navigation applications including other navigation client systems that operate on other remote map service systems. Data and/or information managed by navigation applications can annotate the local map in terms of current route intent, and can also provide enhanced location tracking and map matching support to improve turn-by-turn guidance and route tracking.

Figure 6:
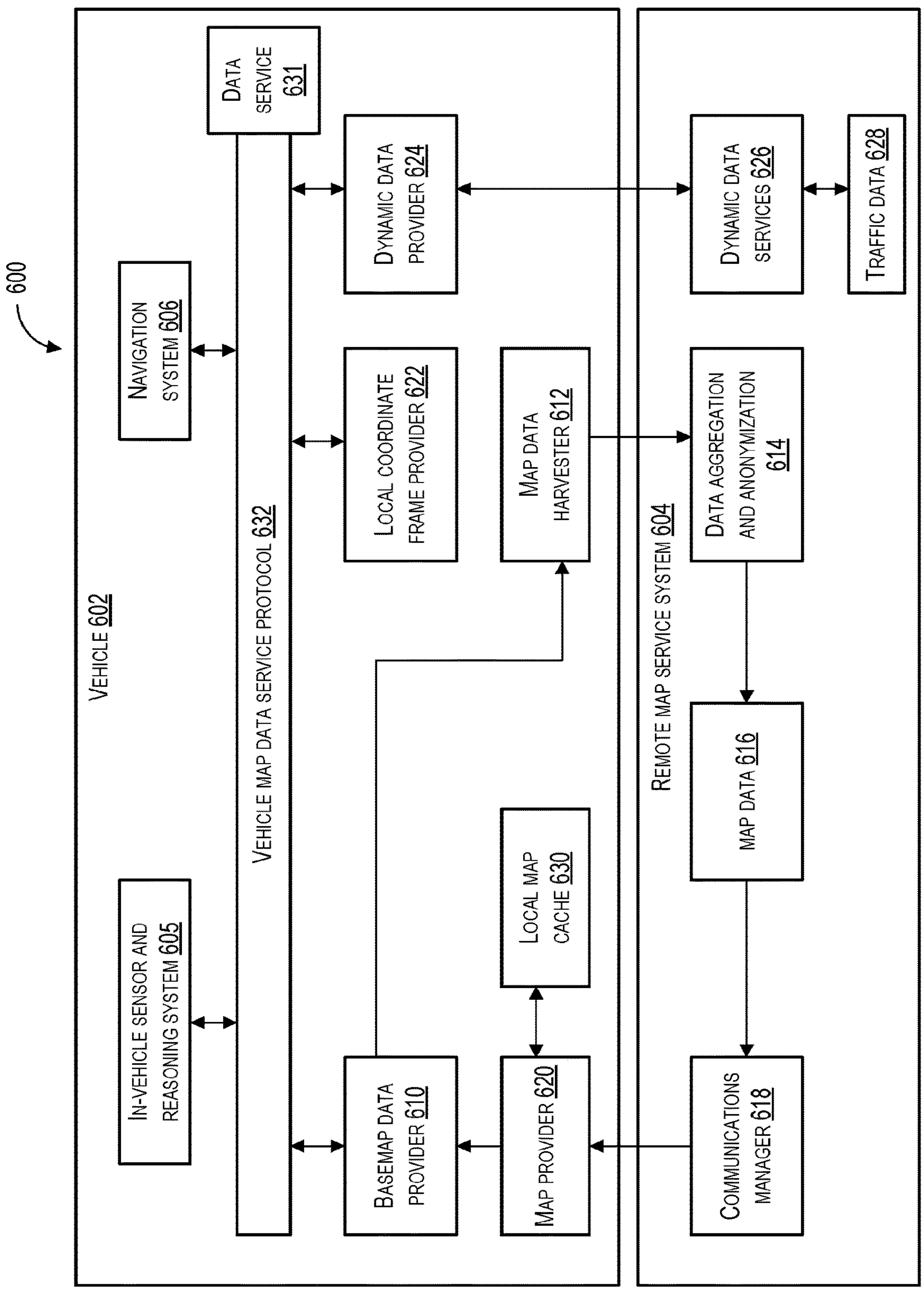
FIG. 6 depicts an example of service systems according to example embodiments of the present disclosure.

FIG. 6 depicts an example of service systems according to example embodiments of the present disclosure. A computing system 600 (e.g., a computing system including one or more computing devices, at least one of which includes one or more processors and one or more memory devices including tangible non-transitory computer readable media) that can perform one or more actions or operations including sending, receiving, processing, generating, and/or storing data (e.g., vehicle map service data). Further, one or more of the instructions executed or implemented on the system 600 can be executed or implemented on one or more computing devices or computing systems including, for example, the vehicle map service system 114, the remote map service system 120, and/or the remote vehicle service system 130. Further, one or more of the instructions stored on a memory device of the computing system 600 can be executed or implemented as an algorithm on the hardware components of the devices disclosed herein. As shown in FIG. 6, the computing system 600 includes a vehicle 602, a remote map service system 604, an in-vehicle sensor and reasoning system 605, a navigation system 606, a basemap data provider 610, a map data harvester 612, a data aggregation and anonymization system 614, map data 616, communications manager 618, a map provider 620, a local coordinate frame provider 622, a dynamic data provider 624, dynamic data services 626, traffic data 628, local map cache 630, vehicle mapping service (VMS) data service 631, and a vehicle map service protocol 632.

The VMS data service 631 can manage the flow of data between clients by capturing data from providers and re-broadcasting data to subscribers using a VMS protocol 632. The VMS protocol is a data protocol that permits construction and sharing of a dynamic model of a map surrounding a vehicle (e.g., the vehicle 602). The VMS protocol 632 can provide a common language and world model for map data providers and consumers, ranging from basemap and traffic providers to the sensor and real-time operating systems of the vehicle 602.

A vehicle can include an in-vehicle sensor and reasoning system 605 and a navigation system 606 with which the vehicle can send or receive data including vehicle map service data. The in-vehicle sensor and reasoning system 605 can include one or more sensors (e.g., one or more LIDAR devices, cameras, sonar, and/or radar) that can be used to generate sensor data based on the state of the environment external to the vehicle 602. Further the in-vehicle sensor and reasoning system 605 can determine the state of the environment external to the vehicle 602 based at least in part on the sensor data. The navigation system 606 can include one or more devices that can be used to determine the local or global location of the vehicle 602 (e.g., GPS systems and/or proximity sensors).

The basemap data provider 610 can send and/or receive vehicle map service data to and from the vehicle 602. The vehicle map service data managed by the basemap data provider 610 can include a local map of an area within a predetermined distance of the vehicle 602. The basemap provider can publish a dynamic map associated with the location of the vehicle 602 which can be subscribed to by client systems (e.g., vehicle systems) of the vehicle 602.

The map data harvester 612 can listen for different variations of an area that are provided by other service systems (e.g., other vehicles) and can receive data associated with changes in the state of an area (e.g., changes in road segments or lane segments) that can be compared and stored for later use by the other service systems. Further, the map data harvester 612 can send data to the data aggregation and anonymization system 614.

The data aggregation and anonymization system 614 can receive data from multiple vehicle map service clients including the map data harvester 612. Further, the data aggregation and anonymization system 614 can aggregate the data received from various vehicle map service clients and remove personally identifying information from the vehicle map service data. In this way, the privacy of service systems can be enhanced.

The data from the data aggregation and anonymization system 614 can include the map data 616 which can include anonymized information about the map of the area in which the vehicle 602 is present. The map data 616 can be used by the communications manager 618. The communications manager 618 can manage copying map data from a remote system (e.g., the remote vehicle service system and/or the remote map service system) to a local system of a vehicle (e.g., the vehicle map service system). For example, the communications manager 618 can include services associated with determining that the map data for an area (e.g., an area of interest) has been transmitted from the remote map service system to a client system (e.g., a vehicle) in communication with the remote map service system. In this way, the recipient of the map data does not lack map data.

The data from the communications manager 618 can be sent to a map provider 620, which can send and receive map data to and from a local map cache 630. The local map cache 630 can include data associated with a local map of an area (e.g., the area travelled by the vehicle 602). Further, the map provider 620 can send data to the basemap provider 610, which can then be sent to the vehicle 602.

The local coordinate frame provider 622 can send and/or receive data including vehicle map service data to and from the vehicle 602 and can include vehicle map service data associated with a local Cartesian frame near the vehicle 602. The local coordinate frame provider 602 can publish a continuously updated coordinated local reference frame by use of the rest of the system.

The dynamic data provider 624 can send and/or receive data including vehicle map service data associated with dynamic observations including location tracks, hazards, and/or traffic events (e.g., road closures). Further, the dynamic data provider 624 can exchange data with the dynamic data services 626 which can provide one or more services associated with the data provided to the dynamic data provider 624. Further, the dynamic data provider 624 can exchange data including the traffic data 628, which can include information associated with the state of traffic on one or more road segments (e.g., blocked intersections, the direction of the flow of vehicles through roadways, the velocity of traffic flow, the density of vehicle traffic, and/or the state of traffic signals at various roads).

In some embodiments, the vehicle 602 can include the in-vehicle sensor and reasoning system 605, the navigation system 606, the basemap data provider 610, the map data harvester 612, the map provider 620, the local coordinate frame provider 622, the dynamic data provider 624, and the local map cache 630. Furthermore, in some embodiments, the remote map service system 604 can include the data aggregation and anonymization system 614, the map data 616, the communications manager 618, the dynamic data services 626, and the traffic data 628.

In alternative embodiments, the vehicle 602 and the remote map service system 604 can include different combinations of the in-vehicle sensor and reasoning system 605, the navigation system 606, the basemap data provider 610, the map data harvester 612, the data aggregation and anonymization system 614, the map data 616, the communications manager 618, the map provider 620, the local coordinate frame provider 622, the dynamic data provider 624, the dynamic data services 626, the traffic data 628, and/or the local map cache 630.

Figure 7:
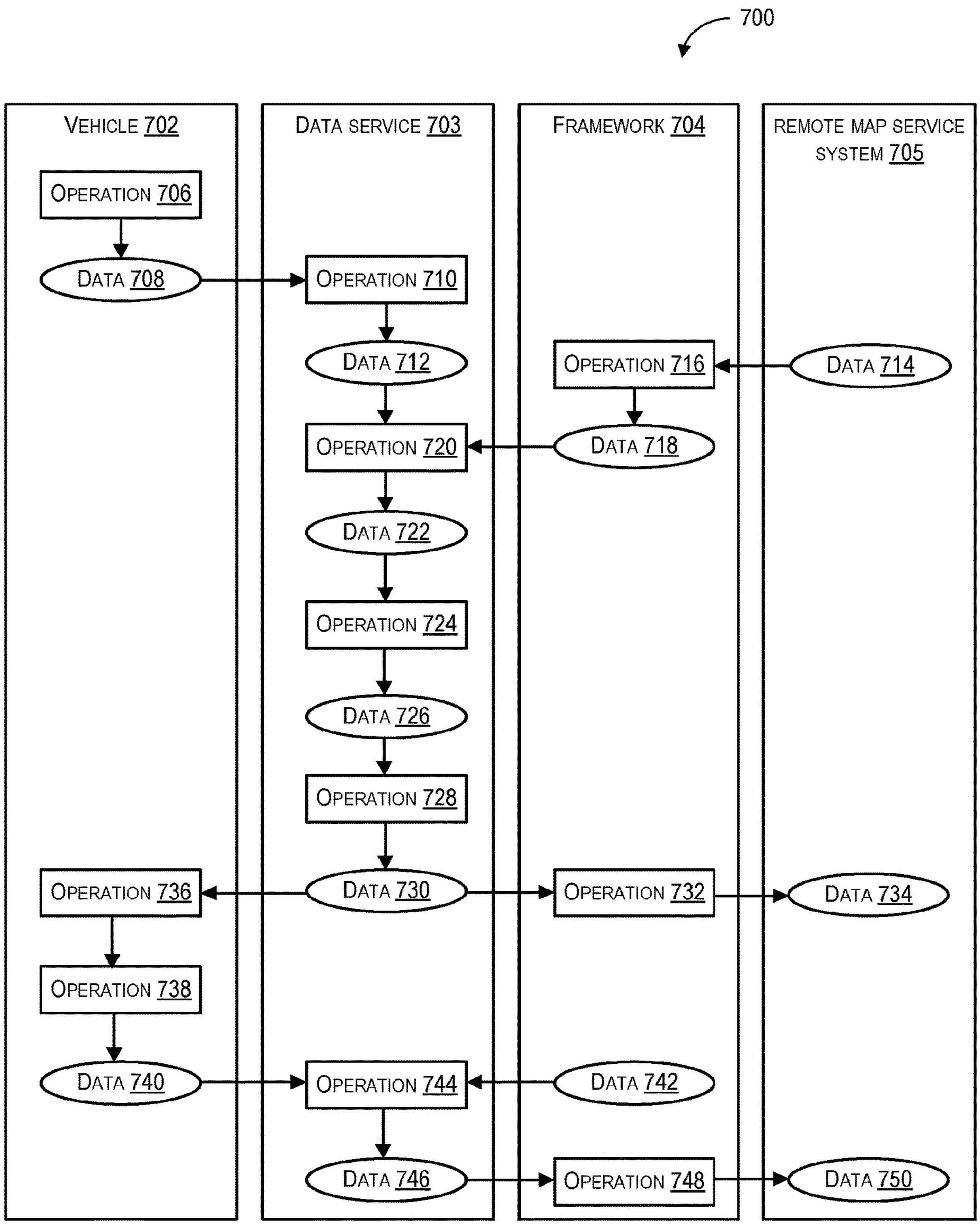
FIG. 7 depicts an example of service systems according to example embodiments of the present disclosure.

FIG. 7 depicts an example of service systems according to example embodiments of the present disclosure. A computing system 700 (e.g., a computing system including one or more computing devices, at least one of which includes one or more processors and one or more memory devices including tangible non-transitory computer readable media) that can perform one or more actions or operations including sending, receiving, processing, generating, and/or storing data (e.g., vehicle map service data). Further, one or more of the instructions executed or implemented on the system 700 can be executed or implemented on one or more computing devices or computing systems including, for example, the vehicle map service system 114, the remote map service system 120, and/or the remote vehicle service system 130. Further, one or more of the instructions stored on a memory device of the computing system 700 can be executed or implemented as an algorithm on the hardware components of the devices disclosed herein.

As shown in FIG. 7, the computing system 700 includes a vehicle 702, a data service 703, a framework 704, remote map service systems 705, operation 706, data 708, operation 710, data 712, data 714, operation 716, data 718, operation 720, data 722, operation 724, data 726, operation 728, data 730, operation 732, data 734, operation 736, operation 738, data 740, data 742, operation 744, data 746, operation 748, and data 750.

The vehicle 702 can include a vehicle capable of transporting passengers and/or cargo and can include the features of the vehicle 110 shown in FIG. 1. Further the vehicle 702 can communicate with one or more devices and/or systems including the remote map service systems 705. For example, the vehicle 702 can send and/or receive data to and from the remote map service systems 705 via one or more networks (e.g., wired and/or wireless communication networks including features of the network 102 shown in FIG. 1). The data service 703 can include a data service associated with the vehicle 702. The framework 704 can include a framework associated with the vehicle 702. The remote map service systems 705 can include a geographic information system service provider that can include the features of the remote map service system 120 shown in FIG. 1. Further, the remote map service systems 705 can communicate with one or more devices and/or systems including the vehicle 110.

The vehicle 702 can perform the operation 706 which can include receiving one or more outputs from one or more positional devices used to determine the location of the vehicle 702 (e.g., a GPS device) and/or one or more sensors (e.g., one or more LIDAR devices, one or more cameras, one or more radar devices, one or more sonar devices, and/or one or more microphones) of the vehicle 702. Further, the vehicle can generate the data 708 which can include positional information (e.g., orientation of the vehicle) and/or location information associated with the location of the vehicle 702 (e.g., the latitude, longitude, and/or altitude) of the vehicle 702. The vehicle 702 can send the data 708 to the remote map service systems 705.

The data 708 can be received by the data service 703 which can determine a local transformation of the vehicle 702 at the operation 710. The operation 710 can further include generating the data 712 which includes a local coordinate system and vehicle pose of the vehicle 702. The data service can determine a vehicle horizon and load map data 718 from a local cache around the horizon. The data service can translate geometric data into the local coordinate system. The map data 718 can be downloaded at operation 716 from a remote database 714 that is part of the remote map service system 705. The map data 714 can include map data and/or semantic data (e.g., data including information associated with the area around the vehicle including the location of landmarks and places of interest) associated with the location of the vehicle 702 that can be obtained at the operation 716 and stored in the data 718 which can include a map cache of map data associated with the area around the vehicle 702. In some embodiments, the data 718 can be updated continuously or periodically as the vehicle 702 travels (e.g., updated according to a horizon associated with the vehicle 702).

The data service 703 can perform the operation 720 which can include generating a local map of the geographic area surrounding the vehicle 702. Further, the data service 703 can access the data 722 which can include data associated with road centerlines (e.g., the middle of a road), a road graph (e.g., a graph representation of a road), and/or road attributes (e.g., the road surface type and/or road direction) in the local map. The data service 703 can than perform the operation 724 which can include integrating the route state (e.g., the location of the vehicle 702 along a planned route) of the vehicle 702 and generate the data 726 which can include an updated travel plan in accordance with the route state of the vehicle 702.

The data service 703 can match the pose of the vehicle (e.g., the vehicle's location, orientation, and/or direction) to the map in the operation 728 which can also include generating the data 730 which includes data associated with the local map including the vehicle 702. In this way, the vehicle's pose can be reflected when the local map is displayed in the vehicle 702. The framework 704 can perform the operation 732 on the data 730. The operation 732 can include using the data 730 to generate the data 734 which can include traffic data based on the data 730. For example, one hundred vehicles in an area can respectively contribute their location on one hundred separate maps which can then be aggregated to generate traffic data that includes the location of all one hundred vehicles on a single map.

The data service 703 can send the data 730 to the vehicle 702 which can perform the operation 736 based at least in part on the data 730. The operation 736 can include the vehicle 702 incorporating the data 730 in vehicle data associated with providing driver assistance (e.g., information associated with vehicle location, directions to a destination, and/or places of interest proximate to the vehicle 702). Further, the vehicle 702 can perform the operation 738 which can include detecting and overlaying sign information (e.g., speed limit sign information) on the local map. The vehicle 702 can generate the data 740 which can include information associated with road signs including the location of the road signs and what is indicated by the road signs (e.g., the speed limit or direction of travel). The vehicle 702 can send the data 740 to the data service 703 which can perform the operation 744 which can be based at least in part on the data 742 which can include the data 718 and/or a map cache of map data associated with the area around the vehicle 702 at the current time.

The data service 703 can generate the data 746 which can include information associated with the road signs detected by the vehicle 702 and can perform operation 748 which can include determining which of the road signs in the data 746 are conflicting (e.g., not in accordance with the previously determined state of the road signs including the location of the road sign and/or what is indicated by the road signs) or new (e.g., signs that were not previously detected). The framework 704 can then generate the data 750 which can include the data 714 and/or semantic data (e.g., data associated with the area around the vehicle including the location of landmarks and places of interest) associated with the location of the vehicle 702.

In alternative embodiments, the computing system 700 can perform the operations (e.g., the operation 706, the operation 710, and/or the operation 716) using different combinations of the vehicle 702, the data service 703, the framework 704, and/or the remote map service systems 705. Further, the computing system 700 can generate data (e.g., the data 708, the data 712, the data 742, and/or the data 750) using different combinations of the vehicle 702, the data service 703, the framework 704, and/or the remote map service systems 705.

Figure 8:
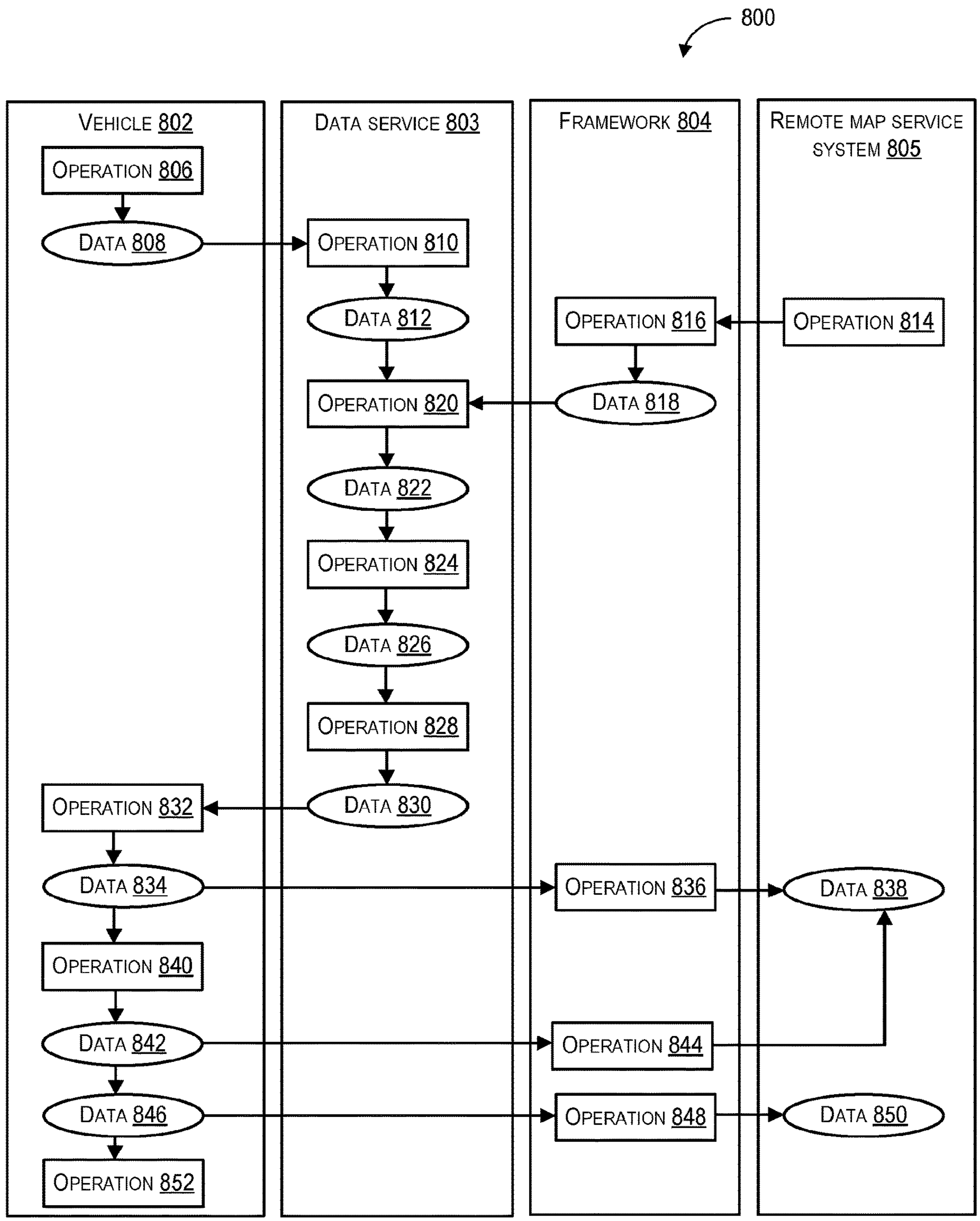
FIG. 8 depicts an example of service systems according to example embodiments of the present disclosure.

FIG. 8 depicts an example of service systems according to example embodiments of the present disclosure. A computing system 800 (e.g., a computing system including one or more computing devices, at least one of which includes one or more processors and one or more memory devices including tangible non-transitory computer readable media) that can perform one or more actions or operations including sending, receiving, processing, generating, and/or storing data (e.g., vehicle map service data) according to example embodiments of the present disclosure. Further, one or more of the instructions executed or implemented on the system 800 can be executed or implemented on one or more computing devices or computing systems including, for example, the vehicle map service system 114, the remote map service system 120, and/or the remote vehicle service system 130. Further, one or more of the instructions stored on a memory device of the computing system 800 can be executed or implemented as an algorithm on the hardware components of the devices disclosed herein.

As shown in FIG. 8, the computing system 800 includes a vehicle 802, data service 803, framework 804, remote map service systems 805, operation 806, data 808, operation 810, data 812, data 814, operation 816, data 818, operation 820, data 822, operation 824, data 826, operation 828, data 830, operation 832, data 834, operation 836, data 838, operation 840, data 842, operation 844, data 846, operation 848, data 850, and data 852.

The vehicle 802 can include a vehicle capable of transporting passengers and/or cargo and can include the features of the vehicle 110 shown in FIG. 1. Further the vehicle 802 can communicate with one or more devices and/or systems including the remote map service systems 805. For example, the vehicle 802 can send and/or receive data to and from the remote map service systems 805 via one or more networks (e.g., wired and/or wireless communication networks including the network 102 shown in FIG. 1). The data service 803 can include a data service associated with the vehicle 802. The framework 804 can include a framework associated with the vehicle 802. The remote map service systems 805 can include a geographic information system service provider that can include the features of the remote map service system 120 shown in FIG. 1. Further, the remote map service systems 805 can communicate with one or more devices and/or systems including the vehicle 110.

The vehicle 802 can perform the operation 806 which can include receiving one or more outputs from one or more positional devices used to determine the location of the vehicle 802 (e.g., a GPS device) and/or one or more sensors (e.g., one or more LIDAR devices, one or more cameras, one or more radar devices, one or more sonar devices, and/or one or more microphones) of the vehicle 802. Further, the vehicle can generate the data 808 which can include positional information and/or location information associated with the location of the vehicle 802 (e.g., the latitude, longitude, and/or altitude) of the vehicle 802. The vehicle 802 can then send the data 808 to the remote map service systems 805.

The data service 803 can receive the data 808 and can use the data 808 to determine a local transformation of the vehicle 802 at the operation 810 which can further include generating the data 812 which includes a local coordinate system and vehicle pose of the vehicle 802. The remote map service systems 805 can access the data 814 which can include semantic data (e.g., data associated with the area around the vehicle including the location of previously travelled locations, traffic flow information, and places of interest) associated with the vehicle 802 that can be obtained by the framework 804 at the operation 816 and stored in the data 818 which can include a map cache of map data associated with the area around the vehicle 802. In some embodiments, the data 818 can be updated continuously or periodically as the vehicle 802 travels (e.g., updated according to a horizon associated with the vehicle 802).

The data service 803 can perform the operation 820 which can include generating a local map of the geographic area surrounding the vehicle 802. Further, the data service 803 can access the data 822 which can include data associated with road centerlines (e.g., a line running along the center of a road), a road graph (e.g., a graph representation of a road), and/or road attributes (e.g., the road surface type and/or road direction), a lane graph (e.g., a graph representation of lanes in a road or other pathway), and/or lane attributes (e.g., whether a lane is an HOV lane or bicycle lane) in the local map. The data service 803 can than perform the operation 824 which can include integrating the route state (e.g., the location of the vehicle 802 along a planned route) of the vehicle 802 and generate the data 826 which can include an updated travel plan in accordance with the route state of the vehicle 802.

The data service 803 can add pre-mapped geometry associated with the road travelled by the vehicle to the local map in the operation 828 which can also include generating the data 830 which includes data associated with signs and physical lane elements in a local map including the vehicle 802. The data service 803 can then send the data 830 to the vehicle 802 which can perform the operation 832 based at least in part on the data 830. The operation 832 can include processing one or more sensor outputs of the vehicle 802 and adding the data 830. Further, the operation 832 can include the vehicle 802 generating the data 834 which can include information associated with the signs and physical lane elements. The vehicle 802 can send the data 834 to the framework 804 which can perform operation 836 which can include extracting the sign and lane information from the data 834 and adding the sign and lane information to the data 838 which can include the data 814 and/or semantic data (e.g., data associated with information about the area around the vehicle including the location of landmarks, previously visited locations, and places of interest) associated with the vehicle 802.

The vehicle 802 can perform the operation 840 which can include localizing the position of the vehicle 802 on the local map and generating data 842 which can include a refined pose of the vehicle (e.g., a more accurate location, orientation, and/or direction of the vehicle 802) based on the combination of sensor outputs and data from the vehicle 802. Further, the operation 840 can include generating data 846 which can include lane information including the lane in which the vehicle 802 is located.

The vehicle 802 can send the data 842 to the framework 804 which can perform operation 844 which can include determining flow lines (e.g., flow lines associated with the direction and/or path of vehicle travel along a road segment). Output from the operation 844 can be stored in the data 838 which includes semantic data associated with one or more maps. Furthermore, the vehicle 802 can send the data 846 to the framework 804 which can perform operation 848 which can include determining the location of lanes in the local map and storing the output of the operation 848 in the data 850. The output from the operation 844 stored in the data 838 can include traffic data associated with the state of traffic throughout an area including the area traversed by the vehicle 802. The vehicle 802 can perform operation 852 which can include using the data 842 and/or the data 846 to perform actions associated with keeping the vehicle 802 in the proper lane as the vehicle 802 is in transit.

In alternative embodiments, the computing system 800 can perform the operations (e.g., the operation 806, the operation 810, the operation 814, and/or the operation 816) using different combinations of the vehicle 802, the data service 803, the framework 804, and/or the remote map service systems 805. Further, the computing system 800 can generate data (e.g., the data 808, the data 812, the data 844, and/or the data 850) using different combinations of the vehicle 802, the data service 803, the framework 804, and/or the remote map service systems 805.

Figure 9:
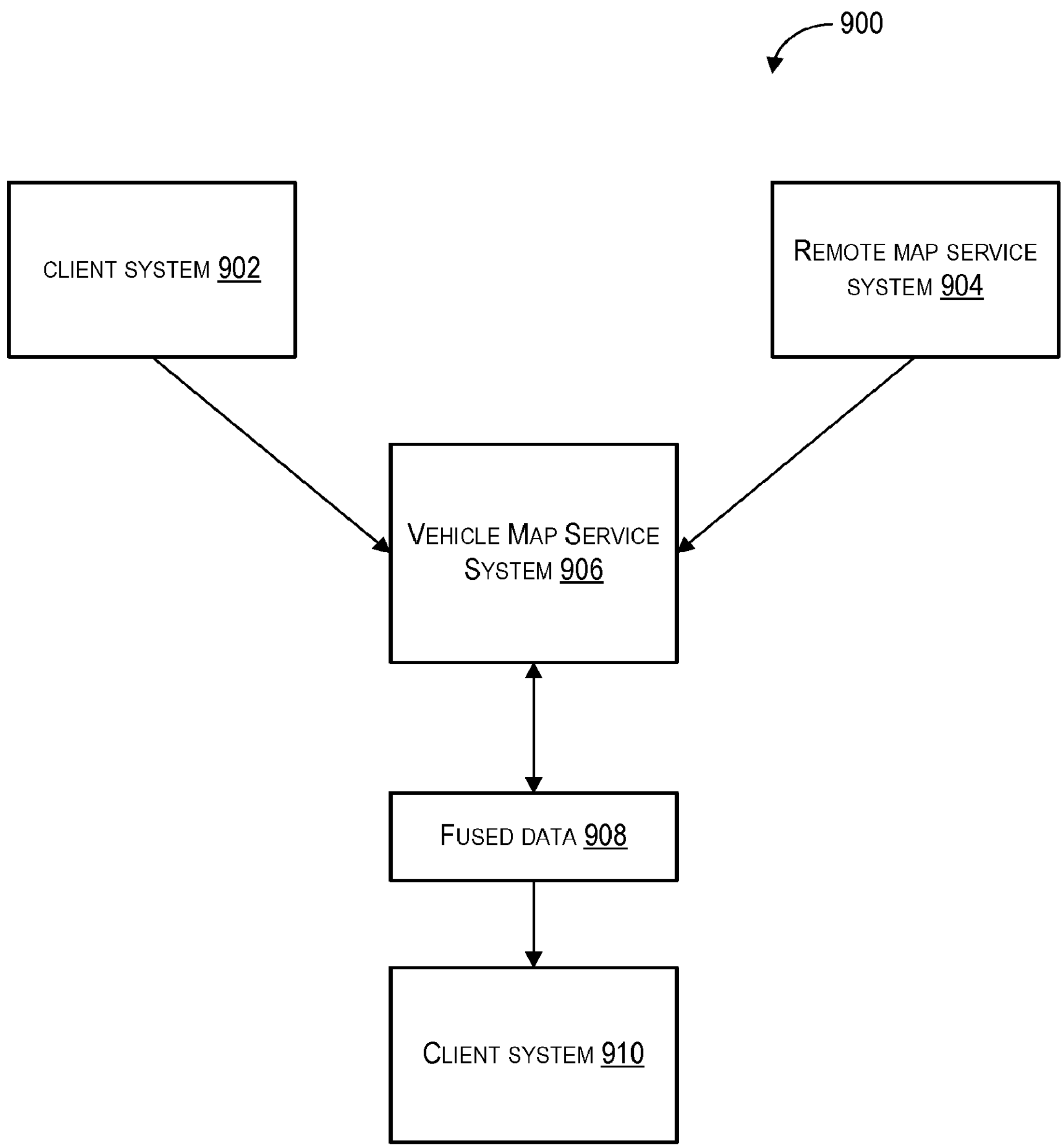
FIG. 9 depicts an example of service systems according to example embodiments of the present disclosure.

FIG. 9 depicts an example of service systems according to example embodiments of the present disclosure. A computing system 900 (e.g., a computing system including one or more computing devices, at least one of which includes one or more processors and one or more memory devices including tangible non-transitory computer readable media) that can perform one or more actions or operations including sending, receiving, processing, generating, and/or storing data (e.g., vehicle map service data) according to example embodiments of the present disclosure. Further, one or more of the instructions executed or implemented on the system 900 can be executed or implemented on one or more computing devices or computing systems including, for example, the vehicle map service system 114, the remote map service system 120, and/or the remote vehicle service system 130. Further, one or more of the instructions stored on a memory device of the computing system 900 can be executed or implemented as an algorithm on the hardware components of the devices disclosed herein.

As shown in FIG. 9, the computing system 900 includes a client system 902, a remote map service system 904, a vehicle map service system 906, fused data 908, and a client system 910.

The client system 902 can include one or more sensors that can detect one or more states of vehicle (e.g., the vehicle 110) and/or the environment external to the vehicle (e.g., the state of roads, vehicles, and buildings external to the vehicle 110). For example, the client system 902 can include one or more cameras, one or more LIDAR devices, one or more microphones, one or more radar devices and/or one or more sonar devices.

Furthermore, one or more sensors associated with the client system 902 can generate one or more sensor outputs that can be received by the vehicle map service system 906. For example, the client system 902 can include a camera located at the front center portion of a vehicle (e.g., the vehicle 110) that can generate sensor data including one or more images of the area visible to the camera. The one or more images can include images of a road sign at an intersection. The client system 902 can then send the sensor data to the vehicle map service system 906 which can be a computing system located in the same vehicle as the client system 902. The vehicle map service system 906 can determine, based at least in part on the sensor data received from the client system 902, that the road sign at the intersection indicates a school zone for a school that was recently opened in the area.

The remote map service system 904 can include a geographic information system service provider (e.g., the remote map service system 120) that can generate data (e.g., vehicle map service data) that can include one or more maps associated with the area in which the vehicle associated with the vehicle map service system 906 is present. Further, the remote map service system 904 can send vehicle map service data including the one or more maps of the area to the vehicle map service system 902. The vehicle map service data sent from the remote map service system 904 can include data associated with a school that is being constructed in the area based on satellite imagery received two weeks ago by the remote map service system 904.

The vehicle map service system 906 can fuse the sensor data received from the client system 902 and the vehicle map service data received from the remote map service system 904 into vehicle map service data that includes the fused data 908 which can include the information associated with the sensor data (e.g., the school zone information) from the client system 902 and the vehicle map service data including the satellite imagery of the area from the remote map service system 904. The vehicle map service data including the fused data can be included in the fused data 908 which is sent to the client system 910 which can be a remote computing device that can receive and/or distribute vehicle map service data. In some embodiments, the vehicle map service system 906 can send the fused data 908 to the remote map service system 904 which can update its maps with the new information about the school zone indicated in the sign detected by the client system 902.

Figure 10:
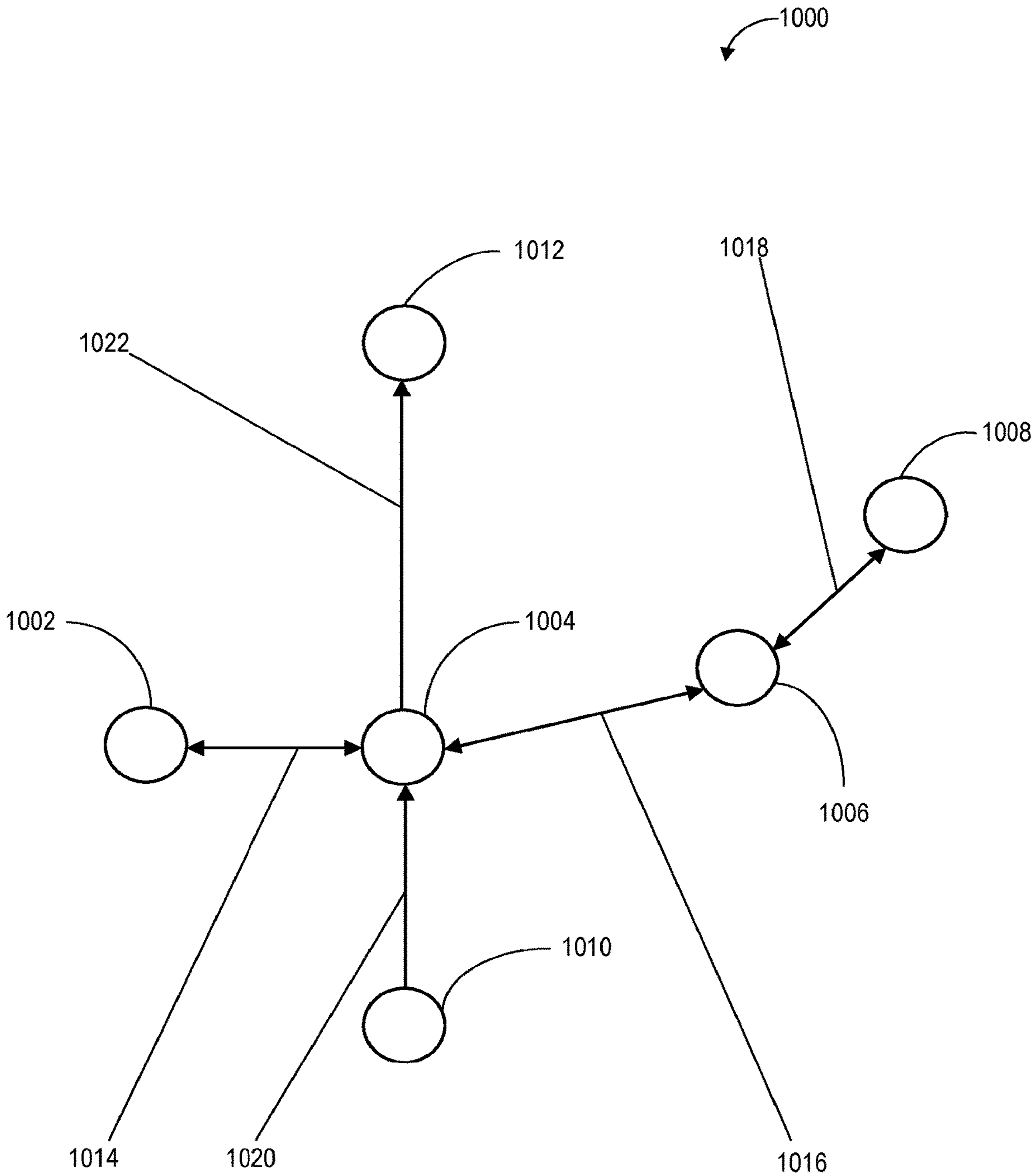
FIG. 10 depicts an example of vehicle map service data including road segment data according to example embodiments of the present disclosure.

FIG. 10 depicts a diagram including an example of vehicle map service data including road segments according to example embodiments of the present disclosure. One or more portions of vehicle map service data 1000 can be executed or implemented on one or more computing devices or computing systems including, for example, the vehicle map service system 114, the remote map service system 120, and/or the remote vehicle service system 130. Further, one or more portions of the vehicle map service data 1000 can be executed or implemented as an algorithm on the hardware components of the devices disclosed herein.

As shown in FIG. 10, the vehicle map service data 1000 includes a road graph node 1002, a road graph node 1004, a road graph node 1006, a road graph node 1008, a road graph node 1010, a road graph node 1012, a road segment 1014, a road segment 1016, a road segment 1018, a road segment 1020, and a road segment 1022.

The vehicle map service data 1000 can include information associated with one or more roads including one or more roads that can be travelled by a vehicle (e.g., the vehicle 110). Furthermore, the vehicle map service data can include the vehicle map service data associated with the road graph layer 408 shown in FIG. 4. The road graph nodes including the road graph node 1002, a road graph node 1004, a road graph node 1006, a road graph node 1008, a road graph node 1010, a road graph node 1012 can be associated with one or more locations at which the one or more road segments (e.g., the road segment 1014 and the road segment 1016) intersect.

Each of the road graph segments can be associated with information including the number of lanes in a road graph segment, the direction of travel in each road graph segment, and/or the connectivity that is allowed at each of the road graph nodes at which two or more of the road graph segments intersect. For example, the road graph segment 1014 corresponds to a bi-directional road (e.g., a two-way street) with travel allowed in the directions leading from the road graph node 1002 to the road graph node 1004 and/or from the road graph node 1004 to the road graph node 1002. By way of further example, the road graph segment 1022 corresponds to a unidirectional road (e.g., one-way street) in which travel is only allowed in the direction leading from the road graph node 1004 to the road graph node 1012 but not in the direction from the road graph node 1012 to the road graph node 1004.

Furthermore, each of the road graph nodes (e.g., the road graph node 1004) can be associated with a connectivity that is allowed with respect to the road graph segments that intersect at a road graph node. For example, the road graph node 1004 connects the road graph segment 1014, the road graph segment 1016, the road graph segment 1020, and the road graph segment 1022. A vehicle travelling along a road corresponding to the road graph segment 1014 towards the intersection corresponding to the road graph node 1004 can proceed along the road corresponding to the road graph segment 1016 to the intersection corresponding to the road graph node 1006 and then continue along the road corresponding to the road graph segment 1018 to the intersection corresponding to the road graph node 1008. Further, at the intersection corresponding to the road graph node 1004, a vehicle can continue along the road corresponding to the road graph segment 1016 and turn right to proceed on the road graph segment 1022, but is not allowed to turn left onto the road corresponding to the road graph segment 1020 in which travel is only allowed in the direction leading from the road graph node 1010 to the road graph node 1004.

Figure 11:
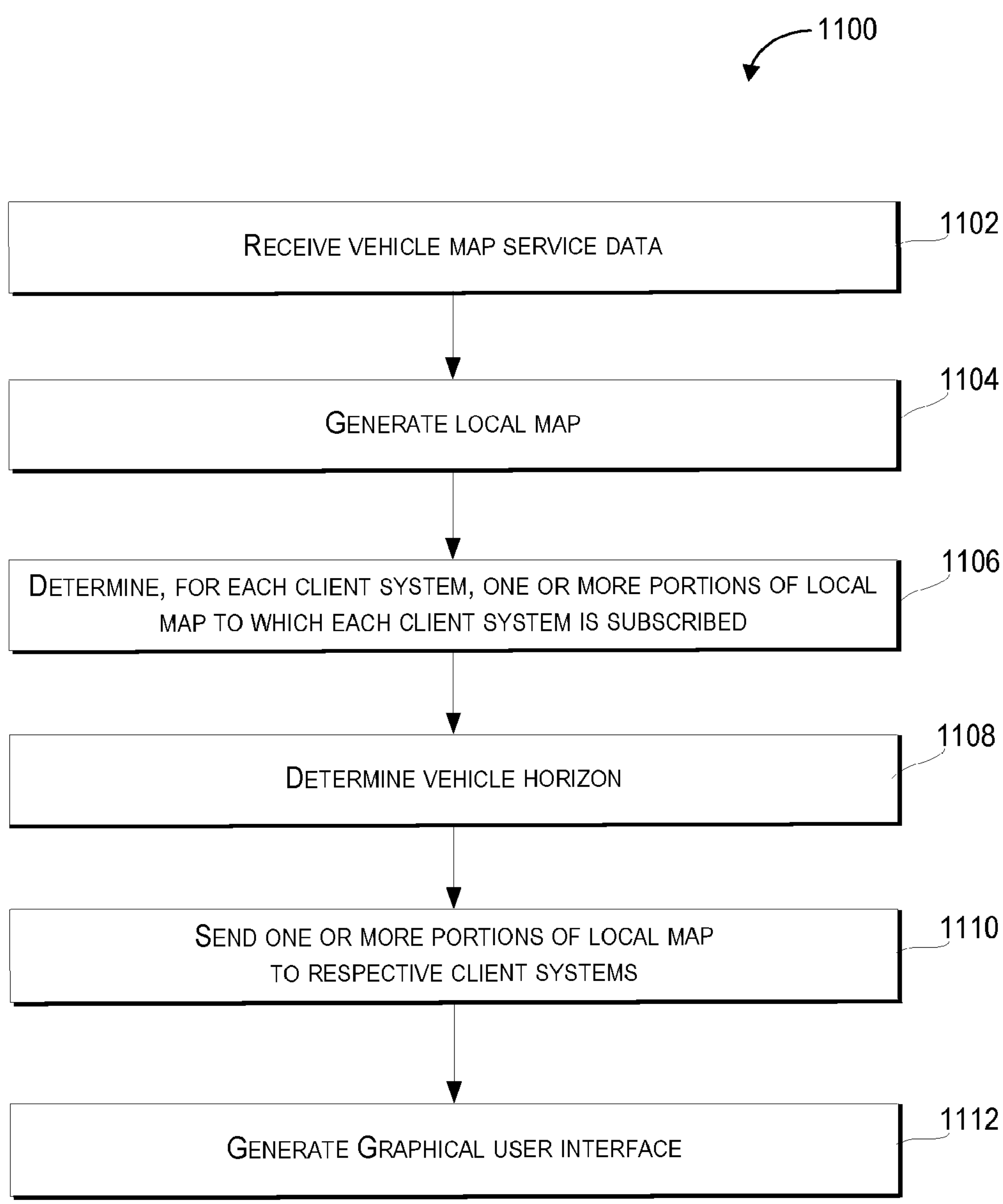
FIG. 11 depicts a flow diagram of the operation of a vehicle map service system according to example embodiments of the present disclosure.

FIG. 11 depicts a flow diagram of an example method 1100 of operating a vehicle map service according to example embodiments of the present disclosure. One or more portions of the method 1100 can be executed or implemented on one or more computing devices or computing systems including, for example, the vehicle map service system 114, the remote map service system 120, and/or the remote vehicle service system 130. Further, one or more portions of the method 1100 can be executed or implemented as an algorithm on the hardware devices or systems disclosed herein. FIG. 11 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include receiving vehicle map service data from at least one map service system. In some examples, the vehicle map service data can be received from a plurality of client systems of a vehicle map service system associated with a vehicle. For instance, vehicle map service data may be received from sensors, dashcams, and the like. In some examples, the vehicle map service data can be received from a plurality of service systems. For instance, the vehicle map service data can be received from a remote map service system, a remote client service system, and/or a vehicle map service system. The vehicle map service data can include information associated with a geographic area. For example, the vehicle map service system 114 can receive vehicle map service data via an internal interconnect of a vehicle map service client system or a communication network (e.g., a wireless or wired network including a LAN, WAN, or the Internet) through which one or more signals (e.g., electronic signals) and/or data can be sent or received.

In some embodiments, the vehicle map service data can be in accordance with a vehicle map service protocol associated with sending and/or receiving information between the plurality of service systems. For example, the vehicle map service protocol can specify one or more data formats or data rules associated with the vehicle map service data. Further, the vehicle map service protocol can specify a layering scheme for the vehicle map service data that can be used to control access to various portions of the vehicle map service data.

In some embodiments, the vehicle map service data can include a plurality of map layers. Each layer of the plurality of layers can be associated with one or more states, features, or characteristics of the geographic area. For example, different portions of the vehicle map service data associated with different aspects of the local map can be associated with different layers including layers associated with signs, vehicle location, and/or road attributes.

In some embodiments, each of the one or more portions of the vehicle map service data can be associated with a confidence value, probability envelope, and/or probability distribution indicative of the accuracy of the respective portion of the vehicle map service data. For example, the confidence value can include a numerical value in which a higher confidence value is correlated with a higher accuracy of the respective portion of the vehicle map service data.

Further, in some embodiments, the one or more states of the geographic area can be associated with a plurality of properties including a location of the vehicle (e.g., latitude, longitude, and/or altitude of the vehicle), one or more road segment locations, one or more lane locations, and/or one or more sign locations (e.g., a location of a sign and data associated with the type of sign).

In some embodiments, the vehicle map service data can include information associated with one or more sensor outputs of the plurality of client systems (e.g., sensor outputs from one or more vehicle sensors of the plurality of client systems including camera outputs, microphone outputs, and/or tactile sensor outputs), one or more maps provided by the plurality of service systems (e.g., one or more maps of an area traversed by the vehicle), and/or one or more machine-learned models provided by a plurality of service systems (e.g., one or more machine-learned models trained to detect and/or recognize one or more objects).

In some embodiments, the plurality of service systems can include one or more geographic information systems (e.g., the remote map service system 120) and/or one or more vehicle service systems (e.g., the vehicle map service system). The one or more geographic information systems can be associated with the vehicle map service data that includes one or more maps (e.g., one or more maps including indications of the identities and locations of road segments, lane markers, traffic signs, traffic signals, and/or landmarks). The one or more vehicle service systems can be associated with the vehicle map service data that includes information associated with the plurality of client systems (e.g., the state of client systems including navigation systems, in-vehicle graphical user interface systems, and/or vehicle communication systems).

Furthermore, in some embodiments receiving the vehicle map service data can include receiving, from the one or more geographic information systems, first vehicle map service data including one or more maps. Additionally, in some embodiments, receiving the vehicle map service data can include receiving, from the one or more vehicle map service systems, second vehicle map service data including information associated with the plurality of client systems.

At 1104, the method 1100 can include generating, based at least in part on the vehicle map service data, a local map of the geographic area within a vehicle horizon associated with a distance from the vehicle. In some embodiments, the vehicle horizon can be associated with a map of an area within a predetermined distance of the vehicle; a map of an area within a distance the vehicle can reach within a predetermined period of time; a map of an area within a predetermined distance or spatial relationship of the vehicle's current planned navigation path; and/or a map within a predetermined distance or spatial relationship of an alternate navigation path of the vehicle For example, the vehicle map service system 114 can receive vehicle map service data that can include one or more maps from service systems and one or more sensor outputs from different vehicle sensors associated with client systems. The multiple sensor outputs can be used to determine the location of the vehicle with respect to a landmark which can then be used together with the one or more maps to generate the local map which can include features and aspects of the different portions of the vehicle map service data.

In some embodiments, the local map can include a dynamic model of the geographic area surrounding the vehicle. The dynamic model can include a real-time location of the vehicle (e.g., the vehicle 110) in relation to one or more objects external to the vehicle. For example, the vehicle map service system 114 can generate a local map of the area that includes the current location of the vehicle and the current locations of other vehicles, cyclists, and/or pedestrians around the vehicle. Further, the dynamic model can include real-time indications of road closures, hazards, construction areas, and other types of events that can occur in an area.

At 1106, the method 1100 can include determining, for each client system (e.g., vehicle system) of the plurality of client systems, one or more portions of the local map to which each client system is subscribed. For example, the vehicle map service system 114 can receive vehicle map service data including subscription data from the plurality of client systems. The subscription data can include information associated with the one or more portions of the local map to which each of the plurality of client systems is subscribed. The one or more portions of the local map to which each of the plurality of client systems is subscribed can be based on information associated with a layer of the local map to which a client system is subscribed. For example, a vehicle navigation system can subscribe to layers of the vehicle map service data that are associated with displaying the location of the vehicle and objects within two kilometers of the vehicle. Other client system such as a dynamic data provider client of the vehicle map service system may subscribe to all layers.

At 1108, the method 1100 can include determining, a vehicle horizon based at least in part on a geographic location of the vehicle. The vehicle horizon can be associated with the one or more portions of local map provided to the vehicle client systems. Further, the vehicle horizon can be associated with an amount and/or rate of the vehicle map service data being provided to the plurality of client systems. For example, the vehicle map service system 114 can determine that the vehicle 110 is entering an area associated with a high level of signal interference or signal blockage that would reduce the amount of vehicle map service data that the vehicle can receive from remotely located service systems. Prior to entering the area, the vehicle can expand the vehicle horizon so that the vehicle can use vehicle map service data that has been stored when new vehicle map service data is not available from remote sources.

At 1110, the method 1100 can include sending the one or more portions of the local map to which each client system is subscribed to a respective client system of the plurality of client systems. For example, the vehicle map service system 114 can send one or more portions of the local map associated with current traffic conditions to a client system including a route planning system. The route planning system can be subscribed to the one or more portions of the vehicle map service data associated with the state of traffic (e.g., the location of roads in an area and/or the velocity, locations, and direction of travel of vehicles in that same area) and can receive the vehicle map service data associated with the state of traffic in an area on a continuous basis.

At 1112, the method 1100 can include generating a graphical user interface associated with the local map. The graphical user interface can display the local map using one or more symbols including text or images (e.g., a combination of text or graphics that can display representations of data, including the vehicle map service data, to a user of the software application. Further, the graphical user interface component can be generated on a computing device (e.g., an in-vehicle display device) with a physical interface that can receive input (e.g., touch input and/or voice input) from a user to view various portions of the local map and/or representations of the vehicle map service data. Additionally, the graphical user interface component can receive inputs (e.g., user inputs) in order to send, receive, generate, modify, and/or process data associated with the local map and/or the vehicle map service data. By way of example, the vehicle map service system 114 can generate a graphical user interface that is displayed on a display device of the vehicle 110.

Figure 12:
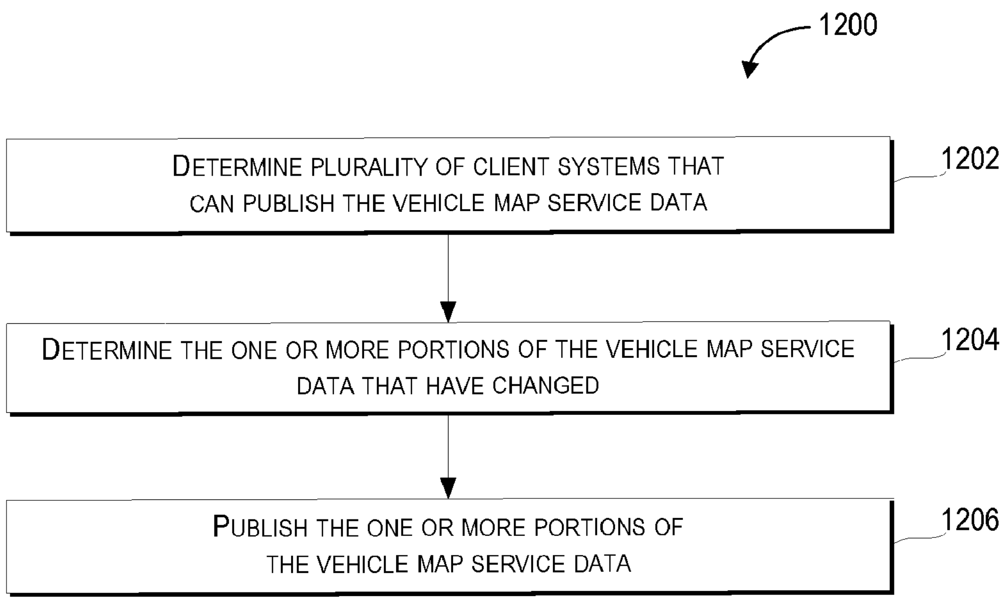
FIG. 12 depicts a flow diagram of the operation of a vehicle map service system according to example embodiments of the present disclosure.

FIG. 12 depicts a flow diagram of an example method 1200 of operating a vehicle map service according to example embodiments of the present disclosure. One or more portions of the method 1200 can be executed or implemented on one or more computing devices or computing systems including, for example, the vehicle map service system 114, the remote map service system 120, and/or the remote vehicle service system 130. Further, one or more portions of the method 1200 can be executed or implemented as an algorithm on the hardware devices or systems disclosed herein. FIG. 12 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include determining the plurality of client systems that can publish one or more portions of the vehicle map service data (e.g., the vehicle map service data of the method 1100) to other client systems of the plurality of client systems. Publishing can include sending the one or more portions of the vehicle map service data to the plurality of client systems that are subscribed to the one or more portions of the vehicle map service data. For example, the vehicle map service system 114 can access a portion of the vehicle map service data (e.g., the message type 302 of the vehicle map service data 300) which can include information indicating whether a client system can publish one or more portions of the vehicle map service data to other client systems. Based on the information in the vehicle map service data, the vehicle map service can determine that the associated client system can publish one or more portions of the vehicle map service data to other client systems.

At 1204, the method 1200 can include determining one or more portions of the vehicle map service data (e.g., the vehicle map service data of the method 1100) that have changed since the one or more portions of the vehicle map service data were most recently published. In some embodiments, the one or more portions of the vehicle map service data that have changed comprise one or more changes associated with the vehicle horizon (e.g., changes in the shape and/or coverage of the vehicle horizon). By way of example, determining the changes in the one or more portions of the vehicle map service data can include the vehicle map service system 114 can compare one or more characteristics (e.g., the location of the vehicle and/or the location of objects proximate to the vehicle) of the one or more portions of the vehicle map service data over one or more time intervals since the vehicle map service data was published.

At 1206, the method 1200 can include publishing the one or more portions of the vehicle map service data to the other clients systems of the vehicle or the plurality of service systems. In some embodiments, the one or more portions of the vehicle map service data can include differential map data associated with differences in the vehicle horizon (e.g., the vehicle map service data associated with the vehicle horizon that is in the changed vehicle horizon and not in the original vehicle horizon). For example, the vehicle map service system 114 can send one or more portions of the vehicle map service data to a client system (e.g., the one or more vehicle systems 116) via one or more networks (e.g., the one or more networks 102 and/or one or more internal communication channels of the vehicle 110).

In some embodiments, publishing can include publishing the one or more portions of the vehicle map service data (e.g., the vehicle map service data of the method 1100) that have changed since the one or more portions of the vehicle map service data were most recently published. For example, the vehicle map service system 114 can publish only the one or more portions of the vehicle map service data that have changed (e.g., the vehicle map service data of the method 1200 determined at 1204).

Figure 13:
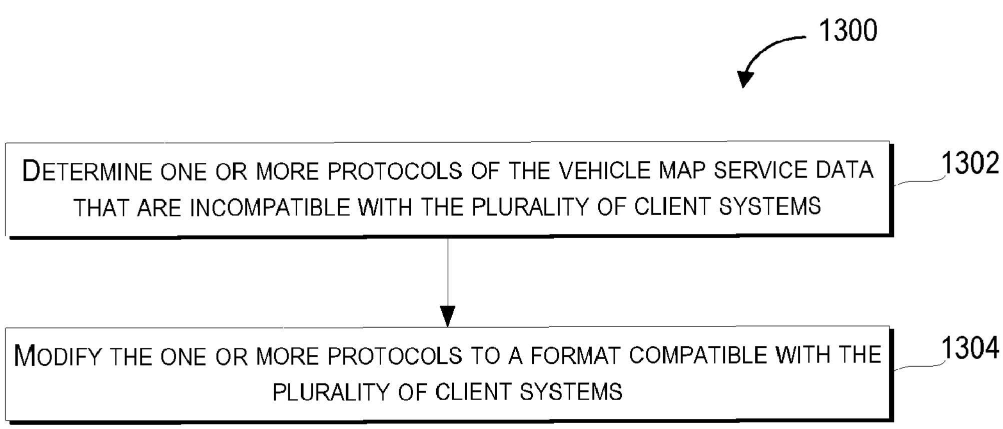
FIG. 13 depicts a flow diagram of the operation of a vehicle map service system according to example embodiments of the present disclosure.

FIG. 13 depicts a flow diagram of an example method 1300 of operating a vehicle map service according to example embodiments of the present disclosure. One or more portions of the method 1300 can be executed or implemented on one or more computing devices or computing systems including, for example, the vehicle map service system 114, the remote map service system 120, and/or the remote vehicle service system 130. Further, one or more portions of the method 1300 can be executed or implemented as an algorithm on the hardware devices or systems disclosed herein. FIG. 13 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1302, the method 1300 can include determining one or more protocols of the vehicle map service data (e.g., the vehicle map service data of the method 1100) that are incompatible with a client system of the plurality of client systems. For example, the vehicle map service system 114 can determine a protocol of the vehicle map service data that is a different version and incompatible with a protocol used by a client system. By way of further example, the vehicle map service system 114 can determine the one or more incompatible protocols based at least in part on accessing compatibility data (e.g., compatibility data including a lookup table) that includes a listing of the protocols used by the plurality of client systems and whether the protocols are compatible with the vehicle map service protocols.

At 1304, the method 1300 can include modifying the one or more protocols of the vehicle map service data (e.g., the vehicle map service data of the method 1100) that are incompatible to a format that is compatible with a client system of the plurality of client systems. The vehicle map service system 114 can use different (e.g., compatible) protocols when another protocol is incompatible with the format used by a client system of the plurality of client systems. For example, the vehicle map service system 114 can include data (e.g., a database of protocols cross-referenced with compatibility) associated with alternative protocols that can be used when a protocol is determined to be incompatible and can exclude the use of incompatible protocols while retaining the use of compatible protocols.

Figure 14:
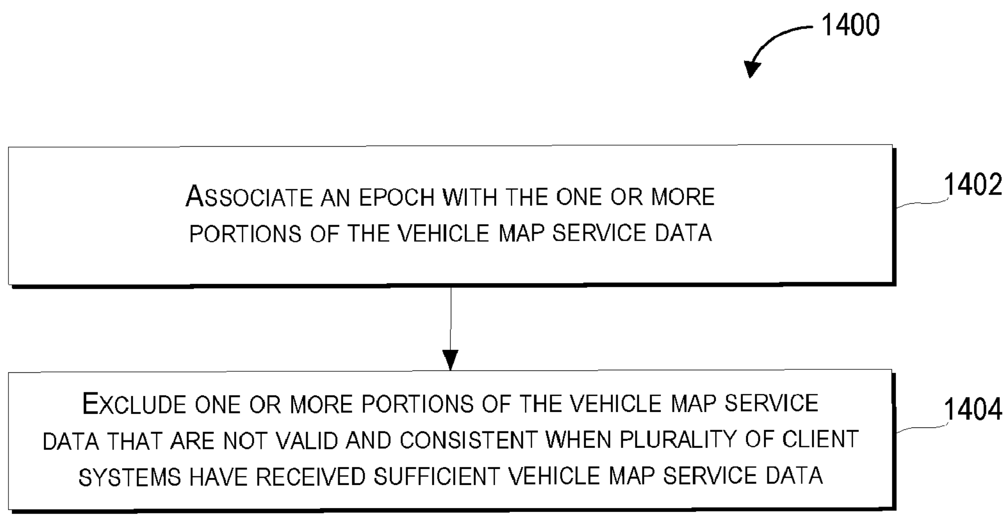
FIG. 14 depicts a flow diagram of the operation of a vehicle map service system according to example embodiments of the present disclosure.

FIG. 14 depicts a flow diagram of an example method 1400 of operating a vehicle map service according to example embodiments of the present disclosure. One or more portions of the method 1400 can be executed or implemented on one or more computing devices or computing systems including, for example, the vehicle map service system 114, the remote map service system 120, and/or the remote vehicle service system 130. Further, one or more portions of the method 1400 can be executed or implemented as an algorithm on the hardware devices or systems disclosed herein. FIG. 14 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1402, the method 1400 can include determining an epoch associated with the one or more portions of the vehicle map service data. The epoch can be associated with a time period during which the one or more portions of the vehicle map service data is valid (e.g., valid and consistent with other vehicle map service data provided by the same provider at the same epoch). For example, the remote map service system 120 can generate vehicle map service data that includes information associated with the state of traffic in a geographic area for the next one minute. The vehicle map system 114 can access the information associated with the state of traffic and determine based at least in part on information provided by a publisher, the current epoch for the publisher (e.g., the epoch defined by the publisher as being valid for a certain period of time).

At 1404, the method 1400 can include excluding one or more portions of the vehicle map service data that are no longer valid and consistent when the plurality of client systems have received sufficient vehicle map service data to switch to a new epoch. In some embodiments, the transmission of older epochs does not end when a new epoch is initiated. There can be an overlap period of time during which an older epoch and a newer epoch are active which can provide a listening client system with time to receive enough vehicle map service data in the new epoch to switch over to the newer epoch without having to interrupt service. For example, the vehicle map service system 114 can receive one or more portions of the vehicle map service data that are associated with the state of traffic ten minutes ago for which the epoch ended nine minutes ago and hence may not indicate the stat of traffic at the current time. The vehicle map service system 114 can then generate a local map in which the state of traffic is not indicated or is indicated as being unknown.

In some embodiments, generating, based at least in part on the vehicle map service data, a local map (e.g., the local map of the method 1100) of the geographic area within a predetermined distance of the vehicle can include excluding one or more portions of the vehicle map service data associated with epochs that have ended.

Figure 15:
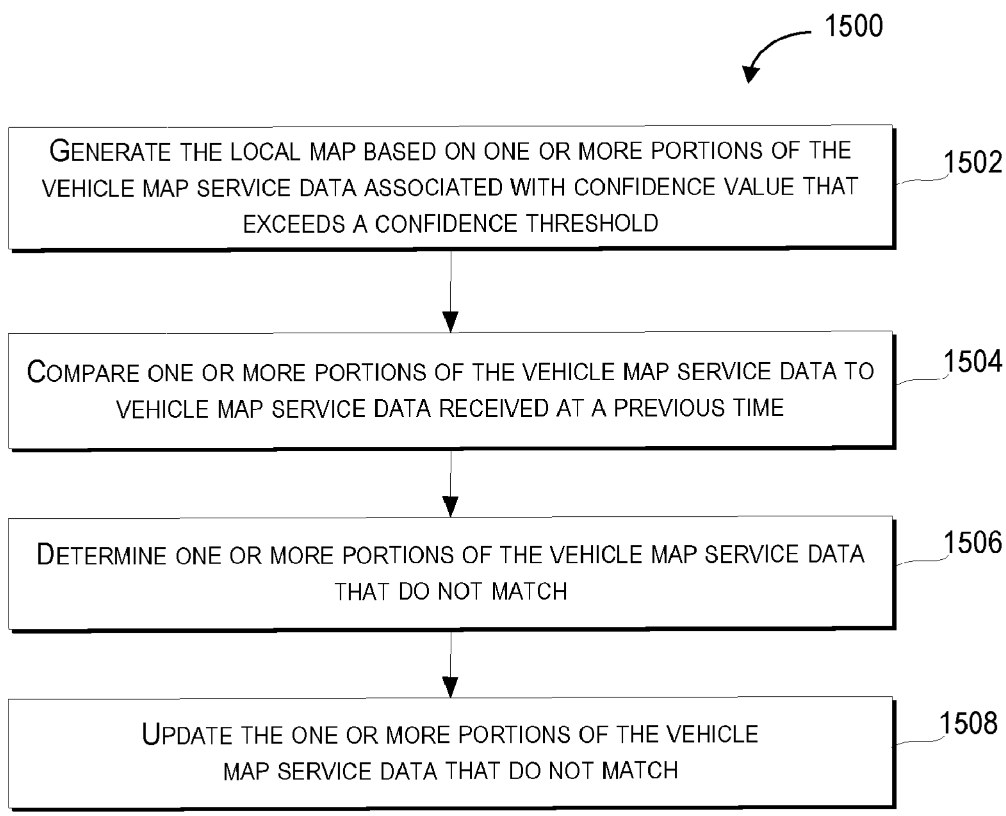
FIG. 15 depicts a flow diagram of the operation of a vehicle map service system according to example embodiments of the present disclosure.

FIG. 15 depicts a flow diagram of an example method 1500 of operating a vehicle map service according to example embodiments of the present disclosure. One or more portions of the method 1500 can be executed or implemented on one or more computing devices or computing systems including, for example, the vehicle map service system 114, the remote map service system 120, and/or the remote vehicle service system 130. Further, one or more portions of the method 1500 can be executed or implemented as an algorithm on the hardware devices or systems disclosed herein. FIG. 15 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1502, the method 1500 can include generating the local map based at least in part on the one or more portions of the vehicle map service data associated with a confidence value that exceeds a confidence threshold. In some embodiments, generating the local map can be based at least in part on the one or more portions of the vehicle map service data associated with a probability envelope, and/or probability distribution that exceeds a respective probability envelope threshold or probability distribution threshold.

In some embodiments, each of the one or more portions of the vehicle map service data (e.g., the vehicle map service data of the method 1100) can be associated with a confidence value (e.g., the confidence value of the method 1100), probability envelope, and/or probability distribution, indicative of the accuracy of the respective portion of the map service data For example, the vehicle map service system 114 can compare the confidence value associated with a portion of the vehicle map service data to a confidence threshold and generate the local map when the confidence value exceeds the confidence threshold.

In some embodiments, generating, based at least in part on the vehicle map service data, a local map of the geographic area within a predetermined distance of the vehicle can include generating the local map based at least in part on the one or more portions of the vehicle map service data associated with a confidence value that exceeds a confidence threshold.

At 1504, the method 1500 can include comparing the one or more portions of the vehicle map service data received to the vehicle map service data that was received at a previous time. For example, the vehicle map service system 114 can compare one or more portions of the vehicle map service data associated with the state of lane closures in road segments that was received five minutes ago when the vehicle 110 was approaching an area with a lane closure to the vehicle map service data that was just received within the last second.

In some embodiments, generating, based at least in part on the vehicle map service data, a local map (e.g., the local map of the method 1100) of the geographic area within a predetermined distance of the vehicle can include comparing the one or more portions of the vehicle map service data received to the vehicle map service data that was received at a previous time.

At 1506, the method 1500 can include determining the one or more portions of the vehicle map service data that match the vehicle map service data received at the previous time. For example, the vehicle map service system 114 can determine that one or more portions of the vehicle map service data associated with the state of lane closures in road segments that was received five minutes ago match (e.g., is the same as or within a similarity range of) the vehicle map service data that was just received within the last second.

In some embodiments, generating, based at least in part on the vehicle map service data, a local map (e.g., the local map of the method 1100) of the geographic area within a predetermined distance of the vehicle can include determining the one or more portions of the vehicle map service data that match the vehicle map service data received at the previous time.

At 1508, the method 1500 can include updating the one or more portions of the vehicle map service data that do not match the vehicle map service data received at the previous time. The vehicle map service system 114 can modify the one or more portions of the vehicle map service data that are different and replace those portions with the more recently received vehicle map service data.

In some embodiments, generating, based at least in part on the vehicle map service data, a local map of the geographic area within a predetermined distance of the vehicle can include updating the one or more portions of the vehicle map service data that do not match the vehicle map service data received at the previous time.

Figure 16:
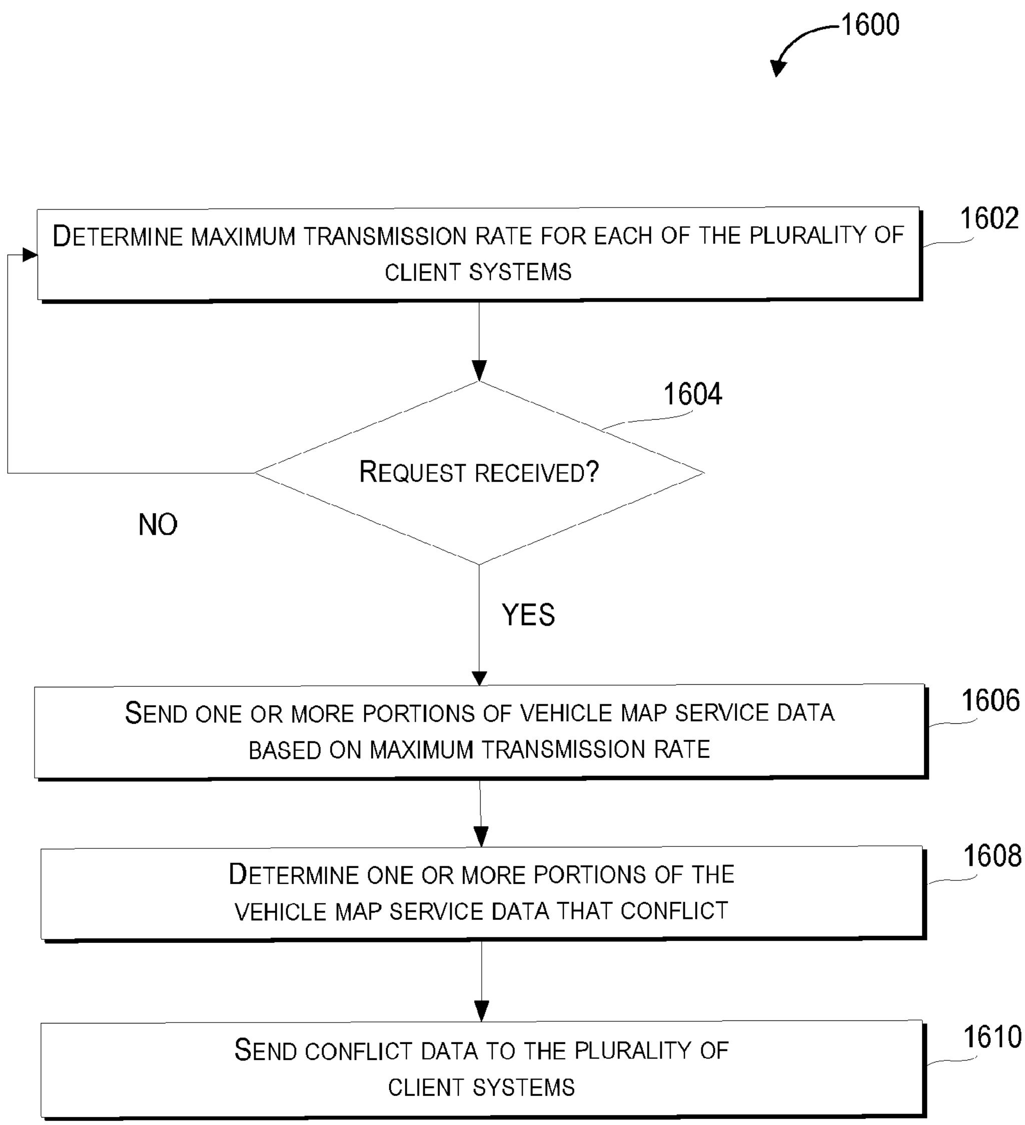
FIG. 16 depicts a flow diagram of the operation of a vehicle map service system according to example embodiments of the present disclosure.

FIG. 16 depicts a flow diagram of an example method 1600 of operating a vehicle map service according to example embodiments of the present disclosure. One or more portions of the method 1600 can be executed or implemented on one or more computing devices or computing systems including, for example, the vehicle map service system 114, the remote map service system 120, and/or the remote vehicle service system 130. Further, one or more portions of the method 1600 can be executed or implemented as an algorithm on the hardware devices or systems disclosed herein. FIG. 16 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1602, the method 1600 can include determining, for each of the plurality of client systems, a maximum transmission rate at which the vehicle map service data can be received. For example, the vehicle map service system 114 can determine the maximum transmission rate at which the vehicle map service data can be received based at least in part on accessing transmission rate data associated with the transmission rate (e.g., the maximum transmission, the current transmission rate, and/or previously determined transmission rates) of each of the plurality of service systems.

At 1605, the method 1600 can include determining (e.g., determining based at least in part on the maximum transmission rate for each of the plurality of client systems) whether, when, or that, the one or more portions of the vehicle map service data to the client system will be sent to the client system. For example, the vehicle map service system 114 can determine, based at least in part on a determined transmission rate of each of the plurality of client systems, whether to send the one or more portions of the vehicle map service data to the client system.

Responsive to receiving a request for the vehicle map service data from a client system that is subscribed to one or more portions of the vehicle map service data, the method 1600 can proceed to 1606. Responsive to not receiving a request for the vehicle map service data from a vehicle map service client system that is subscribed to one or more portions of the vehicle map service data, the method 1000 can return to 1002 or end.

At 1606, the method 1600 can include sending, based at least in part on the maximum transmission rate for each of the plurality of client systems, the one or more portions of the vehicle map service data to the vehicle map service client system. For example, the vehicle map service system 114 can adjust the type of the one or more portions of the vehicle map service data that is sent to the vehicle map service client system based on the maximum transmission rate of each of the plurality of vehicle client systems (e.g., when the maximum transmission rate is lower the one or more portions of the vehicle map service data that use more network bandwidth can be excluded).

At 1608, the method 1600 can include determining the one or more portions of the vehicle map service data that conflict. For example, the vehicle map service system 114 can perform a data integrity check (e.g., checksum) on the one or more portions of the vehicle map service data to determine the one or more portions of the vehicle map service data that conflict. By way of further example, the vehicle map service system 114 can determine whether the one or more portions of the vehicle map service data conflict based on the one or more portions of the vehicle map service data satisfying one or more conflict criteria associated with the vehicle map service data conflicting (e.g., incompatible layer versions of the vehicle map service data are associated with one another).

At 1610, the method 1600 can include sending conflict data identifying the one or more portions of the vehicle map service data that conflict to the plurality of service systems. For example, the vehicle map service system 114 can send vehicle map service data that includes conflict data that includes identifiers associated with specific portions of the vehicle map service data that conflict (e.g., portions of the vehicle map service data that include errors and/or corrupted data), conflict data that includes information associated with the type of service systems (e.g., that remote service systems are the type of vehicle map service client system that includes one or more portions of the vehicle map service data that conflict) that include one or more portions of the vehicle map service data that conflict, and/or conflict data the time at which the one or more portions of the vehicle map service data that conflict was published.

Figure 17:
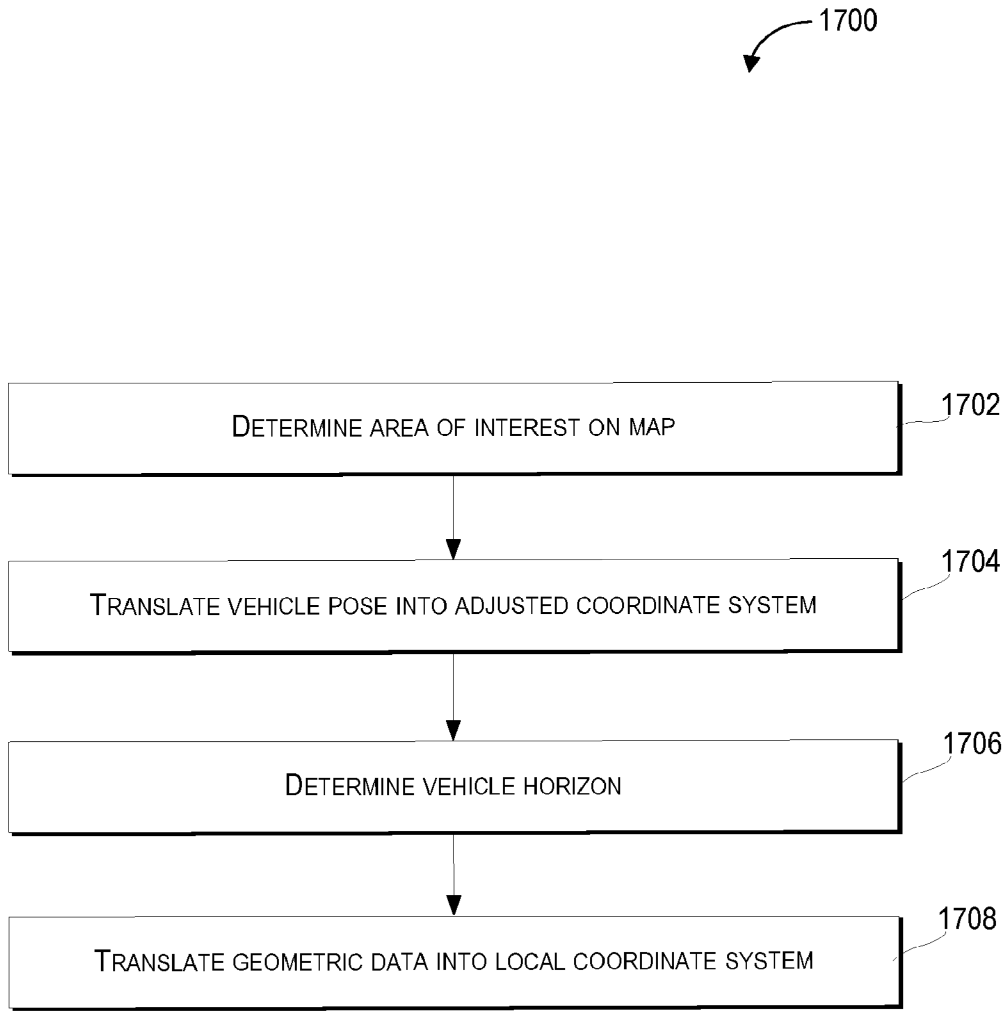
FIG. 17 depicts a flow diagram of the operation of a vehicle map service system according to example embodiments of the present disclosure.

FIG. 17 depicts a flow diagram of an example method 1700 of operating a vehicle map service according to example embodiments of the present disclosure. One or more portions of the method 1700 can be executed or implemented on one or more computing devices or computing systems including, for example, the vehicle map service system 114, the remote map service system 120, and/or the remote vehicle service system 130. Further, one or more portions of the method 1700 can be executed or implemented as an algorithm on the hardware devices or systems disclosed herein. FIG. 17 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1702, the method 1700 can include determining, based at least in part on vehicle map service data, an area of interest associated with a local map. For example, the vehicle map service system 114 can determine an area of interest based on a selection by a user (e.g., the user can expressly indicate an area of interest or an area of interest can be determined based on previous user interactions or settings), the proximity of one or more landmarks (e.g., landmarks indicated in the landmarks layer of the vehicle map service data), proximity to a destination to which the vehicle is travelling, or the vehicle having previously travelled through or stopped in the area.

At 1704, the method 1700 can include translating a vehicle's pose (e.g., the location and orientation of the vehicle) into a local coordinate system associated with the area of interest. For example, the vehicle map service system 114 can determine the vehicle's (e.g., the vehicle 110) pose based at least in part on orientation information (e.g., a compass bearing of the vehicle) and the location of the vehicle with respect to objects proximate to the vehicle including the road. For example, the landmark information associated with a landmark proximate to the vehicle can be associated with a set of Cartesian coordinates (e.g., latitude and longitude) that can be used to determine the local coordinate system.

At 1706, the method 1700 can include determining a vehicle horizon associated with the vehicle (e.g., the outside edge of the local map that will be generated for the area). For example, the vehicle map service system 114 can use the vehicle's direction of travel and velocity to determine the distance the vehicle will travel in the next one minute and determine the vehicle horizon based on that distance.

At 1708, the method 1700 can include translating geometric data into a local coordinate system. For example, as the vehicle travels through the area of interest, the vehicle map service system 114 can determine the distance between the vehicle and one or more objects in the area and translate the changing distance into a changing position of the vehicle with respect to a map associated with the local coordinate system.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of operating a vehicle map service, the method comprising:

receiving, by one or more computing devices of a vehicle, vehicle map service data associated with a plurality of service systems, wherein the vehicle map service data comprises information associated with a geographic area;

generating, by the one or more computing devices, a local map of the geographic area in real-time based at least in part of the vehicle map service data and information generated by one or more sensors of the vehicle;

determining, by the one or more computing devices, for each of a plurality of client systems of the vehicle, one or more portions of the local map to which each client system is subscribed based, at least in part, on which portions of the local map each client system is authorized to access; and sending, by the one or more computing devices, the one or more portions of the local map to which each client system is subscribed to a respective client system of the plurality of client systems.

2. The method of claim 1, wherein the vehicle map service data is in accordance with a vehicle map service protocol associated with sending or receiving information between the plurality of client systems.

3. The method of claim 1, wherein local map depicts the geographic area within a vehicle horizon associated with a distance from the vehicle.

4. The method of claim 3, further comprising:

determining, by the one or more computing devices, the vehicle horizon based at least in part on a geographic location of the vehicle, wherein the vehicle horizon is associated with the one or more portions of the local map provided to the plurality of client systems.

5. The method of claim 1, wherein the vehicle map service data comprises one or more maps provided by the plurality of service systems or one or more machine-learned models provided by the plurality of service systems.

6. The method of claim 1, wherein:

the plurality of service systems comprises one or more geographic information systems and one or more vehicle map service systems;

receiving the vehicle map service data comprises receiving, from the one or more geographic information systems, first vehicle map service data comprising one or more maps; and receiving the vehicle map service data comprises receiving, from the one or more vehicle map service systems, second vehicle map service data comprising information associated with the plurality of client systems.

7. The method of claim 1, wherein the local map comprises a dynamic model of a geographic area surrounding the vehicle, the dynamic model comprising a real-time location of the vehicle in relation to one or more objects external to the vehicle.

8. The method of claim 3, further comprising:

determining, by the one or more computing devices, the plurality of client systems that can publish one or more portions of the vehicle map service data to other client systems of the plurality of client systems, wherein publishing comprises sending the one or more portions of the vehicle map service data to the plurality of client systems that are subscribed to the one or more portions of the vehicle map service data; and publishing, by the one or more computing devices, the one or more portions of the vehicle map service data to the other client systems or the plurality of service systems.

9. The method of claim 8, wherein publishing, by the one or more computing devices, the one or more portions of the vehicle map service data comprises:

determining, by the one or more computing devices, one or more portions of the vehicle map service data that have changed since the one or more portions of the vehicle map service data were most recently published, wherein the one or more portions of the vehicle map service data that have changed comprise one or more changes associated with the vehicle horizon; and publishing, by the one or more computing devices, the one or more portions of the vehicle map service data that have changed since the one or more portions of the vehicle map service data were most recently published, wherein the one or more portions of the vehicle map service data comprise differential map data associated with differences in the vehicle horizon.

10. The method of claim 1, wherein the vehicle map service data comprises a plurality of map layers, and wherein each layer of the plurality of layers is associated with one or more states of the geographic area.

11. The method of claim 10, wherein the one or more states of the geographic area are associated with a plurality of properties comprising a location of the vehicle, one or more road segment locations, one or more lane locations, or one or more sign locations.

12. The method of claim 1, wherein the plurality of client systems comprises at least one vehicle system and at least one vehicle map service client.

13. A computing system comprising:

one or more processors;

one or more tangible non-transitory computer-readable media storing instructions that when executed by the one or more processors cause the one or more processors to perform operations comprising:

receiving vehicle map service data from a plurality of service systems comprising a plurality of client systems associated with a vehicle, wherein the vehicle map service data comprises information associated with a geographic area;

generating a local map of the geographic area in real-time based at least in part of the vehicle map service data and information generated by one or more sensors of the vehicle;

determining, for each client system of the plurality of client systems, one or more portions of the local map to which each client system is subscribed based, at least in part, on which portions of the local map each client system is authorized to access; and sending the one or more portions of the local map to which each client system is subscribed to a respective client system of the plurality of client systems.

14. The computing system of claim 13, wherein the vehicle map service data is in accordance with a vehicle map service protocol associated with sending or receiving information between the plurality of client systems.

15. The computing system of claim 13, wherein local map depicts the geographic area within a vehicle horizon associated with a distance from the vehicle.

16. The computing system of claim 15, the operations further comprising:

determining the vehicle horizon based at least in part on a geographic location of the vehicle, wherein the vehicle horizon is associated with the one or more portions of the local map provided to the plurality of client systems.

17. The computing system of claim 15, wherein the vehicle map service data comprises one or more maps provided by the plurality of service systems or one or more machine-learned models provided by the plurality of service systems.

18. One or more tangible non-transitory computer-readable media storing computer-readable instructions that when executed by one or more processors cause the one or more processors to perform operations, the operations comprising:

receiving vehicle map service data from a plurality of service systems comprising a plurality of client systems associated with a vehicle, wherein the vehicle map service data comprises information associated with a geographic area;

generating a local map of the geographic area in real-time based at least in part of the vehicle map service data and information generated by one or more sensors of the vehicle;

determining, for each client system of the plurality of client systems, one or more portions of the local map to which each client system is subscribed based, at least in part, on which portions of the local map each client system is authorized to access; and sending the one or more portions of the local map to which each client system is subscribed to a respective client system of the plurality of client systems.

19. The one or more tangible non-transitory computer-readable media of claim 18, wherein:

the plurality of service systems comprises one or more geographic information systems and one or more vehicle map service systems;

receiving the vehicle map service data comprises receiving, from the one or more geographic information systems, first vehicle map service data comprising one or more maps; and receiving the vehicle map service data comprises receiving, from the one or more vehicle map service systems, second vehicle map service data comprising information associated with the plurality of client systems.

20. The one or more tangible non-transitory computer-readable media of claim 18, wherein the operations further comprise:

determining the one or more portions of the vehicle map service data that conflict; and sending conflict data identifying the one or more portions of the vehicle map service data that conflict to the plurality of service systems.

* * * * *